US011616957B2

(12) United States Patent
Deng et al.

(10) Patent No.: US 11,616,957 B2
(45) Date of Patent: Mar. 28, 2023

(54) MATRIX-BASED INTRA PREDICTION USING UPSAMPLING

(71) Applicants: Beijing Bytedance Network Technology Co., Ltd., Beijing (CN); Bytedance Inc., Los Angeles, CA (US)

(72) Inventors: Zhipin Deng, Beijing (CN); Kai Zhang, San Diego, CA (US); Li Zhang, San Diego, CA (US); Hongbin Liu, Beijing (CN); Jizheng Xu, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/479,360

(22) Filed: Sep. 20, 2021

(65) Prior Publication Data

US 2022/0007029 A1 Jan. 6, 2022

Related U.S. Application Data

(63) Continuation of application No. PCT/CN2020/091542, filed on May 21, 2020.

(30) Foreign Application Priority Data

May 22, 2019 (WO) ................ PCT/CN2019/087987

(51) Int. Cl.
*H04N 19/132* (2014.01)
*H04N 19/105* (2014.01)
(Continued)

(52) U.S. Cl.
CPC ............ *H04N 19/132* (2014.11); *G06F 7/78* (2013.01); *G06F 17/16* (2013.01); *H04N 19/105* (2014.11);
(Continued)

(58) Field of Classification Search
CPC ............... H04N 19/132; H04N 19/105; H04N 19/159; H04N 19/176; G06F 7/78; G06F 17/16
See application file for complete search history.

(56) References Cited

U.S. PATENT DOCUMENTS 9,723,313 B2 8/2017 Yang et al.
10,142,627 B2 11/2018 Zhao et al.
(Continued)

FOREIGN PATENT DOCUMENTS

CN 1738434 A 2/2006
CN 1784015 A 6/2006
(Continued)

OTHER PUBLICATIONS

Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH. Mar. 19-27, 2019, document JVET-N1001 (v6 and v7), 2019.
(Continued)

*Primary Examiner* — Hesham K Abouzahra
(74) *Attorney, Agent, or Firm* — Perkins Coie LLP

(57) ABSTRACT

Devices, systems and methods for digital video coding, which includes matrix-based intra prediction methods for video coding, are described. In a representative aspect, a method for video processing includes performing a conversion between a current video block of a video and a bitstream representation of the current video block using a matrix based intra prediction (MIP) mode in which a prediction block of the current video block is determined by performing, on previously coded samples of the video, a boundary downsampling operation, followed by a matrix vector multiplication operation, and followed by an upsampling operation, where the upsampling operation is performed, in both a vertical direction and a horizontal direction
(Continued)

in a fixed order, on samples obtained from the matrix vector multiplication operation.

18 Claims, 21 Drawing Sheets

(51) Int. Cl.
　　*H04N 19/159*　　　(2014.01)
　　*H04N 19/176*　　　(2014.01)
　　*G06F 7/78*　　　　(2006.01)
　　*G06F 17/16*　　　(2006.01)
(52) U.S. Cl.
　　CPC ......... *H04N 19/159* (2014.11); *H04N 19/176* (2014.11)

(56) References Cited

U.S. PATENT DOCUMENTS

| | | | |
|---|---|---|---|
| 10,368,107 | B2 | 7/2019 | Zhang et al. |
| 10,390,050 | B2 | 8/2019 | An et al. |
| 10,721,489 | B2 | 7/2020 | Chen et al. |
| 10,841,593 | B2 | 11/2020 | Zhao et al. |
| 11,134,257 | B2 | 9/2021 | Zhao et al. |
| 11,197,025 | B2 | 12/2021 | Ramasubramonian et al. |
| 2008/0170615 | A1 | 7/2008 | Sekiguchi et al. |
| 2008/0187044 | A1 | 8/2008 | Kim et al. |
| 2010/0246676 | A1 | 9/2010 | Cao et al. |
| 2012/0057630 | A1 | 3/2012 | Saxena et al. |
| 2012/0069906 | A1 | 3/2012 | Sato |
| 2012/0177112 | A1 | 7/2012 | Guo et al. |
| 2012/0201303 | A1 | 8/2012 | Yang et al. |
| 2012/0236929 | A1 | 9/2012 | Liu |
| 2013/0272391 | A1 | 10/2013 | Zheng et al. |
| 2013/0279569 | A1 | 10/2013 | Gao et al. |
| 2014/0078250 | A1 | 3/2014 | Zhang et al. |
| 2014/0105283 | A1 | 4/2014 | Li et al. |
| 2015/0043637 | A1 | 2/2015 | Morigami et al. |
| 2015/0103892 | A1 | 4/2015 | Zhou et al. |
| 2015/0110172 | A1 | 4/2015 | Ye et al. |
| 2016/0073107 | A1 | 3/2016 | Moon et al. |
| 2016/0165258 | A1 | 6/2016 | Lei |
| 2016/0182913 | A1 | 6/2016 | Joshi et al. |
| 2016/0261885 | A1 | 9/2016 | Li et al. |
| 2016/0286232 | A1 | 9/2016 | Li et al. |
| 2016/0330457 | A1 | 11/2016 | Ye et al. |
| 2016/0373742 | A1 | 12/2016 | Zhao et al. |
| 2016/0373782 | A1 | 12/2016 | Zhao et al. |
| 2016/0373785 | A1 | 12/2016 | Said et al. |
| 2017/0006293 | A1 | 1/2017 | Lee et al. |
| 2017/0094313 | A1 | 3/2017 | Zhao et al. |
| 2017/0272745 | A1 | 9/2017 | Liu et al. |
| 2017/0374369 | A1 | 12/2017 | Chuang et al. |
| 2018/0103254 | A1 | 4/2018 | Tanaka et al. |
| 2018/0176601 | A1 | 6/2018 | Jeong et al. |
| 2018/0184082 | A1 | 6/2018 | Yoo et al. |
| 2018/0220138 | A1 | 8/2018 | He et al. |
| 2018/0309984 | A1 | 10/2018 | Son et al. |
| 2019/0052886 | A1 | 2/2019 | Chiang et al. |
| 2019/0104303 | A1 | 4/2019 | Xiu et al. |
| 2019/0116381 | A1 | 4/2019 | Lee et al. |
| 2019/0313130 | A1 | 10/2019 | Zhang et al. |
| 2020/0045322 | A1 | 2/2020 | Ye et al. |
| 2020/0162749 | A1* | 5/2020 | Zhang .................... H04N 19/59 |
| 2020/0204814 | A1 | 6/2020 | Yoo et al. |
| 2020/0221099 | A1 | 7/2020 | Pham Van et al. |
| 2020/0221138 | A1 | 7/2020 | Lee |
| 2020/0322620 | A1 | 10/2020 | Zhao et al. |
| 2020/0344468 | A1 | 10/2020 | Lin et al. |
| 2020/0359033 | A1 | 11/2020 | Ramasubramonian et al. |
| 2020/0359037 | A1 | 11/2020 | Ramasubramonian et al. |
| 2020/0359050 | A1 | 11/2020 | Van Der Auwera et al. |
| 2021/0092405 | A1 | 3/2021 | Biatek et al. |
| 2021/0105499 | A1 | 4/2021 | Lee |
| 2021/0195176 | A1 | 6/2021 | Kim |
| 2021/0211738 | A1 | 7/2021 | Yin et al. |
| 2021/0218960 | A1 | 7/2021 | Pfaff et al. |
| 2021/0227213 | A1 | 7/2021 | Kim et al. |
| 2021/0266568 | A1 | 8/2021 | Huo et al. |
| 2021/0297661 | A1 | 9/2021 | Deng et al. |
| 2021/0297671 | A1 | 9/2021 | Deng et al. |
| 2021/0297672 | A1 | 9/2021 | Deng et al. |
| 2021/0306654 | A1* | 9/2021 | Lee ...................... H04N 19/105 |
| 2021/0306666 | A1 | 9/2021 | Lee |
| 2021/0314562 | A1 | 10/2021 | Kang et al. |
| 2021/0314599 | A1 | 10/2021 | Lee |
| 2021/0314618 | A1 | 10/2021 | Pfaff et al. |
| 2021/0321090 | A1 | 10/2021 | Deng et al. |
| 2021/0329248 | A1 | 10/2021 | Deng et al. |
| 2021/0344915 | A1 | 11/2021 | Wang et al. |
| 2021/0385438 | A1 | 12/2021 | Deng et al. |
| 2022/0014752 | A1 | 1/2022 | Deng et al. |
| 2022/0014783 | A1 | 1/2022 | Deng et al. |
| 2022/0014785 | A1 | 1/2022 | Deng et al. |
| 2022/0038698 | A1 | 2/2022 | Koo et al. |
| 2022/0058239 | A1* | 2/2022 | Pfaff ...................... G06F 17/156 |
| 2022/0060745 | A1 | 2/2022 | Deng et al. |
| 2022/0124342 | A1 | 4/2022 | Deng et al. |
| 2022/0224898 | A1 | 7/2022 | Chiang et al. |

FOREIGN PATENT DOCUMENTS

| | | |
|---|---|---|
| CN | 101646081 A | 2/2010 |
| CN | 101977316 A | 2/2011 |
| CN | 102377993 A | 3/2012 |
| CN | 102427530 A | 4/2012 |
| CN | 102598663 A | 7/2012 |
| CN | 102823254 A | 12/2012 |
| CN | 103098473 A | 5/2013 |
| CN | 103140877 A | 6/2013 |
| CN | 103503452 A | 1/2014 |
| CN | 104126304 A | 10/2014 |
| CN | 105765979 A | 7/2016 |
| CN | 105830440 A | 8/2016 |
| CN | 107633538 A | 1/2018 |
| CN | 107736027 A | 2/2018 |
| CN | 109196867 A | 1/2019 |
| CN | 109479129 A | 3/2019 |
| CN | 110708559 A | 1/2020 |
| EP | 2237217 A2 | 10/2010 |
| EP | 2557793 A1 | 2/2013 |
| JP | 2020017970 A | 1/2020 |
| JP | 2022514870 A | 2/2022 |
| JP | 2022516846 A | 3/2022 |
| JP | 2022501896 A | 9/2022 |
| KR | 100323676 B1 | 2/2002 |
| KR | 20180136555 A | 12/2018 |
| TW | 201729592 A | 8/2017 |
| WO | 2012172779 A1 | 12/2012 |
| WO | 2017019818 A1 | 2/2017 |
| WO | 2017058615 A1 | 4/2017 |
| WO | 2018064948 A1 | 4/2018 |
| WO | 2018080135 A1 | 5/2018 |
| WO | 2018208349 A1 | 11/2018 |
| WO | 2018236051 A1 | 12/2018 |
| WO | 2019009540 A1 | 1/2019 |
| WO | 2019022099 A1 | 1/2019 |
| WO | 2019172676 A1 | 9/2019 |
| WO | 2020127811 A3 | 6/2020 |
| WO | 2020221373 A1 | 11/2020 |
| WO | 2020222484 A1 | 11/2020 |
| WO | 2020233663 A1 | 11/2020 |
| WO | 2020246806 A1 | 12/2020 |

OTHER PUBLICATIONS

Bross et al. "Versatile Video Coding (Draft 7)," Joint Video Experts Team (JVET) of ITU-T SG 16 WP 3 and ISO/IEC JTC 1/SC 29/WG 11, 16th Meeting, Geneva, CH. Oct. 1-11, 2019, document JVET-P2001, 2019.

Chiang et al. "CE6-Related: Constraint and Simplification for LFNST Signalling," Joint Video Experts Team (JVET) of ITU-T SG

(56) References Cited

OTHER PUBLICATIONS

16 WP 3 and ISO/IEC JTC 1/SC 29/WG 11, 15th Meeting, Gothenburg, SE, Jul. 3-12, 2019, document JVET-O0291, 2019.

Choi et al. "CE6-Related: Unified Matrix for Transform," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0060, 2018.

Choi et al. "CE6: Unified Matrix for Transform (Test 6-1.2a)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0200, 2019.

Filippov et al. "CE3-Related: Simplification of Matrix-based Intra Prediction (MIP)," Joint Video Experts Team (JVET) of ITU-T SG WP 3 and ISO/IEC JTC 1/SC 29/WG 11, 15th Meeting, Gothenburg, SE Jul. 3-12, 2019, document JVET-O0203, 2019.

He et al. "Cross-Check of JVET-K0172: CE3-Related: Gradient-Based Boundary Filtering in Intra Prediction," Joint Video Experts Team (JVET) of ITU-T SG 16 WP3 and ISO/IEC JTC 1/SC 29/WG 11, 11th Meeting, Ljubljana, SI, Jul. 10-18, 2018, document JVET-K0458, 2018.

Koo et al. "CE6: Reduced Secondary Transform (RST) (CE6-3.1)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0193, 2019.

Lainema, Jani. "CE6: Shape Adaptive Transform Selection (Test 3.1)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0303, 2019.

Lu et al. "AHG16: Simplification of Reshaper Information," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0220, 2019.

Pfaff et al. "CE3: Affine Linear Weighted Intra Prediciton (test 1.2.1, test 1.2.2)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0043, 2019.

Pfaff et al. "CE3: Affine Linear Weighted Intra Prediciton (CE3-4.1, CE3-4.2)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0217, 2019.

Pfaff et al. "Non-CE3: Harmonization of 8-Bit MIP with Unified-MPM and LFNST," Joint Video Experts Team (JVET) of ITU-T SG 16 WP 3 and ISO/IEC JTC 1/SC 29/WG 11, 15th Meeting, Gotenburg, SWE, Jul. 3-12, 2019, document JVET-O0485, 2019.

Ramasubramonian et al. "CE3-Related: Unification of MPM Derivation for Luma Intra Modes," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0433, 2019.

Wang et al. "CE3-Related: A Unified MPM List for Intra Coding," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0185, 2019.

Yoon et al. "Non-CE3: MIP Modifications," Joint Video Experts Team (JVET) of ITU-T SG 16 WP3 and ISO/IEC JTC 1/SC 29/WG 11, 15th Meeting, Gothenburg, SE, Jul. 3-12, 2019, document JVET-O0202, 2019.

Zhang et al. "Non-CE3: Fixed MPMs for MIP," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0255, 2019.

Zhou et al. "Study on the Development of Video Coding Standard VVC," Radio & TV Broadcast Engineering, ISSN 1002-4522, Dec. 31, 2018, 45(9):26-31.

International Search Report and Written Opinion from International Patent Application No. PCT/CN2020/084455 dated Jul. 10, 2020 (9 pages).

International Search Report and Written Opinion from International Patent Application No. PCT/CN2020/084462 dated Jul. 6, 2020 (10 pages).

International Search Report and Written Opinion from International Patent Application No. PCT/CN2020/084472 dated Jul. 9, 2020 (9 pages).

International Search Report and Written Opinion from International Patent Application No. PCT/CN2020/084486 dated Jul. 9, 2020 (9 pages).

International Search Report and Written Opinion from International Patent Application No. PCT/CN2020/084488 dated Jul. 9, 2020 (9 pages).

International Search Report and Written Opinion from International Patent Application No. PCT/CN2020/084499 dated Jun. 28, 2020 (9 pages).

International Search Report and Written Opinion from International Patent Application No. PCT/CN2020/084505 dated Jul. 17, 2020 (9 pages).

International Search Report and Written Opinion from International Patent Application No. PCT/CN2020/085050 dated Jul. 15, 2020 (13 pages).

International Search Report and Written Opinion from International Patent Application No. PCT/CN2020/088583 dated Jul. 1, 2020 (9 pages).

International Search Report and Written Opinion from International Patent Application No. PCT/CN2020/088584 dated Aug. 3, 2020 (11 pages).

International Search Report and Written Opinion from International Patent Application No. PCT/CN2020/091542 dated Aug. 20, 2020 (9 pages).

International Search Report and Written Opinion from International Patent Application No. PCT/CN2020/092905 dated Aug. 27, 2020 (9 pages).

International Search Report and Written Opinion from International Patent Application No. PCT/CN2020/092906 dated Aug. 17, 2020 (11 pages).

International Search Report and Written Opinion from International Patent Application No. PCT/CN2020/094513 dated Sep. 7, 2020 (9 pages).

International Search Report and Written Opinion from International Patent Application No. PCT/CN2020/124317 dated Jan. 18, 2021 (13 pages).

Non Final Office Action from U.S. Appl. No. 17/343,980 dated Oct. 15, 2021.

Non Final Office Action from U.S. Appl. No. 17/342,951 dated Oct. 25, 2021.

Non Final Office Action from U.S. Appl. No. 17/343,041 dated Oct. 29, 2021.

Notice of Allowance from U.S. Appl. No. 17/342,996 dated Nov. 23, 2021.

Notice of Allowance from U.S. Appl. No. 17/399,879 dated Dec. 21, 2021.

Notice of Allowance from U.S. Appl. No. 17/478,511 dated Dec. 24, 2021.

Final Office Action from U.S. Appl. No. 17/343,041 dated Feb. 24, 2022.

Notice of Allowance from U.S. Appl. No. 17/342,951 dated Mar. 4, 2022.

Notice of Allowance from U.S. Appl. No. 17/343,086 dated Jan. 25, 2022.

Non Final Office Action from U.S. Appl. No. 17/453,135 dated Feb. 3, 2022.

Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA Jan. 9-18, 2019, document JVET-M1001, 2019.

Chen et al. "Algorithm Description for Versatile Video Coding and Test Model 5 (VTM 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1002, 2019.

Helle et al. "CE3-related: Non-Linear Weighted Intra Prediction (Cross-Check Report in JVET-K0262)," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0196, 2018.

(56) References Cited

OTHER PUBLICATIONS

Extended European Search Report from European Patent Application 20791054.8 dated Apr. 11, 2022.
Extended European Search Report from European Patent Application 20788667.2 dated May 9, 2022.
Extended European Search Report from European Patent Application 20813478.3 dated May 30, 2022.
Extended European Search Report from European Patent Application 20786940.5 dated May 6, 2022.
Examination Report from Indian Patent Application 202147055869 dated May 18, 2022.
Examination Report from Indian Patent Application 202147052371 dated May 25, 2022.
Final Office Action from U.S. Appl. No. 17/399,879 dated Apr. 7, 2022.
Final Office Action from U.S. Appl. No. 17/453,135 dated Jun. 15, 2022.
Non Final Office Action from U.S. Appl. No. 17/731,472 dated Aug. 16, 2022.
Examination Report from Indian Patent Application 202147049480 dated Aug. 18, 2022.
Examination Report from Indian Patent Application 202147052279 dated Jul. 13, 2022.
Non Final Office Action from U.S. Appl. No. 17/646,412 dated Oct. 28, 2022.
Bross et al. "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q2001, 2020. (cited in EP20819292.2 EESR dated Nov. 10, 2022).
Bross et al. "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, document JVET-R2001, 2020. (cited in EP20819292.2 EESR dated Nov. 10, 2022).
Chen et al. "Algorithm Description for Joint Exploration Test Model 1," Joint Video Experts Team (JVET) of ITU-T SG 16 WP 3 and ISO/IEC JTC 1/SC 29/WG 11 1nd Meeting: Geneva, CH, Oct. 19-21, 2015, document JVET-A1001, 2015. (cited in JP2021-559286 OA1 dated Nov. 1, 2022).
Fernandes, Felix C. "Low Complexitiy Rotational Transform," Joint Collaborative Team on Video Coding (JCT-VC) of ITU-T SG 16 WP 3 and ISO/IEC JTC 1/SC 29/WG 11 3rd Meeting, Guangzhou CN, Oct. 7-15, 2010, document JCTVC-C096, 2010. (cited in JP2021-559286 OA1 dated Nov. 1, 2022).
Lin et al. "Non-CE3: Simplifications of MIP," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0312, 2019. (cited in EP20819292.2 EESR dated Nov. 10, 2022).
Murakami et al. "High Efficiency Video Coding," HEVC / H.265, 2013. (cited in JP2021-559286 OA1 dated Nov. 1, 2022).
Pfaff et al. "MIP for All Channels in the Case of 4:4:4-Chroma Format and of Single Tree," Joint Video Experts Team (JVET) of ITU-T SG 16 WP 3 and ISO/IEC JTC 1/SC 29/WG 1118th Meeting: Alpbach, AT, Apr. 15-24, 2020, document JVET-R0350,2020. (cited in EP20819292.2 EESR dated Nov. 10, 2022).
Extended European Search Report from European Patent Application 20819292.2 dated Nov. 10, 2022.
Notice of Allowance from U.S. Appl. No. 17/453,135 dated Jan. 6, 2023.

* cited by examiner

2100

Performing a conversion between a current video block of a video and a bitstream representation of the current video block using a matrix based intra prediction (MIP) mode in which a prediction block of the current video block is determined by performing, on previously coded samples of the video, a boundary downsampling operation, followed by a matrix vector multiplication operation, and followed by an upsampling operation, where the upsampling operation is performed, in both a vertical direction and a horizontal direction in a fixed order, on samples obtained from the matrix vector multiplication operation ⌇ 2102

Performing a conversion between a current video block of a video and a bitstream representation of the current video block using a matrix based intra prediction (MIP) mode in which a prediction block of the current video block is determined by performing, on previously coded samples of the video, a boundary downsampling operation, followed by a matrix vector multiplication operation, and followed by an upsampling operation, where the conversion includes performing a transposing operation prior to the upsampling operation, where the transposing operation transposes a first set of samples of the prediction block obtained by performing the boundary downsampling operation and the matrix vector multiplication operation, and where the transposing operation is performed according to dimensions of the prediction block — 2202

Performing a conversion between a current video block of a video and a bitstream representation of the current video block using a matrix based intra prediction (MIP) mode in which a prediction block of the current video block is determined by performing, on previously coded samples of the video, a boundary downsampling operation, followed by a matrix vector multiplication operation, and followed by an upsampling operation, where the upsampling operation is performed by selecting and using an interpolation filter other than a bilinear filter according to a rule ⏤ 2302

MATRIX-BASED INTRA PREDICTION USING UPSAMPLING

CROSS REFERENCE TO RELATED APPLICATIONS

This application is a continuation of International Patent Application No. PCT/CN2020/091542, filed on May 21, 2020, which claims the priority to and benefits of International Patent Application No. PCT/CN2019/087987, filed on May 22, 2019. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, matrix-based intra prediction methods for video coding are described. The described methods may be applied to both the existing video coding standards (e.g., High Efficiency Video Coding (HEVC)) and future video coding standards (e.g., Versatile Video Coding (VVC)) or codecs.

A first example method of video processing includes performing a conversion between a current video block of a video and a bitstream representation of the current video block using a matrix based intra prediction (MIP) mode in which a prediction block of the current video block is determined by performing, on previously coded samples of the video, a boundary downsampling operation, followed by a matrix vector multiplication operation, and followed by an upsampling operation, where the upsampling operation is performed, in both a vertical direction and a horizontal direction in a fixed order, on samples obtained from the matrix vector multiplication operation.

A second example method of video processing includes performing a conversion between a current video block of a video and a bitstream representation of the current video block using a matrix based intra prediction (MIP) mode in which a prediction block of the current video block is determined by performing, on previously coded samples of the video, a boundary downsampling operation, followed by a matrix vector multiplication operation, and followed by an upsampling operation, where the conversion includes performing a transposing operation prior to the upsampling operation, where the transposing operation transposes a first set of samples of the prediction block obtained by performing the boundary downsampling operation and the matrix vector multiplication operation, and where the transposing operation is performed according to dimensions of the prediction block.

A third example method of video processing includes performing a conversion between a current video block of a video and a bitstream representation of the current video block using a matrix based intra prediction (MIP) mode in which a prediction block of the current video block is determined by performing, on previously coded samples of the video, a boundary downsampling operation, followed by a matrix vector multiplication operation, and followed by an upsampling operation, where the upsampling operation is performed by selecting and using an interpolation filter other than a bilinear filter according to a rule.

In another representative aspect, the disclosed technology may be used to provide a method for video processing. This exemplary method includes determining that a current video block is coded using an affine linear weighted intra prediction (ALWIP) mode, constructing, based on the determining, at least a portion of a most probable mode (MPM) list for the ALWIP mode based on an at least a portion of an MPM list for a non-ALWIP intra mode, and performing, based on the MPM list for the ALWIP mode, a conversion between the current video block and a bitstream representation of the current video block.

In another representative aspect, the disclosed technology may be used to provide a method for video processing. This exemplary method includes determining that a luma component of a current video block is coded using an affine linear weighted intra prediction (ALWIP) mode, inferring, based on the determining, a chroma intra mode, and performing, based on the chroma intra mode, a conversion between the current video block and a bitstream representation of the current video block.

In yet another representative aspect, the disclosed technology may be used to provide a method for video processing. This exemplary method includes determining that a current video block is coded using an affine linear weighted intra prediction (ALWIP) mode, and performing, based on the determining, a conversion between the current video block and a bitstream representation of the current video block.

In yet another representative aspect, the disclosed technology may be used to provide a method for video processing. This exemplary method includes determining that a current video block is coded using a coding mode different from an affine linear weighted intra prediction (ALWIP) mode, and performing, based on the determining, a conversion between the current video block and a bitstream representation of the current video block.

In yet another representative aspect, the disclosed technology may be used to provide a method for video processing. This exemplary method includes generating, for a current video block, a first prediction using an affine linear weighted intra prediction (ALWIP) mode, generating, based on the first prediction, a second prediction using position dependent intra prediction combination (PDPC), and performing, based on the second prediction, a conversion between the current video block and a bitstream representation of the current video block.

In yet another representative aspect, the disclosed technology may be used to provide a method for video processing. This exemplary method includes determining that a current video block is coded using an affine linear weighted intra prediction (ALWIP) mode, predicting, based on the ALWIP mode, a plurality of sub-blocks of the current video block, and performing, based on the predicting, a conversion between the current video block and a bitstream representation of the current video block.

In yet another representative aspect, a method of video processing is disclosed. The method includes determining, based on a rule for a current video block, a context of a flag indicative of use of affine linear weighted intra prediction (ALWIP) mode during a conversion between the current video block and a bitstream representation of the current video block, predicting, based on the ALWIP mode, a plurality of sub-blocks of the current video block and performing, based on the predicting, the conversion between the current video block and a bitstream representation of the current video block.

In yet another representative aspect, a method of video processing is disclosed. The method includes determining that a current video block is coded using an affine linear weighted intra prediction (ALWIP) mode, and performing, during a conversion between the current video block and a bitstream representation of the current video block, at least two filtering stages on samples of the current video block in an upsampling process associated with the ALWIP mode, wherein a first precision of the samples in a first filtering stage of the at least two filtering stages is different from a second precision of the samples in a second filtering stage of the at least two filtering stages.

In yet another aspect, a method of video processing is disclosed. The method includes determining that a current video block is coded using an affine linear weighted intra prediction (ALWIP) mode, performing, during a conversion between the current video block and a bitstream representation of the current video block, at least two filtering stages on samples of the current video block in an upsampling process associated with the ALWIP mode, wherein the upsampling process is performed in a fixed order for a case in which both vertical and horizontal upsampling is performed.

In yet another aspect, a method of video processing is disclosed. The method includes determining that a current video block is coded using an affine linear weighted intra prediction (ALWIP) mode, performing, during a conversion between the current video block and a bitstream representation of the current video block, at least two filtering stages on samples of the current video block in an upsampling process associated with the ALWIP mode, wherein the conversion includes performing a transposing operation prior to the upsampling process.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIGS. 21-23 show flowcharts of three example methods for matrix-based intra prediction, in accordance with the disclosed technology.

DETAILED DESCRIPTION

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

1 A BRIEF REVIEW ON HEVC

1.1 Intra Prediction in HEVC/H.265

Intra prediction involves producing samples for a given TB (transform block) using samples previously reconstructed in the considered color channel. The intra prediction mode is separately signaled for the luma and chroma channels, with the chroma channel intra prediction mode optionally dependent on the luma channel intra prediction mode via the 'DM_CHROMA' mode. Although the intra prediction mode is signaled at the PB (prediction block) level, the intra prediction process is applied at the TB level, in accordance with the residual quad-tree hierarchy for the CU, thereby allowing the coding of one TB to have an effect on the coding of the next TB within the CU, and therefore reducing the distance to the samples used as reference values.

Figure 1:
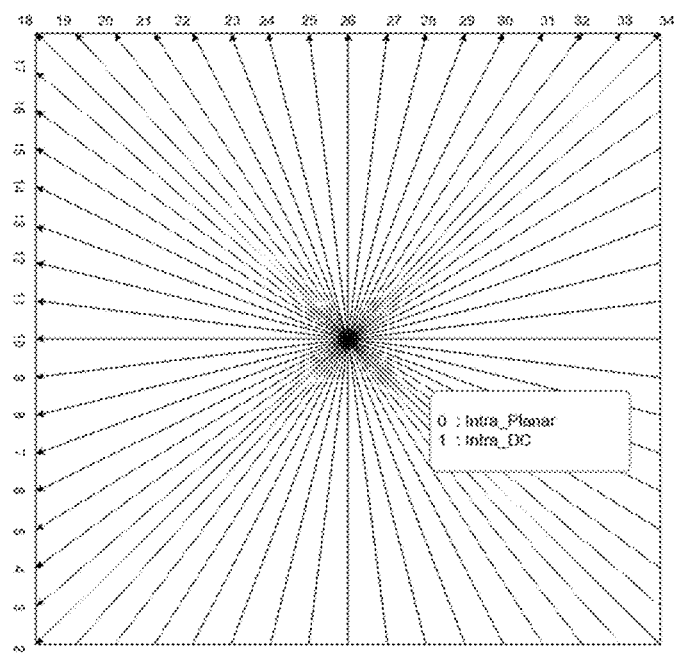
FIG. 1 shows an example of 33 intra prediction directions.

HEVC includes 35 intra prediction modes—a DC mode, a planar mode and 33 directional, or 'angular' intra prediction modes. The 33 angular intra prediction modes are illustrated in FIG. 1.

For PBs associated with chroma color channels, the intra prediction mode is specified as either planar, DC, horizontal, vertical, 'DM_CHROMA' mode or sometimes diagonal mode '34'.

Note for chroma formats 4:2:2 and 4:2:0, the chroma PB may overlap two or four (respectively) luma PBs; in this case the luma direction for DM_CHROMA is taken from the top left of these luma PBs.

The DM_CHROMA mode indicates that the intra prediction mode of the luma color channel PB is applied to the chroma color channel PBs. Since this is relatively common, the most-probable-mode coding scheme of the intra_chroma_pred_mode is biased in favor of this mode being selected.

Figure 2:
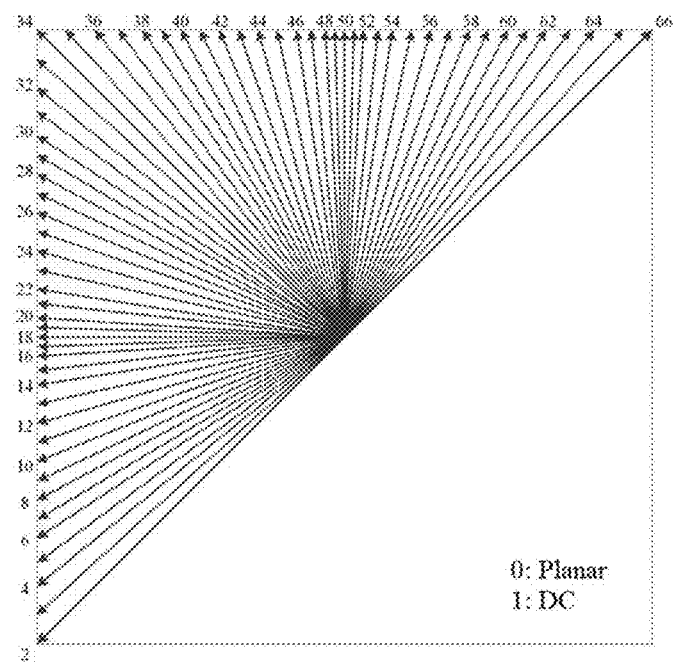
FIG. 2 shows an example of 67 intra prediction modes.

2 EXAMPLES OF INTRA PREDICTION IN VVC 2.1 Intra Mode Coding with 67 Intra Prediction Modes To capture the arbitrary edge directions presented in natural video, the number of directional intra modes is extended from 33, as used in HEVC, to 65. The additional directional modes are depicted as red dotted arrows in FIG. 2, and the planar and DC modes remain the same. These denser directional intra prediction modes apply for all block sizes and for both luma and chroma intra predictions.

2.2 Examples of the Cross-Component Linear Model (CCLM)

In some embodiments, and to reduce the cross-component redundancy, a cross-component linear model (CCLM) prediction mode (also referred to as LM), is used in the JEM, for which the chroma samples are predicted based on the reconstructed luma samples of the same CU by using a linear model as follows:

$$pred_C(i, j) = \alpha \cdot rec'_L(i, j) + \beta \quad (1)$$

Figure 3:
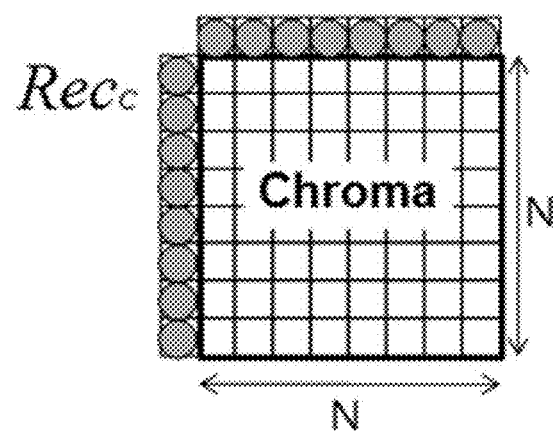
FIG. 3 shows an example of locations of samples used for the derivation of the weights of the linear model.
Figure 3:
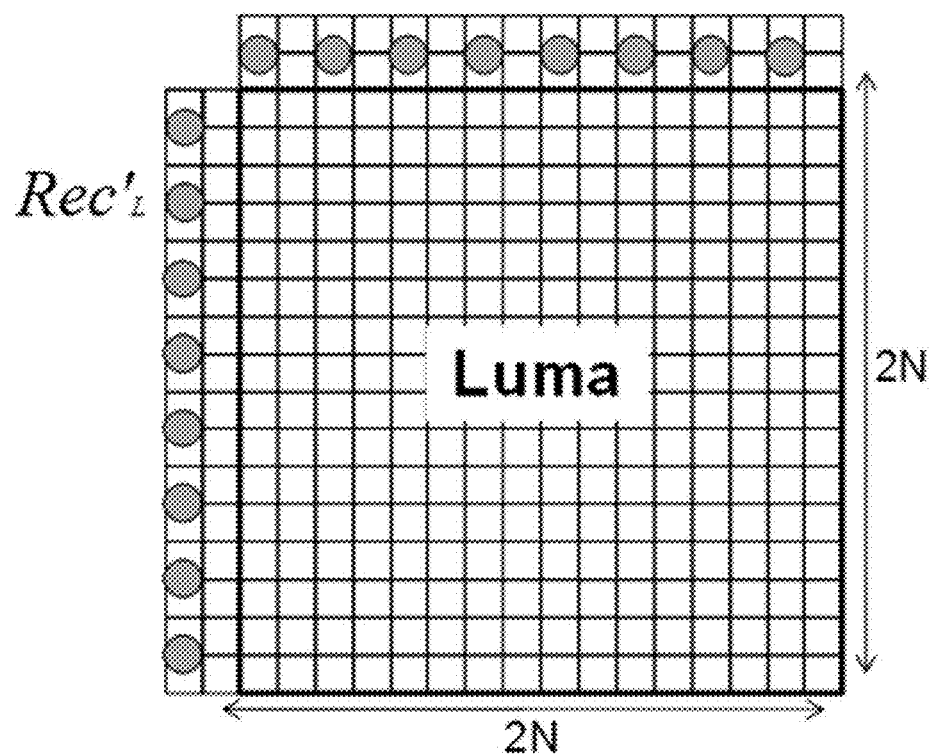

Here, $pred_C(i,j)$ represents the predicted chroma samples in a CU and $rec_L'(i,j)$ represents the downsampled reconstructed luma samples of the same CU. Linear model parameter $\alpha$ and $\beta$ are derived from the relation between luma values and chroma values from two samples, which are luma sample with minimum sample value and with maximum sample inside the set of downsampled neighboring luma samples, and their corresponding chroma samples. FIG. 3 shows an example of the location of the left and above samples and the sample of the current block involved in the CCLM mode.

This parameter computation is performed as part of the decoding process, and is not just as an encoder search operation. As a result, no syntax is used to convey the $\alpha$ and $\beta$ values to the decoder.

For chroma intra mode coding, a total of 8 intra modes are allowed for chroma intra mode coding. Those modes include five traditional intra modes and three cross-component linear model modes (CCLM, LM_A, and LM_L). Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

2.3 Multiple Reference Line (MRL) Intra Prediction

Figure 4:
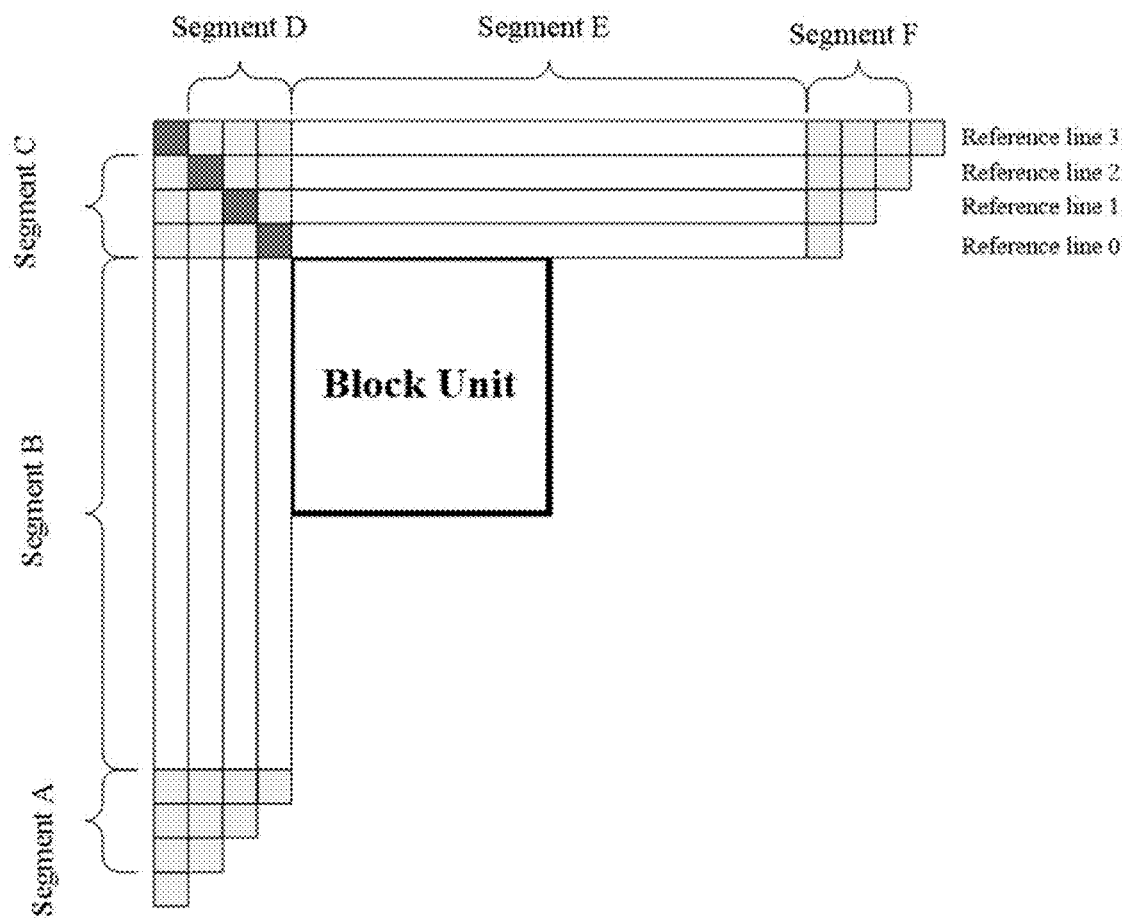
FIG. 4 shows an example of four reference lines neighboring a prediction block.

Multiple reference line (MRL) intra prediction uses more reference lines for intra prediction. In FIG. 4, an example of 4 reference lines is depicted, where the samples of segments A and F are not fetched from reconstructed neighboring samples but padded with the closest samples from Segment B and E, respectively. HEVC intra-picture prediction uses the nearest reference line (i.e., reference line 0). In MRL, 2 additional lines (reference line 1 and reference line 3) are used. The index of selected reference line (mrl_idx) is signalled and used to generate intra predictor. For reference line idx, which is greater than 0, only include additional reference line modes in MPM list and only signal mpm index without remaining mode.

2.4 Intra Sub-Partitions (ISP)

Figure 5A:
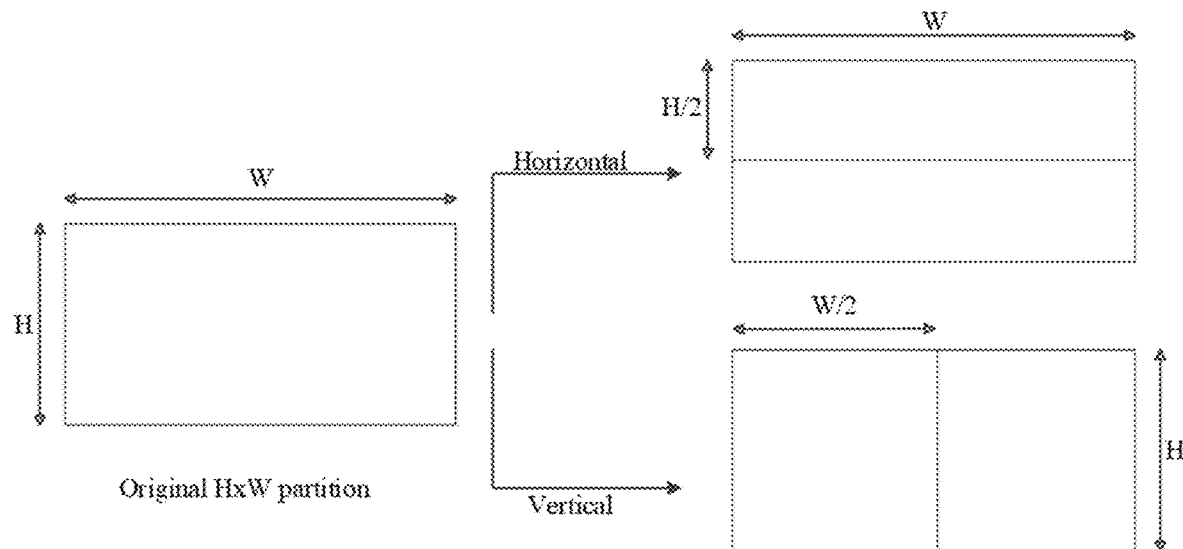
FIG. 5A and FIG. 5B show examples of sub-partitions depending on block size.
Figure 5B:
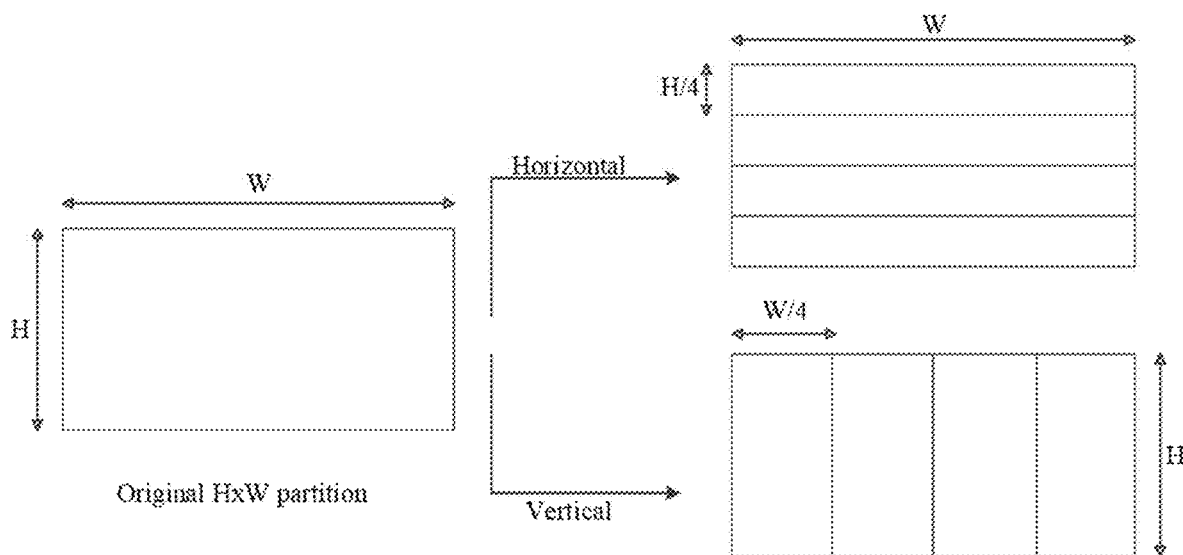
Figure 6:
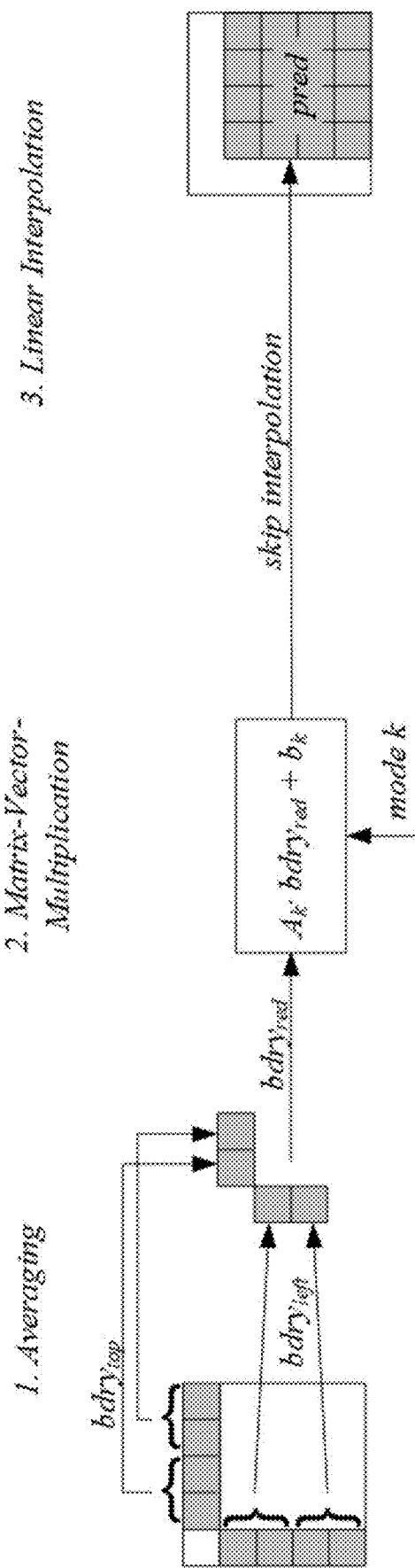
FIG. 6 shows an example of ALWIP for 4×4 blocks.
Figure 7:
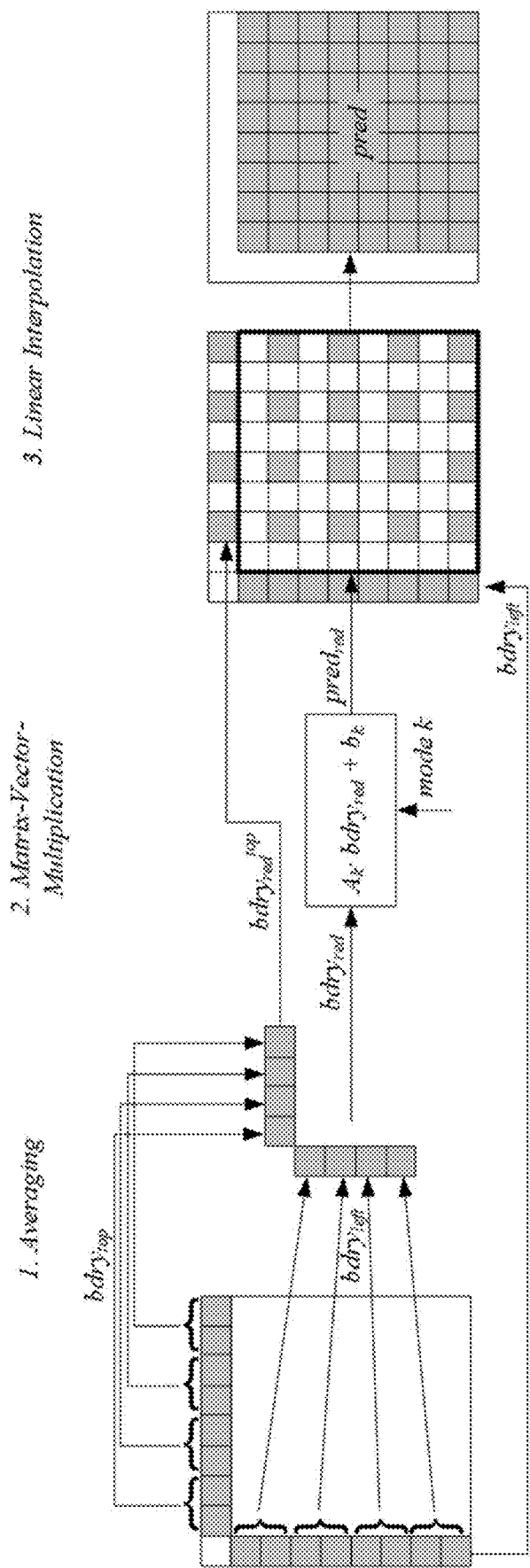
FIG. 7 shows an example of ALWIP for 8×8 blocks.
Figure 8:
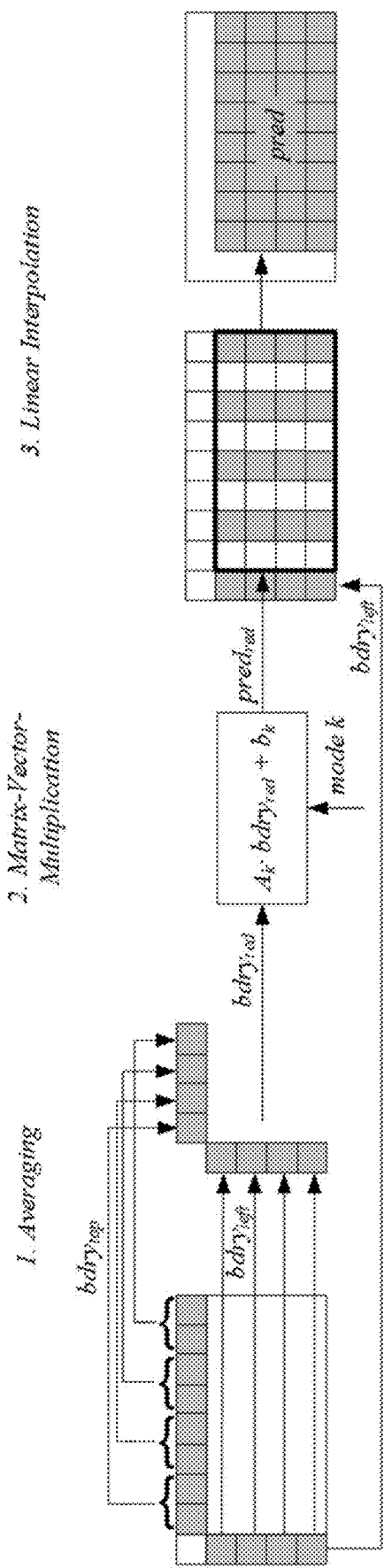
FIG. 8 shows an example of ALWIP for 8×4 blocks.
Figure 9:
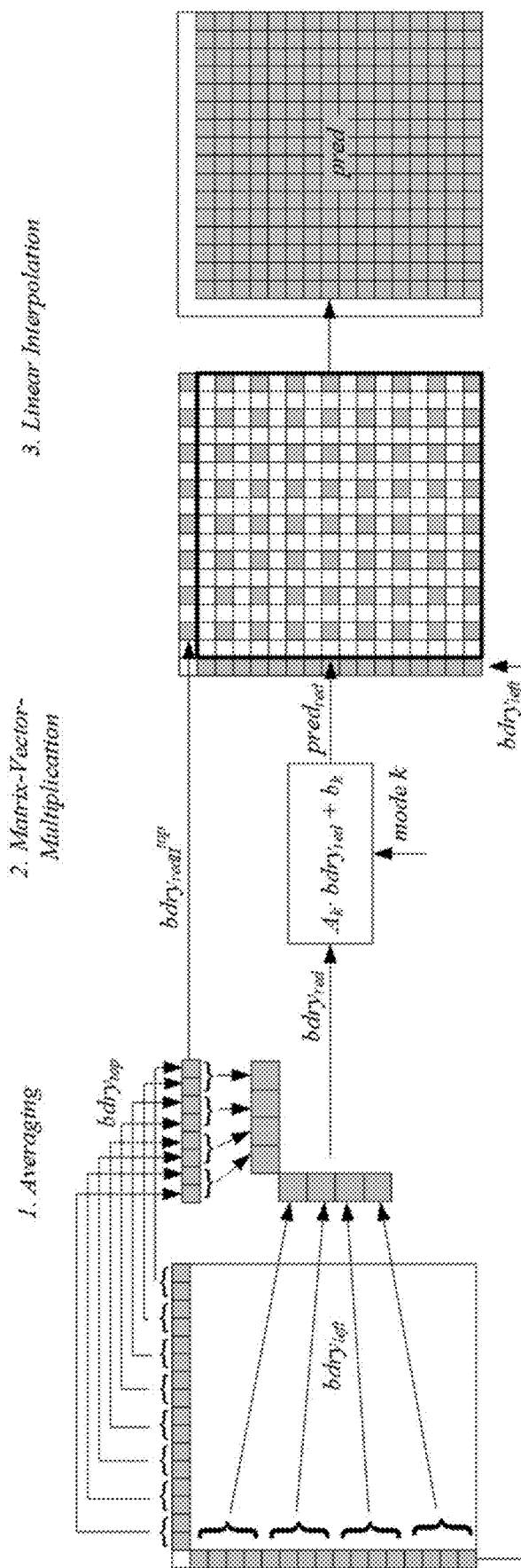
FIG. 9 shows an example of ALWIP for 16×16 blocks.

The Intra Sub-Partitions (ISP) tool divides luma intra-predicted blocks vertically or horizontally into 2 or 4 sub-partitions depending on the block size. For example, minimum block size for ISP is 4×8 (or 8×4). If block size is greater than 4×8 (or 8×4) then the corresponding block is divided by 4 sub-partitions. FIGS. 5A and 5B show examples of the two possibilities. All sub-partitions fulfill the condition of having at least 16 samples.

For each sub-partition, reconstructed samples are obtained by adding the residual signal to the prediction signal. Here, a residual signal is generated by the processes such as entropy decoding, inverse quantization and inverse transform. Therefore, the reconstructed sample values of each sub-partition are available to generate the prediction of the next sub-partition, and each sub-partition is processed repeatedly. In addition, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. All sub-partitions share the same intra mode.

2.5 Affine Linear Weighted Intra Prediction (ALWIP or Matrix-Based Intra Prediction)

Affine linear weighted intra prediction (ALWIP, a.k.a. Matrix based intra prediction (MIP)) is proposed in JVET-N0217.

In JVET-N0217, two tests are conducted. In test 1, ALWIP is designed with a memory restriction of 8K bytes and at most 4 multiplications per sample. Test 2 is similar to test 1, but further simplifies the design in terms of memory requirement and model architecture.

Single set of matrices and offset vectors for all block shapes.

Reduction of number of modes to 19 for all block shapes.

Reduction of memory requirement to 5760 10-bit values, that is 7.20 Kilobyte.

Linear interpolation of predicted samples is carried out in a single step per direction replacing iterative interpolation as in the first test.

2.5.1 Test 1 of JVET-N0217

For predicting the samples of a rectangular block of width W and height H, affine linear weighted intra prediction (ALWIP) takes one line of H reconstructed neighboring boundary samples left of the block and one line of W reconstructed neighboring boundary samples above the block as input. If the reconstructed samples are unavailable, they are generated as it is done in the conventional intra prediction.

The generation of the prediction signal is based on the following three steps:

Out of the boundary samples, four samples in the case of W=H=4 and eight samples in all other cases are extracted by averaging.

A matrix vector multiplication, followed by addition of an offset, is carried out with the averaged samples as an input. The result is a reduced prediction signal on a subsampled set of samples in the original block.

The prediction signal at the remaining positions is generated from the prediction signal on the subsampled set by linear interpolation which is a single step linear interpolation in each direction.

The matrices and offset vectors needed to generate the prediction signal are taken from three sets $S_0$, $S_1$, $S_2$ of matrices. The set $S_0$ consists of 18 matrices $A_0^i$, $i \in \{0, \ldots, 17\}$ each of which has 16 rows and 4 columns and 18 offset vectors $b_0^i$, $i \in \{0, \ldots, 17\}$ each of size 16. Matrices and offset vectors of that set are used for blocks of size 4×4. The set $S_1$ consists of 10 matrices $A_1^i$, $i \in \{0, \ldots, 9\}$, each of which has 16 rows and 8 columns and 10 offset vectors $b_1^i$, $i \in \{0, \ldots, 9\}$ each of size 16. Matrices and offset vectors of that set are used for blocks of sizes 4×8, 8×4 and 8×8. Finally, the set $S_2$ consists of 6 matrices $A_2^i$, $i \in \{0, \ldots, 5\}$, each of which has 64 rows and 8 columns and of 6 offset vectors $b_2^i$, $i \in \{0, \ldots, 5\}$ of size 64. Matrices and offset vectors of that set or parts of these matrices and offset vectors are used for all other block-shapes.

The total number of multiplications needed in the computation of the matrix vector product is always smaller than or equal to 4×W×H. In other words, at most four multiplications per sample are required for the ALWIP modes.

2.5.2 Averaging of the Boundary

In a first step, the input boundaries $bdry^{top}$ and $bdry^{left}$ are reduced to smaller boundaries $bdry_{red}^{top}$ and $bdry_{red}^{left}$. Here, $bdry_{red}^{top}$ and $bdry_{red}^{left}$ both consists of 2 samples in the case of a 4×4-block and both consist of 4 samples in all other cases.

In the case of a 4×4-block, for $0 \leq i < 2$, one defines $$bdry_{red}^{top}[i] = \left(\left(\sum_{j=0}^{1} bdry^{top}[i \cdot 2 + j]\right) + 1\right) \gg 1$$

and defines $bdry_{red}^{left}$ analogously.

Otherwise, if the block-width W is given as $W=4 \cdot 2^k$, for $0 \leq i < 4$, one defines $$bdry_{red}^{top}[i] = \left(\left(\sum_{j=0}^{2^k-1} bdry^{top}[i \cdot 2^k + j]\right) + (1 \ll (k-1))\right) \gg k$$

and defines $bdry_{red}^{left}$ analogously.

The two reduced boundaries $bdry_{red}^{top}$ and $bdry_{red}^{left}$ are concatenated to a reduced boundary vector $bdry_{red}$ which is thus of size four for blocks of shape 4×4 and of size eight for blocks of all other shapes. If mode refers to the ALWIP-mode, this concatenation is defined as follows:

$$bdry_{red} = \begin{cases} [bdry_{red}^{top}, bdry_{red}^{left}] & \text{for } W = H = 4 \text{ and } \text{mode} < 18 \\ [bdry_{red}^{left}, bdry_{red}^{top}] & \text{for } W = H = 4 \text{ and } \text{mode} \geq 18 \\ [bdry_{red}^{top}, bdry_{red}^{left}] & \text{for } \max(W, H) = 8 \text{ and } \text{mode} < 10 \\ [bdry_{red}^{left}, bdry_{red}^{top}] & \text{for } \max(W, H) = 8 \text{ and } \text{mode} \geq 10 \\ [bdry_{red}^{top}, bdry_{red}^{left}] & \text{for } \max(W, H) > 8 \text{ and } \text{mode} < 6 \\ [bdry_{red}^{left}, bdry_{red}^{top}] & \text{for } \max(W, H) > 8 \text{ and } \text{mode} \geq 6 \end{cases}$$

Finally, for the interpolation of the subsampled prediction signal, on large blocks a second version of the averaged boundary is needed. Namely, if $\min(W,H)>8$ and $W \geq H$, one writes $W=8 \cdot 2^l$, and, for $0 \leq i < 8$, defines $$bdry_{redII}^{top}[i] = \left(\left(\sum_{j=0}^{2^l-1} bdry^{top}[i \cdot 2^l + j]\right) + (1 \ll (l-1))\right) \gg l.$$

If $\min(W,H)>8$ and $H>W$, one defines $bdry_{redII}^{left}$ analogously.

2.5.3 Generation of the Reduced Prediction Signal by Matrix Vector Multiplication Out of the reduced input vector $bdry_{red}$ one generates a reduced prediction signal $pred_{red}$. The latter signal is a signal on the downsampled block of width $W_{red}$ and height $H_{red}$. Here, $W_{red}$ and $H_{red}$ are defined as:

$$W_{red} = \begin{cases} 4 & \text{for } \max(W, H) \leq 8 \\ \min(W, 8) & \text{for } \max(W, H) > 8 \end{cases}$$

$$H_{red} = \begin{cases} 4 & \text{for } \max(W, H) \leq 8 \\ \min(H, 8) & \text{for } \max(W, H) > 8 \end{cases}$$

The reduced prediction signal $pred_{red}$ is computed by calculating a matrix vector product and adding an offset:

$$pred_{red} = A \cdot bdry_{red} + b$$

Here, A is a matrix that has $W_{red} \cdot H_{red}$ rows and 4 columns if W=H=4 and 8 columns in all other cases. b is a vector of size $W_{red} \cdot H_{red}$.

The matrix A and the vector b are taken from one of the sets $S_0$, $S_1$, $S_2$ as follows. One defines an index idx=idx(W, H) as follows:

$$idx(W, H) = \begin{cases} 0 & \text{for } W = H = 4 \\ 1 & \text{for } \max(W, H) = 8 \\ 2 & \text{for } \max(W, H) > 8 \end{cases}.$$

Moreover, one puts m as follows:

$$m = \begin{cases} \text{mode} & \text{for } W = H = 4 \text{ and mode} < 18 \\ \text{mode} - 17 & \text{for } W = H = 4 \text{ and mode} \geq 18 \\ \text{mode} & \text{for } \max(W, H) = 8 \text{ and mode} < 10 \\ \text{mode} - 9 & \text{for } \max(W, H) = 8 \text{ and mode} \geq 10 \\ \text{mode} & \text{for } \max(W, H) > 8 \text{ and mode} < 6 \\ \text{mode} - 5 & \text{for } \max(W, H) > 8 \text{ and mode} \geq 6 \end{cases}.$$

Then, if idx≤1 or idx=2 and min(W,H)>4, one puts $A = A_{idx}^m$ and $b = b_{idx}^m$. In the case that idx=2 and min(W,H)=4, one lets A be the matrix that arises by leaving out every row of $A_{idx}^m$ that, in the case W=4, corresponds to an odd x-coordinate in the downsampled block, or, in the case H=4, corresponds to an odd y-coordinate in the downsampled block.

Finally, the reduced prediction signal is replaced by its transpose in the following cases:
W=H=4 and mode≥18
max(W,H)=8 and mode≥10
max(W,H)>8 and mode≥6

The number of multiplications required for calculation of $pred_{red}$ is 4 in the case of W=H=4 since in this case A has 4 columns and 16 rows. In all other cases, A has 8 columns and $W_{red} \cdot H_{red}$ rows and one immediately verifies that in these cases $8 \cdot W_{red} \cdot H_{red} \leq 4 \cdot W \cdot H$ multiplications are required, i.e. also in these cases, at most 4 multiplications per sample are needed to compute $pred_{red}$.

2.5.4 Illustration of the Entire ALWIP Process

The entire process of averaging, matrix vector multiplication and linear interpolation is illustrated for different shapes in FIGS. 6-9. Note, that the remaining shapes are treated as in one of the depicted cases.

1. Given a 4×4 block, ALWIP takes two averages along each axis of the boundary. The resulting four input samples enter the matrix vector multiplication. The matrices are taken from the set $S_0$. After adding an offset, this yields the 16 final prediction samples. Linear interpolation is not necessary for generating the prediction signal. Thus, a total of (4·16)/(4·4)=4 multiplications per sample are performed.

2. Given an 8×8 block, ALWIP takes four averages along each axis of the boundary. The resulting eight input samples enter the matrix vector multiplication. The matrices are taken from the set $S_1$. This yields 16 samples on the odd positions of the prediction block. Thus, a total of (8·16)/(8·8)=2 multiplications per sample are performed. After adding an offset, these samples are interpolated vertically by using the reduced top boundary. Horizontal interpolation follows by using the original left boundary.

3. Given an 8×4 block, ALWIP takes four averages along the horizontal axis of the boundary and the four original boundary values on the left boundary. The resulting eight input samples enter the matrix vector multiplication. The matrices are taken from the set $S_1$. This yields 16 samples on the odd horizontal and each vertical positions of the prediction block. Thus, a total of (8·16)/(8·4)=4 multiplications per sample are performed. After adding an offset, these samples are interpolated horizontally by using the original left boundary.

4. Given a 16×16 block, ALWIP takes four averages along each axis of the boundary. The resulting eight input samples enter the matrix vector multiplication. The matrices are taken from the set $S_2$. This yields 64 samples on the odd positions of the prediction block. Thus, a total of (8·64)/(16·16)=2 multiplications per sample are performed. After adding an offset, these samples are interpolated vertically by using eight averages of the top boundary. Horizontal interpolation follows by using the original left boundary. The interpolation process, in this case, does not add any multiplications. Therefore, totally, two multiplications per sample are required to calculate ALWIP prediction.

For larger shapes, the procedure is essentially the same and it is easy to check that the number of multiplications per sample is less than four.

For W×8 blocks with W>8, only horizontal interpolation is necessary as the samples are given at the odd horizontal and each vertical positions.

Finally for W×4 blocks with W>8, let A_kbe the matrix that arises by leaving out every row that corresponds to an odd entry along the horizontal axis of the downsampled block. Thus, the output size is 32 and again, only horizontal interpolation remains to be performed.

The transposed cases are treated accordingly.

2.5.5 Single Step Linear Interpolation

For a W×H block with max(W,H)≥8, the prediction signal arises from the reduced prediction signal $pred_{red}$ on $W_{red} \times H_{red}$ by linear interpolation. Depending on the block shape, linear interpolation is done in vertical, horizontal or both directions. If linear interpolation is to be applied in both directions, it is first applied in horizontal direction if W<H and it is first applied in vertical direction, else.

Consider without loss of generality a W×H block with max(W,H)≥8 and W≥H. Then, the one-dimensional linear interpolation is performed as follows. Without loss of generality, it suffices to describe linear interpolation in vertical direction. First, the reduced prediction signal is extended to the top by the boundary signal. Define the vertical upsampling factor $U_{ver} = H/H_{red}$ and write $U_{ver} = 2^{u_{ver}} > 1$. Then, define the extended reduced prediction signal by $$pred_{red}[x][-1] = \begin{cases} bdry_{red}^{top}[x] & \text{for } W = 8 \\ bdry_{redII}^{top}[x] & \text{for } W > 8 \end{cases}.$$

Then, from this extended reduced prediction signal, the vertically linear interpolated prediction signal is generated by $$pred_{red}^{ups,ver}[x][U_{ver} \cdot y + k] =$$

$$\left( (U_{ver} - k - 1) \cdot pred_{red}[x][y-1] + (k+1) \cdot pred_{red}[x][y] + \frac{U_{ver}}{2} \right) \gg u_{ver}$$

for $$0 \leq x < W_{red}, 0 \leq y < H_{red} \text{ and } 0 \leq k < U_{ver}.$$

2.5.6 Signalization of the Proposed Intra Prediction Modes

For each Coding Unit (CU) in intra mode, a flag indicating if an ALWIP mode is to be applied on the corresponding Prediction Unit (PU) or not is sent in the bitstream. The signalization of the latter index is harmonized with MRL in the same way as in JVET-M0043. If an ALWIP mode is to be applied, the index predmode of the ALWIP mode is signaled using a MPM-list with 3 MPMS.

Here, the derivation of the MPMs is performed using the intra-modes of the above and the left PU as follows. There are three fixed tables map_angular_to_alwip$_{idx}$, idx∈{0,1,2} that assign to each conventional intra prediction mode predmode$_{Angular}$ an ALWIP mode predmode$_{ALWIP}$=map_angular_to_alwip$_{idx}$[predmode$_{Angular}$]

For each PU of width W and height H one defines an index idx(PU)=idx(W,H)∈{0,1,2} that indicates from which of the three sets the ALWIP-parameters are to be taken as in Section 2.5.3.

If the above Prediction Unit PU$_{above}$ is available, belongs to the same CTU as the current PU and is in intra mode, if idx(PU)=idx(PU$_{above}$) and if ALWIP is applied on PU$_{above}$ with ALWIP-mode predmode$_{ALWIP}^{above}$, one puts mode$_{ALWIP}^{above}$=predmode$_{ALWIP}^{above}$.

If the above PU is available, belongs to the same CTU as the current PU and is in intra mode and if a conventional intra prediction mode predmode$_{Angular}^{above}$ is applied on the above PU, one puts mode$_{ALWIP}^{above}$=map_angular_to_alwiP$_{idx(PU_{above})}$[predmode$_{Angular}^{above}$]

In all other cases, one puts mode$_{ALWIP}^{above}$=−1, which means that this mode is unavailable. In the same way but without the restriction that the left PU needs to belong to the same CTU as the current PU, one derives a mode mode$_{ALWIP}^{left}$.

Finally, three fixed default lists list$_{idx}$, idx∈{0,1,2} are provided, each of which contains three distinct ALWIP modes. Out of the default list list$_{idx(PU)}$ and the modes mode$_{ALWIP}^{above}$ and mode$_{ALWIP}^{left}$, one constructs three distinct MPMs by substituting −1 by default values as well as eliminating repetitions.

Figure 10:
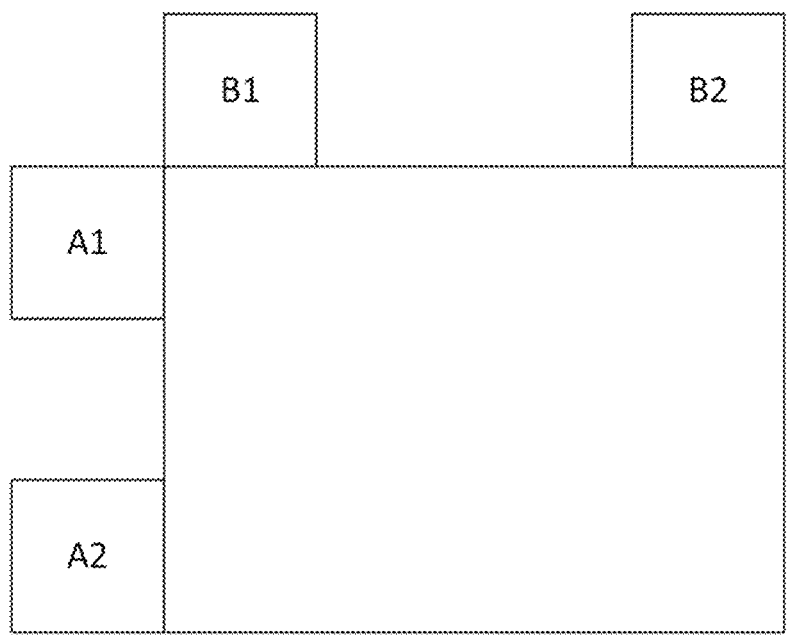
FIG. 10 shows an example of neighboring blocks using in MPM list construction.

The left neighboring block and above neighboring block used in the ALWIP MPM list construction is A1 and B1 as shown in FIG. 10.

2.5.7 Adapted MPM-List Derivation for Conventional Luma and Chroma Intra-Prediction Modes The proposed ALWIP-modes are harmonized with the MPM-based coding of the conventional intra-prediction modes as follows. The luma and chroma MPM-list derivation processes for the conventional intra-prediction modes uses fixed tables map_alwip_to_angular$_{idx}$, idx∈{0,1,2}, mapping an ALWIP-mode predmode$_{ALWIP}$ on a given PU to one of the conventional intra-prediction modes predmode$_{Angular}$=map_alwip_to_angular$_{idx(PU)}$[predmode$_{ALWIP}$]

For the luma MPM-list derivation, whenever a neighboring luma block is encountered which uses an ALWIP-mode predmode$_{ALWIP}$, this block is treated as if it was using the conventional intra-prediction mode predmode$_{Angular}$. For the chroma MPM-list derivation, whenever the current luma block uses an LWIP-mode, the same mapping is used to translate the ALWIP-mode to a conventional intra prediction mode.

2.5.8 Corresponding Modified Working Draft

In some embodiments, as described in this section, portions related to intra_lwip_flag, intra_lwip_mpm_flag, intra_lwip_mpm_idx and intra_lwip_mpm_remainder have been added to the working draft based on embodiments of the disclosed technology.

In some embodiments, as described in this section, the <begin> and <end> tags are used to denote additions and modifications to the working draft based on embodiments of the disclosed technology.

Syntax Tables

Coding Unit Syntax

| coding_unit( x0, y0, cbWidth, cbHeight, treeType ) { | Descriptor |
|---|---|
|   if( tile_group_type != I \| \| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && tile_group_type != I ) | |
|       pred_mode_flag | ae(v) |
|     if( ( ( tile_group_type = = I && cu_skip_flag[ x0 ][ y0 ] = =0 ) \| \| | |
|       ( tile_group_type != I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \| \| treeType = = DUAL_TREE_LUMA ) { | |
|         if( Abs( Log2( cbWidth ) − Log2( cbHeight ) ) <= 2 ) | |
|           intra_lwip_flag[ x0 ][ y0 ] | ae(v) |
|         if( intra_lwip_flag[ x0 ][ y0 ] ) { | |
|           intra_lwip_mpm_flag[ x0 ][ y0 ] | ae(v) |
|           if( intra_lwip_mpm_flag[ x0 ][ y0 ] ) | |
|             intra_lwip_mpm_idx[ x0 ][ y0 ] | ae(v) |
|           else | |
|             intra_lwip_mpm_remainder[ x0 ][ y0 ] | ae(v) |
|         } else { | |

-continued

| coding_unit( x0, y0, cbWidth, cbHeight, treeType ) { | Descriptor |
|---|---|
|     if( ( y0 % CtbSizeY ) > 0 ) | |
|       intra_luma_ref_idx[ x0 ][ y0 ] | ae(v) |
|     if (intra_luma_ref_idx[ x0 ][ y0 ] = = 0 && | |
|       ( cbWidth <= MaxTbSizeY \|\| cbHeight <= MaxTbSizeY ) && | |
|       ( cbWidth * cbHeight > MinTbSizeY * MinTbSizeY )) | |
|       intra_subpartitions_mode_flag[ x0 ][ y0 ] | ae(v) |
|     if( intra_subpartitions_mode_flag[ x0 ][ y0 ] = = 1 && | |
|       cbWidth <= MaxTbSizeY && cbHeight <= MaxTbSizeY ) | |
|       intra_subpartitions_split_flag[ x0 ][ y0 ] | ae(v) |
|     if( intra_luma_ref_idx[ x0 ][ y0 ] = = 0 && | |
|       intra_subpartitions_mode_flag[ x0 ][ y0 ] = = 0 ) | |
|       intra_luma_mpm_flag[ x0 ][ y0 ] | ae(v) |
|     if( intra_luma_mpm_flag[ x0 ][ y0 ] ) | |
|       intra_luma_mpm_idx[ x0 ][ y0 ] | ae(v) |
|     else | |
|       intra_luma_mpm_remainder[ x0 ][ y0 ] | ae(v) |
|   } | |
| } | |
| if( treeType = = SINGLE_TREE \|\| treeType = = DUAL_TREE_CHROMA ) | |
|   intra_chroma_pred_mode[ x0 ][ y0 ] | ae(v) |
| } | |
| } else if( treeType != DUAL_TREE_CHROMA ) { /* MODE_INTER or MODE_IBC */ | |
|   ... | |

Semantics

<begin>intra_lwip_flag[x0][y0] equal to 1 specifies that the intra prediction type for luma samples is affine linear weighted intra prediction. intra_lwip_flag[x0][y0] equal to 0 specifies that the intra prediction type for luma samples is not affine linear weighted intra prediction.

When intra_lwip_flag[x0][y0] is not present, it is inferred to be equal to 0.

The syntax elements intra_lwip_mpm_flag[x0][y0], intra_lwip_mpm_idx[x0][y0] and intra_lwip_mpm_remainder [x0][y0] specify the affine linear weighted intra prediction mode for luma samples. The array indices x0, y0 specify the location (x0, y0) of the top-left luma sample of the considered coding block relative to the top-left luma sample of the picture. When intra_lwip_mpm_flag[x0][y0] is equal to 1, the affine linear weighted intra prediction mode is inferred from a neighboring intra-predicted coding unit according to clause 8.4.X.

When intra_lwip_mpm_flag[x0][y0] is not present, it is inferred to be equal to 1. <end>
intra_subpartitions_split_flag[x0][y0] specifies whether the intra subpartitions split type is horizontal or vertical. When intra_subpartitions_split_flag[x0][y0] is not present, it is inferred as follows:

If intra_lwip_flag[x0][y0] is equal to 1, intra_subpartitions_split_flag[x0][y0] is inferred to be equal to 0.
  Otherwise, the following applies:
    If cbHeight is greater than MaxTbSizeY, intra_subpartitions_split_flag[x0][y0] is inferred to be equal to 0.
    Otherwise (cbWidth is greater than MaxTbSizeY), intra_subpartitions_split_flag[x0][y0] is inferred to be equal to 1.

Decoding Process 8.4.1 General Decoding Process for Coding Units Coded in Intra Prediction Mode Inputs to this process are:
  a luma location (xCb, yCb) specifying the top-left sample of the current coding block relative to the top-left luma sample of the current picture,
  a variable cbWidth specifying the width of the current coding block in luma samples,
  a variable cbHeight specifying the height of the current coding block in luma samples,
  a variable treeType specifying whether a single or a dual tree is used and if a dual tree is used, it specifies whether the current tree corresponds to the luma or chroma components.

Output of this process is a modified reconstructed picture before in-loop filtering.

The derivation process for quantization parameters as specified in clause 8.7.1 is invoked with the luma location (xCb, yCb), the width of the current coding block in luma samples cbWidth and the height of the current coding block in luma samples cbHeight, and the variable treeType as inputs.

When treeType is equal to SINGLE TREE or treeType is equal to DUAL_TREE_LUMA, the decoding process for luma samples is specified as follows:

If pcm_flag[xCb][yCb] is equal to 1, the reconstructed picture is modified as follows:

$$S_L[xCb+i][yCb+j] = pcm\_sample\_luma[(cbHeight*j)+i] << (BitDepth_Y - PcmBitDepth_Y), \quad (8\text{-}6)$$

with i=0 . . . cbWidth−1, j=0 . . . cbHeight−1
  Otherwise, the following applies:
    1. The luma intra prediction mode is derived as follows:
      If intra_lwip_flag[xCb][yCb] is equal to 1, the derivation process for the affine linear weighted intra prediction mode as specified in clause 8.4.X is invoked with the luma location (xCb, yCb), the width of the current coding block in luma samples cbWidth and the height of the current coding block in luma samples cbHeight as input.
      Otherwise, the derivation process for the luma intra prediction mode as specified in clause 8.4.2 is invoked with the luma location (xCb, yCb), the width of the current coding block in luma samples cbWidth and the height of the current coding block in luma samples cbHeight as input.
    2. The general decoding process for intra blocks as specified in clause 8.4.4.1 is invoked with the luma location (xCb, yCb), the tree type treeType, the variable nTbW set equal to cbWidth, the variable nTbH set equal to cbHeight, the variable predModeIntra set equal to IntraPredModeY[xCb][yCb], and the variable cIdx set equal to 0 as inputs, and the output is a modified reconstructed picture before in-loop filtering.

<begin>

8.4.X Derivation Process for Affine Linear Weighted Intra Prediction Mode

Input to this process are:
- a luma location (xCb, yCb) specifying the top-left sample of the current luma coding block relative to the top-left luma sample of the current picture,
- a variable cbWidth specifying the width of the current coding block in luma samples,
- a variable cbHeight specifying the height of the current coding block in luma samples.

In this process, the affine linear weighted intra prediction mode IntraPredModeY[xCb][yCb] is derived.

IntraPredModeY[xCb][yCb] is derived by the following ordered steps:

1. The neighboring locations (xNbA, yNbA) and (xNbB, yNbB) are set equal to (xCb−1, yCb) and (xCb, yCb−1), respectively.

2. For X being replaced by either A or B, the variables candLwipModeX are derived as follows:
   - The availability derivation process for a block as specified in clause 6.4.X [Ed. (BB): Neighboring blocks availability checking process tbd] is invoked with the location (xCurr, yCurr) set equal to (xCb, yCb) and the neighboring location (xNbY, yNbY) set equal to (xNbX, yNbX) as inputs, and the output is assigned to availableX.
   - The candidate affine linear weighted intra prediction mode candLwipModeX is derived as follows:
     - If one or more of the following conditions are true, candLwipModeX is set equal to −1.
       - The variable availableX is equal to FALSE.
       - CuPredMode[xNbX][yNbX] is not equal to MODE_INTRA and mh_intra_flag[xNbX][yNbX] is not equal to 1.
       - pcm_flag[xNbX][yNbX] is equal to 1.
       - X is equal to 8 and yCb−1 is less than ((yCb>>Ctb Log 2SizeY)<<Ctb Log 2SizeY).
     - Otherwise, the following applies:
       - The size type derivation process for a block as specified in clause 8.4.X.1 is invoked with the width of the current coding block in luma samples cbWidth and the height of the current coding block in luma samples cbHeight as input, and the output is assigned to variable sizeId.
       - If intra_lwip_flag[xNbX][yNbX] is equal to 1, the size type derivation process for a block as specified in clause 8.4.X.1 is invoked with the width of the neighboring coding block in luma samples nbWidthX and the height of the neighboring coding block in luma samples nbHeightX as input, and the output is assigned to variable sizeIdX.
         - If sizeId is equal to sizeIdX, candLwipModeX is set equal to IntraPredModeY[xNbX][yNbX].
         - Otherwise, candLwipModeX is set equal to −1.
       - Otherwise, candLwipModeX is derived using IntraPredModeY[xNbX][yNbX] and sizeId as specified in Table 8-X1.

3. The candLwipModeList[x] with x=0 . . . 2 is derived as follows, using lwipMpmCand[sizeId] as specified in Table 8-X2:

- If candLwipModeA and candLwipModeB are both equal to −1, the following applies:

candLwipModeList[0]=lwipMpmCand[sizeId][0]    (8-X1)

candLwipModeList[1]=lwipMpmCand[sizeId][1]    (8-X2)

candLwipModeList[2]=lwipMpmCand[sizeId][2]    (8-X3)

- Otherwise, the following applies:
     - If candLwipModeA is equal to candLwipModeB or if either candLwipModeA or candLwipModeB is equal to −1, the following applies:

candLwipModeList[0]=(candLwipModeA!=−1)?candLwipModeA:candLwipModeB    (8-X4)

- If candLwipModeList[0] is equal to lwipMpmCand[sizeId][0], the following applies:

candLwipModeList[1]=lwipMpmCand[sizeId][1]    (8-X5)

candLwipModeList[2]=lwipMpmCand[sizeId][2]    (8-X6)

- Otherwise, the following applies:

candLwipModeList[1]=lwipMpmCand[sizeId][0]    (8-X7)

candLwipModeList[2]=(candLwipModeList[0]!=lwipMpmCand[sizeId][1])?lwipMpmCand[sizeId][1]:lwipMpmCand[sizeId][2]    (8-X8)

- Otherwise, the following applies:

candLwipModeList[0]=candLwipModeA    (8-X9)

candLwipModeList[1]=candLwipModeB    (8-X10)

- If candLwipModeA and candLwipModeB are both not equal to lwipMpmCand[sizeId][0], the following applies:

candLwipModeList[2]=lwipMpmCand[sizeId][0]    (8-X11)

- Otherwise, the following applies:
         - If candLwipModeA and candLwipModeB are both not equal to lwipMpmCand[sizeId][1], the following applies:

candLwipModeList[2]=lwipMpmCand[sizeId][1]    (8-X12)

- Otherwise, the following applies:

candLwipModeList[2]=lwipMpmCand[sizeId][2]    (8-X13)

4. IntraPredModeY[xCb][yCb] is derived by applying the following procedure:
   - If intra_lwip_mpm_flag[xCb][yCb] is equal to 1, the IntraPredModeY[xCb][yCb] is set equal to candLwipModeList[intra_lwip_mpm_idx[xCb][yCb]].
   - Otherwise, IntraPredModeY[xCb][yCb] is derived by applying the following ordered steps:
     1. When candLwipModeList[i] is greater than candLwipModeList[j] for i=0 . . . 1 and for each i, j=(i+1) . . . 2, both values are swapped as follows:

(candLwipModeList[i],candLwipModeList[j])=Swap(candLwipModeList[i],candLwipModeList[j])    (8-X14)

2. IntraPredModeY[xCb][yCb] is derived by the following ordered steps:
        i. IntraPredModeY[xCb][yCb] is set equal to intra_lwip_mpm_remainder[xCb][yCb].
        ii. For i equal to 0 to 2, inclusive, when IntraPredModeY[xCb][yCb] is greater than or equal to candLwipModeList[i], the value of IntraPredModeY[xCb][yCb] is incremented by one.

The variable IntraPredModeY[x][y] with x=xCb . . . xCb+cbWidth−1 and y=yCb . . . yCb+cbHeight−1 is set to be equal to IntraPredModeY[xCb][yCb].

8.4.X.1 Derivation Process for Prediction Block Size Type
Input to this process are:
  a variable cbWidth specifying the width of the current coding block in luma samples,
  a variable cbHeight specifying the height of the current coding block in luma samples.
Output of this process is a variable sizeId.
  The variable sizeId is derived as follows:
  If both cbWidth and cbHeight are equal to 4, sizeId is set equal to 0.
  Otherwise, if both cbWidth and cbHeight are less than or equal to 8, sizeId is set equal to 1.
  Otherwise, sizeId is set equal to 2.

TABLE 8-X1

Specification of mapping between intra prediction and affine linear weighted intra prediction modes

| IntraPredModeY[xNbX][yNbX] | block size type sizeId | | |
|---|---|---|---|
| | 0 | 1 | 2 |
| 0 | 17 | 0 | 5 |
| 1 | 17 | 0 | 1 |
| 2, 3 | 17 | 10 | 3 |
| 4, 5 | 9 | 10 | 3 |
| 6, 7 | 9 | 10 | 3 |
| 8, 9 | 9 | 10 | 3 |
| 10, 11 | 9 | 10 | 0 |
| 12, 13 | 17 | 4 | 0 |
| 14, 15 | 17 | 6 | 0 |
| 16, 17 | 17 | 7 | 4 |
| 18, 19 | 17 | 7 | 4 |
| 20, 21 | 17 | 7 | 4 |
| 22, 23 | 17 | 5 | 5 |
| 24, 25 | 17 | 5 | 1 |
| 26, 27 | 5 | 0 | 1 |
| 28, 29 | 5 | 0 | 1 |
| 30, 31 | 5 | 3 | 1 |
| 32, 33 | 5 | 3 | 1 |
| 34, 35 | 34 | 12 | 6 |
| 36, 37 | 22 | 12 | 6 |
| 38, 39 | 22 | 12 | 6 |
| 40, 41 | 22 | 12 | 6 |
| 42, 43 | 22 | 14 | 6 |
| 44, 45 | 34 | 14 | 10 |
| 46, 47 | 34 | 14 | 10 |
| 48, 49 | 34 | 16 | 9 |
| 50, 51 | 34 | 16 | 9 |
| 52, 53 | 34 | 16 | 9 |
| 54, 55 | 34 | 15 | 9 |
| 56, 57 | 34 | 13 | 9 |
| 58, 59 | 26 | 1 | 8 |
| 60, 61 | 26 | 1 | 8 |
| 62, 63 | 26 | 1 | 8 |
| 64, 65 | 26 | 1 | 8 |
| 66 | 26 | 1 | 8 |

TABLE 8-X2

Specification of affine linear weighted intra prediction candidate modes

| | candidate mode | | |
|---|---|---|---|
| | 0 | 1 | 2 |
| lwipMpmCand[0] | 17 | 34 | 5 |
| lwipMpmCand[1] | 0 | 7 | 16 |
| lwipMpmCand[2] | 1 | 4 | 6 |

<end>

8.4.2. Derivation Process for Luma Intra Prediction Mode
Input to this process are:
  a luma location (xCb, yCb) specifying the top-left sample of the current luma coding block relative to the top-left luma sample of the current picture,
  a variable cbWidth specifying the width of the current coding block in luma samples,
  a variable cbHeight specifying the height of the current coding block in luma samples.
In this process, the luma intra prediction mode IntraPredModeY[xCb][yCb] is derived.
Table 8-1 specifies the value for the intra prediction mode IntraPredModeY[xCb][yCb] and the associated names.

TABLE 8-1

Specification of intra prediction mode and associated names

| Intra prediction mode | Associated name |
|---|---|
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

NOTE-:
The intra prediction modes INTRA_LT_CCLM, INTRA_L_CCLM and INTRA_T_CCLM are only applicable to chroma components.

IntraPredModeY[xCb][yCb] is derived by the following ordered steps:
  1. The neighboring locations (xNbA, yNbA) and (xNbB, yNbB) are set equal to (xCb−1, yCb+cbHeight−1) and (xCb+cbWidth−1, yCb−1), respectively.
  2. For X being replaced by either A or B, the variables candIntraPredModeX are derived as follows:
    The availability derivation process for a block as specified in clause <begin>6.4.X [Ed. (BB): Neighboring blocks availability checking process tbd] <end> is invoked with the location (xCurr, yCurr) set equal to (xCb, yCb) and the neighboring location (xNbY, yNbY) set equal to (xNbX, yNbX) as inputs, and the output is assigned to availableX.
  The candidate intra prediction mode candIntraPredModeX is derived as follows:
    If one or more of the following conditions are true, candIntraPredModeX is set equal to INTRA_PLANAR.
      The variable availableX is equal to FALSE.
      CuPredMode[xNbX][yNbX] is not equal to MODE_INTRA and ciip_flag[xNbX][yNbX] is not equal to 1.
      pcm_flag[xNbX][yNbX] is equal to 1.
      X is equal to 8 and yCb−1 is less than ((yCb>>CtbLog 2SizeY)<<CtbLog 2SizeY).
    Otherwise, candIntraPredModeX is derived as follows:
      If intra_lwip_flag[xCb yCb] is equal to 1, candIntraPredModeX is derived by the following ordered steps:
        i. The size type derivation process for a block as specified in clause 8.4.X.1 is invoked with the width of the current coding block in luma samples cbWidth and the height of the current coding block in luma samples cbHeight as input, and the output is assigned to variable sizeId.
        ii. candIntraPredModeX is derived using IntraPredModeY[xNbX][yNbX] and sizeId as specified in Table 8-X3.

Otherwise, candIntraPredModeX is set equal to IntraPredModeY[xNbX][yNbX].
3. The variables ispDefaultMode1 and ispDefaultMode2 are defined as follows:
   If IntraSubPartitionsSplitType is equal to ISP_HOR_SPLIT, ispDefaultMode1 is set equal to INTRA_ANGULAR18 and ispDefaultMode2 is set equal to INTRA_ANGULAR5.
   Otherwise, ispDefaultMode1 is set equal to INTRA_ANGULAR50 and ispDefaultMode2 is set equal to INTRA_ANGULAR63.
. . .

TABLE 8-X3

Specification of mapping between affine linear weighted intra prediction and intra prediction modes

| IntraPredModeY[xNbX][yNbX] | block size type sizeId | | |
|---|---|---|---|
| | 0 | 1 | 2 |
| 0 | | 0 | 1 |
| 1 | 18 | 1 | 1 |
| 2 | 18 | 0 | 1 |
| 3 | 0 | 1 | 1 |
| 4 | 18 | 0 | 18 |
| 5 | 0 | 22 | 0 |
| 6 | 12 | 18 | 1 |
| 7 | 0 | 18 | 0 |
| 8 | 18 | 1 | 1 |
| 9 | 2 | 0 | 50 |
| 10 | 18 | 1 | 0 |
| 11 | 12 | 0 | |
| 12 | 18 | 1 | |
| 13 | 18 | 0 | |
| 14 | 1 | 44 | |
| 15 | 18 | 0 | |
| 16 | 18 | 50 | |
| 17 | 0 | 1 | |
| 18 | 0 | 0 | |
| 19 | 50 | | |
| 20 | 0 | | |
| 21 | 50 | | |
| 22 | 0 | | |
| 23 | 56 | | |
| 24 | 0 | | |
| 25 | 50 | | |
| 26 | 66 | | |
| 27 | 50 | | |
| 28 | 56 | | |
| 29 | 50 | | |
| 30 | 50 | | |
| 31 | 1 | | |
| 32 | 50 | | |
| 33 | 50 | | |
| 34 | 50 | | |

8.4.3 Derivation Process for Chroma Intra Prediction Mode
Input to this process are:
   a luma location (xCb, yCb) specifying the top-left sample of the current chroma coding block relative to the top-left luma sample of the current picture,
   a variable cbWidth specifying the width of the current coding block in luma samples,
   a variable cbHeight specifying the height of the current coding block in luma samples.
In this process, the chroma intra prediction mode IntraPredModeC[xCb][yCb] is derived.
The corresponding luma intra prediction mode lumaIntraPredMode is derived as follows:
   If intra_lwip_flag[xCb][yCb] is equal to 1, lumaIntraPredMode is derived by the following ordered steps:
      i. The size type derivation process for a block as specified in clause 8.4.X.1 is invoked with the width of the current coding block in luma samples cbWidth and the height of the current coding block in luma samples cbHeight as input, and the output is assigned to variable sizeId.
      ii. The luma intra prediction mode is derived using IntraPredModeY[xCb+cbWidth/2][yCb+cbHeight/2]. and sizeId as specified in Table 8-X3 and assigning the value of candIntraPredModeX to lumaIntraPredMode.
   Otherwise, lumaIntraPredMode is set equal to IntraPredModeY[xCb+cbWidth/2][yCb+cbHeight/2].
The chroma intra prediction mode IntraPredModeC[xCb][yCb] is derived using intra_chroma_pred_mode[xCb][yCb] and lumaIntraPredMode as specified in Table 8-2 and Table 8-3.
. . .
xxx. Intra Sample Prediction
<begin>
Inputs to this process are:
   a sample location (xTbCmp, yTbCmp) specifying the top-left sample of the current transform block relative to the top-left sample of the current picture,
   a variable predModeIntra specifying the intra prediction mode,
   a variable nTbW specifying the transform block width,
   a variable nTbH specifying the transform block height,
   a variable nCbW specifying the coding block width,
   a variable nCbH specifying the coding block height,
   a variable cIdx specifying the colour component of the current block.
Outputs of this process are the predicted samples predSamples[x][y], with x=0 . . . nTbW−1, y=0 . . . nTbH−1.
The predicted samples predSamples[x][y] are derived as follows:
   If intra_lwip_flag[xTbCmp][yTbCmp] is equal to 1 and cIdx is equal to 0, the affine linear weighted intra sample prediction process as specified in clause 8.4.4.2.X1 is invoked with the location (xTbCmp, yTbCmp), the intra prediction mode predModeIntra, the transform block width nTbW and height nTbH as inputs, and the output is predSamples.
   Otherwise, the general intra sample prediction process as specified in clause 8.4.4.2.X1. is invoked with the location (xTbCmp, yTbCmp), the intra prediction mode predModeIntra, the transform block width nTbW and height nTbH, the coding block width nCbW and height nCbH, and the variable cIdx as inputs, and the output is predSamples.

8.4.4.2.X1 Affine Linear Weighted Intra Sample Prediction
Inputs to this process are:
   a sample location (xTbCmp, yTbCmp) specifying the top-left sample of the current transform block relative to the top-left sample of the current picture,
   a variable predModeIntra specifying the intra prediction mode,
   a variable nTbW specifying the transform block width,
   a variable nTbH specifying the transform block height.
Outputs of this process are the predicted samples predSamples[x][y], with x=0 . . . nTbW−1, y=0 . . . nTbH−1.
The size type derivation process for a block as specified in clause 8.4.X.1 is invoked with the transform block width nTbW and the transform block height nTbH as input, and the output is assigned to variable sizeId.
Variables numModes, boundarySize, predW, predH and predC are derived using sizeId as specified in Table 8-X4.

TABLE 8-X4

Specification of number of modes, boundary sample size and prediction sizes depending on sizeId

| sizeId | numModes | boundarySize | predW | predH | predC |
|---|---|---|---|---|---|
| 0 | 35 | 2 | 4 | 4 | 4 |
| 1 | 19 | 4 | 4 | 4 | 4 |
| 2 | 11 | 4 | Min (nTbW, 8) | Min (nTbH, 8) | 8 |

The flag isTransposed is derived as follows:

$$\text{isTransposed}=(\text{predModeIntra}>(\text{numModes}/2))?1:0 \quad (8\text{-}X15)$$

The flags needUpsBdryHor and needUpsBdryVer are derived as follows:

$$\text{needUpsBdryHor}=(n\text{Tb}W>\text{pred}W)?\text{TRUE:FALSE} \quad (8\text{-}X16)$$

$$\text{needUpsBdryVer}=(n\text{Tb}H>\text{pred}H)?\text{TRUE:FALSE} \quad (8\text{-}X17)$$

The variables upsBdryW and upsBdryH are derived as follows:

$$\text{upsBdry}W=(n\text{Tb}H>n\text{Tb}W)?n\text{Tb}W:\text{pred}W \quad (8\text{-}X18)$$

$$\text{upsBdry}H=(n\text{Tb}H>n\text{Tb}W)?\text{pred}H:n\text{Tb}H \quad (8\text{-}X19)$$

The variables lwipW and lwipH are derived as follows:

$$\text{lwip}W=(\text{isTransposed}==1)?\text{pred}H:\text{pred}W \quad (8\text{-}X20)$$

$$\text{lwip}H=(\text{isTransposed}==1)?\text{pred}W:\text{pred}H \quad (8\text{-}X21)$$

For the generation of the reference samples refT[x] with x=0 ... nTbW−1 and refL[y] with y=0 ... nTbH−1, the reference sample derivation process as specified in clause 8.4.4.2.X2 is invoked with the sample location (xTbCmp, yTbCmp), the transform block width nTbW, the transform block height nTbH as inputs, and top and left reference samples refT[x] with x=0 ... nTbW−1 and refL[y] with y=0 ... nTbH−1, respectively, as outputs.

For the generation of the boundary samples p[x] with x=0 ... 2*boundarySize−1, the following applies:

The boundary reduction process as specified in clause 8.4.4.2.X3 is invoked for the top reference samples with the block size nTbW, the reference samples refT, the boundary size boundarySize, the upsampling boundary flag needUpsBdryVer, and the upsampling boundary size upsBdryW as inputs, and reduced boundary samples redT[x] with x=0 ... boundarySize−1 and upsampling boundary samples upsBdryT[x] with x=0 ... upsBdryW−1 as outputs.

The boundary reduction process as specified in clause 8.4.4.2.X3 is invoked for the left reference samples with the block size nTbH, the reference samples refL, the boundary size boundarySize, the upsampling boundary flag needUpsBdryHor, and the upsampling boundary size upsBdryH as inputs, and reduced boundary samples redL[x] with x=0 ... boundarySize−1 and upsampling boundary samples upsBdryL[x] with x=0 ... upsBdryH−1 as outputs.

The reduced top and left boundary samples redT and redL are assigned to the boundary sample array p as follows:

If isTransposed is equal to 1, p[x] is set equal to redL[x] with x=0 ... boundarySize−1 and p[x+boundarySize] is set equal to redT[x] with x=0 ... boundarySize−1.

Otherwise, p[x] is set equal to redT[x] with x=0 ... boundarySize−1 and p[x+boundarySize] is set equal to redL[x] with x=0 ... boundarySize−1.

For the intra sample prediction process according to predModeIntra, the following ordered steps apply:

1. The affine linear weighted samples predLwip[x][y], with x=0 ... lwipW−1, y=0 ... lwipH−1 are derived as follows:

The variable modeId is derived as follows:

$$\text{modeId}=\text{predModeIntra}-(\text{isTransposed}==1)?(\text{num-Modes}/2):0 \quad (8\text{-}X22)$$

The weight matrix mWeight[x][y] with x=0 ... 2*boundarySize−1, y=0 ... predC*predC−1 is derived using sizeId and modeId as specified in Table 8-XX [TBD: add weight matrices].

The bias vector vBias[y] with y=0 ... predC*predC−1 is derived using sizeId and modeId as specified in Table 8-XX [TBD: add bias vectors].

The variable sW is derived using sizeId and modeId as specified in Table 8-X5.

The affine linear weighted samples predLwip[x][y], with x=0 ... lwipW−1, y=0 ... lwipH−1 are derived as follows:

$$oW=1<<(sW-1) \quad (8\text{-}X23)$$

$$sB=\text{BitDepth}_Y-1 \quad (8\text{-}X24)$$

$$\text{inc}W=(\text{pred}C>\text{lwip}W)?2:1 \quad (8\text{-}X25)$$

$$\text{inc}H=(\text{pred}C>\text{lwip}H)?2:1 \quad (8\text{-}X26)$$

$$\text{predLwip}[x][y]=(\Sigma_{i=0}^{2+boundarySize-1}m\text{Weight}[i][y*\text{inc}H*\text{pred}C+x*\text{inc}W]*p[i])+(v\text{Bias}[y*\text{inc}H*\text{pred}C+x*\text{inc}W]<<sB)+oW)>>sW \quad (8\text{-}X27)$$

2. The predicted samples predSamples[x][y], with x=0 ... nTbW−1, y=0 ... nTbH−1 are derived as follows:

When isTransposed is equal to 1, predLwip[x][y], with x=0 ... predW−1, y=0 ... predH−1 is set equal to predLwip[y][x].

If needUpsBdryVer is equal to TRUE or needUpsBdryHor is equal to TRUE, the prediction upsampling process as specified in clause 8.4.4.2.X4 is invoked with the input block width predW, the input block height predH, affine linear weighted samples predLwip, the transform block width nTbW, the transform block height nTbH, the upsampling boundary width upsBdryW, the upsampling boundary height upsBdryH, the top upsampling boundary samples upsBdryT, and the left upsampling boundary samples upsBdryL as inputs, and the output is the predicted sample array predSamples.

Otherwise, predSamples[x][y], with x=0 ... nTbW−1, y=0 ... nTbH−1 is set equal to predLwip[x][y].

TABLE 8-X5

Specification of weight shifts sW depending on sizeId and modeId

| | modeId | | | | | | | | | | | | | | | | | |
|---|---|---|---|---|---|---|---|---|---|---|---|---|---|---|---|---|---|---|
| sizeId | 0 | 1 | 2 | 3 | 4 | 5 | 6 | 7 | 8 | 9 | 10 | 11 | 12 | 13 | 14 | 15 | 16 | 17 |
| 0 | 8 | 8 | 8 | 8 | 8 | 8 | 8 | 8 | 8 | 8 | 8 | 8 | 8 | 8 | 8 | 8 | 8 | 8 |
| 1 | 8 | 8 | 8 | 9 | 8 | 8 | 8 | 8 | 9 | 8 | | | | | | | | |
| 2 | 8 | 8 | 8 | 8 | 8 | 8 | | | | | | | | | | | | |

8.4.4.2.X2 Reference Sample Derivation Process

Inputs to this process are:
- a sample location (xTbY, yTbY) specifying the top-left luma sample of the current transform block relative to the top-left luma sample of the current picture,
- a variable nTbW specifying the transform block width,
- a variable nTbH specifying the transform block height.

Outputs of this process are the top and left reference samples refT[x] with x=0 . . . nTbW−1 and refL[y] with y=0 . . . nTbH−1, respectively.

The neighboring samples refT[x] with x=0 . . . nTbW−1 and refL[y] with y=0 . . . nTbH−1 are constructed samples prior to the in-loop filter process and derived as follows:

The top and left neighboring luma locations (xNbT, yNbT) and (xNbL, yNbL) are specified by:

$$(xNbT, yNbT) = (xTbY + x, yTbY - 1) \quad (8\text{-}X28)$$

$$(xNbL, yNbL) = (xTbY - 1, yTbY + y) \quad (8\text{-}X29)$$

The availability derivation process for a block as specified in clause 6.4.X [Ed. (BB): Neighboring blocks availability checking process tbd] is invoked with the current luma location (xCurr, yCurr) set equal to (xTbY, yTbY) and the top neighboring luma location (xNbT, yNbT) as inputs, and the output is assigned to availTop[x] with x=0 . . . nTbW−1.

The availability derivation process for a block as specified in clause 6.4.X [Ed. (BB): Neighboring blocks availability checking process tbd] is invoked with the current luma location (xCurr, yCurr) set equal to (xTbY, yTbY) and the left neighboring luma location (xNbL, yNbL) as inputs, and the output is assigned to availLeft[y] with y=0 . . . nTbH−1.

The top reference samples refT[x] with x=0 . . . nTbW−1 are derived as follows:
  If all availTop[x] with x=0 . . . nTbW−1 are equal to TRUE, the sample at the location (xNbT, yNbT) is assigned to ref[x] with x=0 . . . nTbW−1.
  Otherwise, if availTop[0] is equal to FALSE, all refT[x] with x=0 . . . nTbW−1 are set equal to 1<<(BitDepth$_Y$−1).
  Otherwise, reference samples ref[x] with x=0 . . . nTbW−1 are derived by the following ordered steps:
  1. The variable lastT is set equal to the position x of the first element in the sequence availTop[x] with x=1 . . . nTbW−1 that is equal to FALSE.
  2. For every x=0 . . . lastT−1, the sample at the location (xNbT, yNbT) is assigned to refT[x].
  3. For every x=lastT . . . nTbW−1, refT[x] is set equal to refT[lastT−1].

The left reference samples refL[y] with x=0 . . . nTbH−1 are derived as follows:
  If all availLeft[y] with y=0 . . . nTbH−1 are equal to TRUE, the sample at the location (xNbL, yNbL) is assigned to refL[y] with y=0 . . . nTbH−1.
  Otherwise, if availLeft[0] is equal to FALSE, all refL[y] with y=0 . . . nTbH−1 are set equal to 1<<(BitDepth$_Y$−1).
  Otherwise, reference samples refL[y] with y=0 . . . nTbH−1 are derived by the following ordered steps:
  1. The variable lastL is set equal to the position y of the first element in the sequence availLeft[y] with y=1 . . . nTbH−1 that is equal to FALSE.
  2. For every y=0 . . . lastL−1, the sample at the location (xNbL, yNbL) is assigned to refL[y].
  3. For every y=lastL . . . nTbH−1, refL[y] is set equal to refL[lastL−1].

Specification of the Boundary Reduction Process

Inputs to this process are:
- a variable nTbX specifying the transform block size,
- reference samples refX[x] with x=0 . . . nTbX−1,
- a variable boundarySize specifying the downsampled boundary size,
- a flag needUpsBdryX specifying whether intermediate boundary samples are required for upsampling,
- a variable upsBdrySize specifying the boundary size for upsampling.

Outputs of this process are the reduced boundary samples red[x] with x=0 . . . boundarySize−1 and upsampling boundary samples upsBdryX[x] with x=0 . . . upsBdrySize−1.

The upsampling boundary samples upsBdryX[x] with x=0 . . . upsBdrySize−1 are derived as follows:
  If needUpsBdryX is equal to TRUE and upsBdrySize is less than nTbX, the following applies:

$$u\text{Dwn}=n\text{TbX}/\text{upsBdrySize} \quad (8\text{-}X30)$$

$$\text{upsBdryX}[x]=(\Sigma_{i=0}^{u\text{Dwn}-1}\text{refX}[x*u\text{Dwn}+i]+(1<<(\text{Log} 2(u\text{Dwn})-1)))>>\text{Log } 2(u\text{Dwn}) \quad (8\text{-}X31)$$

Otherwise (upsBdrySize is equal to nTbX), upsBdryX[x] is set equal to refX[x].

The reduced boundary samples redX[x] with x=0 . . . boundarySize−1 are derived as follows:
  If boundarySize is less than upsBdrySize, the following applies:

$$b\text{Dwn}=\text{upsBdrySize}/\text{boundarySize} \quad (8\text{-}X32)$$

$$\text{redX}[x]=(\Sigma_{i=0}^{b\text{Dwn}-1}\text{upsBdryX}[x*b\text{Dwn}+i]+(1<<(\text{Log} 2(b\text{Dwn})-1)))>>\text{Log } 2(b\text{Dwn}) \quad (8\text{-}X33)$$

Otherwise (boundarySize is equal to upsBdrySize), redX[x] is set equal to upsBdryX[x].

8.4.4.2.X4 Specification of the Prediction Upsampling Process

Inputs to this process are:
  a variable predW specifying the input block width,
  a variable predH specifying the input block height,
  affine linear weighted samples predLwip[x][y], with x=0 . . . predW−1, y=0 . . . predH−1,
  a variable nTbW specifying the transform block width,
  a variable nTbH specifying the transform block height,
  a variable upsBdryW specifying the upsampling boundary width,
  a variable upsBdryH specifying the upsampling boundary height,
  top upsampling boundary samples upsBdryT[x] with x=0 . . . upsBdryW−1,
  left upsampling boundary samples upsBdryL[x] with x=0 . . . upsBdryH−1.

Outputs of this process are the predicted samples predSamples[x][y], with x=0 . . . nTbW−1, y=0 . . . nTbH−1.

The sparse predicted samples predSamples[m][n] are derived from predLwip[x][y], with x=0 . . . predW−1, y=0 . . . predH−1 as follows:

$$upHor = nTbW/predW \quad (8\text{-}X34)$$

$$upVer = nTbH/predH \quad (8\text{-}X35)$$

$$predSamples[(x+1)*upHor-1][(y+1)*upVer-1] = predLwip[x][y] \quad (8\text{-}X36)$$

The top boundary samples upsBdryT[x] with x=0 . . . upsBdryW−1 are assigned to predSamples[m][−1] as follows:

$$predSamples[(x+1)*(nTbW/upsBdryW)-1][-1] = upsBdryT[x] \quad (8\text{-}X37)$$

The left boundary samples upsBdryL[y] with y=0 . . . upsBdryH−1 are assigned to predSamples[−1][n] as follows:

$$predSamples[-1][(y+1)*(nTbH/upsBdryH)-1] = upsBdryL[y] \quad (8\text{-}X38)$$

The predicted samples predSamples[x][y], with x=0 . . . nTbW−1, y=0 . . . nTbH−1 are derived as follows:
  If nTbH is greater than nTbW, the following ordered steps apply:
    1. When upHor is greater than 1, horizontal upsampling for all sparse positions (xHor, yHor)=(m*upHor−1, n*upVer−1) with m=0 . . . predW−1, n=1 . . . predH is applied with dX=1 . . . upHor−1 as follows:

$$predSamples[xHor+dX][yHor] = ((upHor-dX)*predSamples[xHor][yHor]+dX*predSamples[xHor+upHor][yHor])/upHor \quad (8\text{-}X39)$$

2. Vertical upsampling for all sparse positions (xVer, yVer)=(m, n*upVer−1) with m=0 . . . nTbW−1, n=0 . . . predH−1 is applied with dY=1 . . . upVer−1 as follows:

$$predSamples[xVer][yxVer+dY] = ((upVer-dY)*predSamples[xVer][yVer]+dY*predSamples[xVer][yVer+upVer])/upVer \quad (8\text{-}X40)$$

Otherwise, the following ordered steps apply:
    1. When upVer is greater than 1, vertical upsampling for all sparse positions (xVer, yVer)=(m*upHor−1, n*upVer−1) with m=1 . . . predW, n=0 . . . predH−1 is applied with dY=1 . . . upVer−1 as specified in (8-X40).
    2. Horizontal upsampling for all sparse positions (xHor, yHor)=(m*upHor−1, n) with m=0 . . . predW−1, n=0 . . . nTbH−1 is applied with dX=1 . . . upHor−1 as specified in (8-X39).
<end>

TABLE 9-9

Syntax elements and associated binarizations

| Syntax structure | Syntax element | Binarization Process | Binarization Input parameters |
|---|---|---|---|
| coding_unit( ) | cu_skip_flag[ ][ ] | FL | cMax = 1 |
| | pred_mode_ibc_flag | FL | cMax = 1 |
| | pred_mode_flag | FL | cMax = 1 |
| | <begin>intra_lwip_flag[ ][ ] | FL | cMax = 1 |
| | intra_lwip_mpm_flag[ ][ ] | FL | cMax = 1 |
| | intra_lwip_mpm_idx[ ][ ] | TR | cMax = 2, cRiceParam = 0 |
| | intra_lwip_mpm_remainder[ ][ ] | FL | cMax = (cbWidth = = 4 && cbHeight = = 4)? 31: ((cbWidth <= 8 && cbHeight <= 8)? 15: 7) |
| | . . . | | |

TABLE 9-15

Assignment of ctxInc to syntax elements with context coded bins

| Syntax element | binIdx 0 | 1 | 2 | 3 | 4 | >=5 |
|---|---|---|---|---|---|---|
| . . . | | | | | | |
| intra_lwip_flag[ ][ ] | terminate (Abs( Log2(cbWidth) − Log2(cbHeight) ) > 1) ? 3 : (0, 1, 2 (clause 9.5.4.2.2)) | na na | na na | na na | na na | na na |

TABLE 9-15-continued

Assignment of ctxInc to syntax elements with context coded bins

| Syntax element | binIdx | | | | | |
|---|---|---|---|---|---|---|
| | 0 | 1 | 2 | 3 | 4 | >=5 |
| intra_lwip_mpm_flag[ ][ ] | 0 | na | na | na | na | na |
| intra_lwip_mpm_idx[ ][ ] | bypass | bypass | na | na | na | na |
| intra_lwip_mpm_remainder[ ][ ] | bypass | bypass | bypass | bypass | bypass | na |

TABLE 9-16

Specification of ctxInc using left and above syntax elements

| Syntax element | condL | condA | ctxSetIdx |
|---|---|---|---|
| ... | | | |
| intra_lwip_flag[x0][y0] | intra_lwip_flag[xNbL][yNbL] | intra_lwip_flag[xNbA][yNbA] | 0 |
| ... | | | |

<end>

Summary of ALWIP

For predicting the samples of a rectangular block of width W and height H, affine linear weighted intra prediction (ALWIP) takes one line of H reconstructed neighboring boundary samples left of the block and one line of W reconstructed neighboring boundary samples above the block as input. If the reconstructed samples are unavailable, they are generated as it is done in the conventional intra prediction. ALWIP is only applied to luma intra block. For chroma intra block, the conventional intra coding modes are applied.

The generation of the prediction signal is based on the following three steps:

1. Out of the boundary samples, four samples in the case of W=H=4 and eight samples in all other cases are extracted by averaging.
2. A matrix vector multiplication, followed by addition of an offset, is carried out with the averaged samples as an input. The result is a reduced prediction signal on a subsampled set of samples in the original block.
3. The prediction signal at the remaining positions is generated from the prediction signal on the subsampled set by linear interpolation which is a single step linear interpolation in each direction.

If an ALWIP mode is to be applied, the index predmode of the ALWIP mode is signaled using a MPM-list with 3 MPMS. Here, the derivation of the MPMs is performed using the intra-modes of the above and the left PU as follows. There are three fixed tables map_angular_to_alwip$_{idx}$, idx$\in\{0,1,2\}$ that assign to each conventional intra prediction mode predmode$_{Angular}$ an ALWIP mode predmode$_{ALWIP}$=map_angular_to_alwip$_{idx}$[predmode$_{Angular}$].

For each PU of width W and height H one defines an index idx(PU)=idx(W,H)$\in\{0,1,2\}$ that indicates from which of the three sets the ALWIP-parameters are to be taken.

If the above Prediction Unit PU$_{above}$ is available, belongs to the same CTU as the current PU and is in intra mode, if idx(PU)=idx(PU$_{above}$) and if ALWIP is applied on PU$_{above}$ with ALWIP-mode predmode$_{ALWIP}^{above}$, one puts mode$_{ALWIP}^{above}$=predmode$_{ALWIP}^{above}$.

If the above PU is available, belongs to the same CTU as the current PU and is in above intra mode and if a conventional intra prediction mode predmode$_{Angular}^{above}$ is applied on the above PU, one puts mode$_{ALWIP}^{above}$=map_angular_to_alwip$_{idx(PU_{above})}$[predmode$_{Angular}^{above}$].

In all other cases, one puts mode$_{ALWIP}^{above}$=−1 which means that this mode is unavailable. In the same way but without the restriction that the left PU needs to belong to the same CTU as the current PU, one derives a mode mode$_{ALWIP}^{left}$.

Finally, three fixed default lists list$_{idx}$, idx$\in\{0,1,2\}$ are provided, each of which contains three distinct ALWIP modes. Out of the default list list$_{idx(PU)}$ and the modes mode$_{ALWIP}^{above}$ and mode$_{ALWIP}^{left}$, one constructs three distinct MPMs by substituting −1 by default values as well as eliminating repetitions.

For the luma MPM-list derivation, whenever a neighboring luma block is encountered which uses an ALWIP-mode predmode$_{ALWIP}$, this block is treated as if it was using the conventional intra-prediction mode predmode$_{Angular}$.

predmode$_{Angular}$=map_alwip_to_angular$_{idx(PU)}$[predmode$_{ALWIP}$]

3 TRANSFORM IN VVC

3.1 Multiple Transform Selection (MTS)

In addition to DCT-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII.

3.2 Reduced Secondary Transform (RST) proposed in JVET-N0193

Reduced secondary transform (RST) applies 16×16 and 16×64 non-separable transform for 4×4 and 8×8 blocks, respectively. Primary forward and inverse transforms are still performed the same way as two 1-D horizontal/vertical transform passes. Secondary forward and inverse transforms are a separate process step from that of primary transforms. For encoder, primary forward transform is performed first, then followed by secondary forward transform and quantization, and CABAC bit encoding. For decoder, CABAC bit decoding and inverse quantization, then Secondary inverse transform is performed first, then followed by primary inverse transform. RST applies only to intra coded TUs in both intra slice and inter slices.

3.3 A Unified MPM List for Intra Mode Coding in JVET-N0185

A unified 6-MPM list is proposed for intra blocks irrespective of whether Multiple Reference Line (MRL) and Intra sub-partition (ISP) coding tools are applied or not. The MPM list is constructed based on intra modes of the left and above neighboring block as in VTM4.0. Suppose the mode of the left is denoted as Left and the mode of the above block is denoted as Above, the unified MPM list is constructed as follows:

When a neighboring block is not available, its intra mode is set to Planar by default.
If both modes Left and Above are non-angular modes:
a. MPM list→{Planar, DC, V, H, V−4, V+4}
If one of modes Left and Above is angular mode, and the other is non-angular:
a. Set a mode Max as the larger mode in Left and Above
b. MPM list→{Planar, Max, DC, Max−1, Max+1, Max−2}
If Left and Above are both angular and they are different:
a. Set a mode Max as the larger mode in Left and Above
b. if the difference of mode Left and Above is in the range of 2 to 62, inclusive
  i. MPM list→{Planar, Left, Above, DC, Max−1, Max+1}
c. Otherwise
  i. MPM list→{Planar, Left, Above, DC, Max−2, Max+2}
If Left and Above are both angular and they are the same:
a. MPM list→{Planar, Left, Left−1, Left+1, DC, Left−2}

Besides, the first bin of the MPM index codeword is CABAC context coded. In total three contexts are used, corresponding to whether the current intra block is MRL enabled, ISP enabled, or a normal intra block.

The left neighboring block and above neighboring block used in the unified MPM list construction is A2 and B2 as shown in FIG. 10.

One MPM flag is firstly coded. If the block is coded with one of mode in the MPM list, an MPM index is further coded. Otherwise, an index to the remaining modes (excluding MPMs) is coded.

4 EXAMPLES OF DRAWBACKS IN EXISTING IMPLEMENTATIONS

The design of ALWIP in JVET-N0217 has the following problems:

1) At the March 2019 JVET meeting, a unified 6-MPM list generation was adopted for MRL mode, ISP mode, and normal intra mode. But the affine linear weighted prediction mode uses a different 3-MPM list construction which makes the MPM list construction complicated. A complex MPM list construction might compromise the throughput of the decoder, in particular for small blocks such as 4×4 samples.
2) ALWIP is only applied to luma component of the block. For the chroma component of an ALWP coded block, a chroma mode index is coded and sent to decoder, which could result in unnecessary signaling.
3) The interactions of ALWIP with other coding tools should be considered.
4) When calculating upsBdryX in upsBdryX[x]= $(\Sigma_{i=0}^{uDwn-1} \text{refX}[x*\text{uDwn}+i]+(1<<(\text{Log } 2(\text{uDwn})-1)))>>\text{Log } 2(\text{uDwn})$ (8-X31), it is possible that Log 2(uDwn)−1 is equal to −1, while left shifted with −1 is undefined.
5) When upsampling the prediction samples, no rounding is applied.
6) In the deblocking process, ALWIP coded blocks are treated as normal intra-blocks.
7) Too many contexts (e.g., 4) are used in coding ALWIP flag (e.g., intra_lwip_flag).
8) When both vertical up-sampling and horizontal up-sampling are required, the up-sampling order depends on block shape. This is not hardware friendly.
9) Linear interpolation filter is used for up-sampling, which may be inefficient.

5 EXEMPLARY METHODS FOR MATRIX-BASED INTRA CODING

Embodiments of the presently disclosed technology overcome drawbacks of existing implementations, thereby providing video coding with higher coding efficiencies but lower computational complexity. Matrix-based intra prediction methods for video coding, and as described in the present document, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

In the following discussion, an intra-prediction mode refers to an angular intra prediction mode (including DC, planar, CCLM and other possible intra prediction modes); while an intra mode refers to normal intra mode, or MRL, or ISP or ALWIP.

In the following discussion, "Other intra modes" may refer to one or multiple intra modes except ALWIP, such as normal intra mode, or MRL, or ISP.

In the following discussion, SatShift(x, n) is defined as $$SatShift(x, n) = \begin{cases} (x + offset0) \gg n & \text{if } x \geq 0 \\ -((-x + offset1) \gg n) & \text{if } x < 0 \end{cases}$$

Shift(x, n) is defined as Shift(x, n)=(x+offset0)>>n.

In one example, offset0 and/or offset1 are set to (1<<n)>>1 or (1<<(n−1)). In another example, offset0 and/or offset1 are set to 0.

In another example, offset0=offset1=((1<<n)>>1)−1 or ((1<<(n−1)))−1.

Clip3(min, max, x) is defined as $$Clip3(\text{Min, Max}, x) = \begin{cases} \text{Min} & \text{if } x < \text{Min} \\ \text{Max} & \text{if } x > \text{Max} \\ x & \text{Otherwise} \end{cases}$$

MPM List Construction for ALWIP
1. It is proposed that the whole or partial of the MPM list for ALWIP may be constructed according to the whole or partial procedure to construct the MPM list for non-ALWIP intra mode (such as normal intra mode, MRL, or ISP).

a. In one example, the size of the MPM list for ALWIP may be the same as that of the MPM list for non-ALWIP intra mode.
   i. For example, the size of MPM list is 6 for both ALWIP and non-ALWIP intra modes.
b. In one example, the MPM list for ALWIP may be derived from the MPM list for non-ALWIP intra mode.
   i. In one example, the MPM list for non-ALWIP intra mode may be firstly constructed. Afterwards, partial or all of them may be converted to the MPMs which may be further added to the MPM list for ALWIP coded blocks.
      1) Alternatively, furthermore, when adding a converted MPM to the MPM list for ALWIP coded blocks, pruning may be applied.
      2) Default modes may be added to the MPM list for ALWIP coded blocks.
         a. In one example, default modes may be added before those converted from the MPM list of non-ALWIP intra mode.
         b. Alternatively, default modes may be added after those converted from the MPM list of non-ALWIP intra mode.
         c. Alternatively, default modes may be added in an interleaved way with those converted from the MPM list of non-ALWIP intra mode.
         d. In one example, the default modes may be fixed to be the same for all kinds of blocks.
         e. Alternatively, the default modes may be determined according to coded information, such as availability of neighboring blocks, mode information of neighboring blocks, block dimension.
   ii. In one example, one intra-prediction mode in the MPM list for non-ALWIP intra mode may be converted to its corresponding ALWIP intra-prediction mode, when it is put into the MPM list for ALWIP.
      1) Alternatively, all the intra-prediction modes in the MPM list for non-ALWIP intra modes may be converted to corresponding ALWIP intra-prediction modes before being used to construct the MPM list for ALWIP.
      2) Alternatively, all the candidate intra-prediction modes (may include the intra-prediction modes from neighboring blocks and default intra-prediction modes such as Planar and DC) may be converted to corresponding ALWIP intra-prediction modes before being used to construct the MPM list for non-ALWIP intra modes, if the MPM list for non-ALWIP intra modes may be further used to derive the MPM list for ALWIP.
      3) In one example, two converted ALWIP intra-prediction modes may be compared.
         a. In one example, if they are the same, only one of them may be put into the MPM list for ALWIP.
         b. In one example, if they are the same, only one of them may be put into the MPM list for non-ALWIP intra modes.
   iii. In one example, K out of S intra-prediction modes in the MPM list for non-ALWIP intra modes may be picked as the MPM list for ALWIP mode. E.g., K is equal to 3 and S is equal to 6.
      1) In one example, the first K intra-prediction modes in the MPM list for non-ALWIP intra modes may be picked as the MPM list for ALWIP mode.
2. It is proposed that the one or multiple neighboring blocks used to derive the MPM list for ALWIP may also be used to used derive the MPM list for non-ALWIP intra modes (such as normal intra mode, MRL, or ISP).
   a. In one example, the neighboring block left to the current block used to derive the MPM list for ALWIP should be the same as that used to derive the MPM list for non-ALWIP intra modes.
      i. Suppose the top-left corner of the current block is (xCb, yCb), the width and height of the current block are W and H, then in one example, the left neighboring block used to derive the MPM list for both ALWIP and non-ALWIP intra modes may cover the position (xCb−1, yCb). In an alternative example, the left neighboring block used to derive the MPM list for both ALWIP and non-ALWIP intra modes may cover the position (xCb−1, yCb+H−1).
      ii. For example, the left neighboring block and above neighboring block used in the unified MPM list construction is A2 and B2 as shown in FIG. 10.
   b. In one example, the neighboring block above to the current block used to derive the MPM list for ALWIP should be the same as that used to derive the MPM list for non-ALWIP intra modes.
      i. Suppose the top-left corner of the current block is (xCb, yCb), the width and height of the current block are W and H, then in one example, the above neighboring block used to derive the MPM list for both ALWIP and non-ALWIP intra modes may cover the position (xCb, yCb−1). In an alternative example, the above neighboring block used to derive the MPM list for both ALWIP and non-ALWIP intra modes may cover the position (xCb+W−1, yCb−1).
      ii. For example, the left neighboring block and above neighboring block used in the unified MPM list construction is A1 and B1 as shown in FIG. 10.
3. It is proposed that the MPM list for ALWIP may be constructed in different ways according to the width and/or height of the current block.
   a. In one example, different neighboring blocks may be accessed for different block dimensions.
4. It is proposed that the MPM list for ALWIP and the MPM list for non-ALWIP intra modes may be constructed with the same procedure but with different parameters.
   a. In one example, K out of S intra-prediction modes in the MPM list construction procedure of non-ALWIP intra modes may be derived for the MPM list used in ALWIP mode. E.g., K is equal to 3 and S is equal to 6.
      i. In one example, the first K intra-prediction modes in the MPM list construction procedure may be derived for the MPM list used in ALWIP mode.
   b. In one example, the first mode in the MPM list may be different.
      i. For example, the first mode in the MPM list for non-ALWIP intra modes may be Planar, but it may be a Mode X0 in the MPM list for ALWIP.
         1) In one example, X0 may be the ALWIP intra-prediction mode converted from Planar.

c. In one example, stuffing modes in the MPM list may be different.
  i. For example, the first three stuffing modes in the MPM list for non-ALWIP intra modes may be DC, Vertical and Horizontal, but they may be Mode X1, X2, X3 in the MPM list for ALWIP.
    1) In one example, X1, X2, X3 may be different for different sizeId.
  ii. In one example, the number of stuffing mode may be different.
d. In one example, neighboring modes in the MPM list may be different.
  i. For example, the normal intra-prediction modes of neighboring blocks are used to construct the MPM list for non-ALWIP intra modes. And they are converted to ALWIP intra-prediction modes to construct the MPM list for ALWIP mode.
e. In one example, the shifted modes in the MPM list may be different.
  i. For example, X+K0 where X is a normal intra-prediction mode and K0 is an integer may be put into the MPM list for non-ALWIP intra modes. And Y+K1 where Y is an ALWIP intra-prediction mode and K1 is an integer may be put into the MPM list for ALWIP, where K0 may be different from K1.
    1) In one example, K1 may depend on the width and height.
5. It is proposed that a neighboring block is treated as unavailable if it is coded with ALWIP when constructing the MPM list for the current block with non-ALWIP intra modes.
  a. Alternatively, a neighboring block is treated as being coded with a predefined intra-prediction mode (such as Planar) if it is coded with ALWIP when constructing the MPM list for the current block with non-ALWIP intra modes.
6. It is proposed that a neighboring block is treated as unavailable if it is coded with non-ALWIP intra modes when constructing the MPM list for the current block with ALWIP mode.
  a. Alternatively, a neighboring block is treated as being coded with a predefined ALWIP intra-prediction mode X if it is coded with non-ALWIP intra modes when constructing the MPM list for the current block with ALWIP mode.
    i. In one example, X may depend on the block dimensions, such as width and/or height.
7. It is proposed to remove the storage of ALWIP flag from line buffer.
  a. In one example, when the $2^{nd}$ block to be accessed is located in a different LCU/CTU row/region compared to the current block, the conditional check of whether the $2^{nd}$ block is coded with ALWIP is skipped.
  b. In one example, when the $2^{nd}$ block to be accessed is located in a different LCU/CTU row/region compared to the current block, the $2^{nd}$ block is treated in the same way as non-ALWIP mode, such as treated as normal intra coded block.
8. When encoding the ALWIP flag, no more than K (K>=0) contexts may be used.
  a. In one example, K=1.
9. It is proposed to store the converted intra prediction mode of ALWIP coded blocks instead of directly storing the mode index associated with the ALWIP mode.
  a. In one example, the decoded mode index associated with one ALWIP coded block is mapped to the normal intra mode, such as according to map_alwip_to_angular as described in Section 2.5.7.
  b. Alternatively, furthermore, the storage of ALWIP flag is totally removed.
  c. Alternatively, furthermore, the storage of ALWIP mode is totally removed.
  d. Alternatively, furthermore, condition check of whether one neighboring/current block is coded with ALWIP flag may be skipped.
  e. Alternatively, furthermore, the conversion of modes assigned for ALWIP coded blocks and normal intra predictions associated with one accessed block may be skipped.

ALWIP on Different Color Components
10. It is proposed that an inferred chroma intra mode (e.g., DM mode) might be always applied if the corresponding luma block is coded with ALWIP mode.
  a. In one example, chroma intra mode is inferred to be DM mode without signaling if the corresponding luma block is coded with ALWIP mode.
  b. In one example, the corresponding luma block may be the one covering the corresponding sample of a chroma sample located at a given position (e.g., top-left of current chroma block, center of current chroma block).
  c. In one example, the DM mode may be derived according to the intra prediction mode of the corresponding luma block, such as via mapping the (ALWIP) mode to one of the normal intra mode.
11. When the corresponding luma block of the chroma blocks is coded with ALWIP mode, several DM modes may be derived.
12. It is proposed that a special mode is assigned to the chroma blocks if one corresponding luma block is coded with ALWIP mode.
  a. In one example, the special mode is defined to be a given normal intra prediction mode regardless the intra prediction mode associated with the ALWIP coded blocks.
  b. In one example, different ways of intra prediction may be assigned to this special mode.
13. It is proposed that ALWIP may also be applied to chroma components.
  a. In one example, the matrix and/or bias vector may be different for different color components.
  b. In one example, the matrix and/or bias vector may be predefined jointly for Cb and Cr.
    i. In one example, Cb and Cr component may be concatenated.
    ii. In one example, Cb and Cr component may be interleaved.
  c. In one example, the chroma component may share the same ALWIP intra-prediction mode as the corresponding luma block.
    i. In one example, the same ALWIP intra-prediction mode is applied on the chroma component if the corresponding luma block applies the ALWIP mode and the chroma block is coded with DM mode.
    ii. In one example, the same ALWIP intra-prediction mode is applied on the chroma component and the linear interpolation thereafter can be skipped.
    iii. In one example, the same ALWIP intra-prediction mode is applied on the chroma component with a subsampled matrix and/or bias vector.

d. In one example, the number of ALWIP intra-prediction modes for different component may be different.
    i. For example, the number of ALWIP intra-prediction modes for chroma components may be less than that for luma component for the same block width and height.

Applicability of ALWIP

14. It is proposed that whether ALWIP can be applied may be signaled.
    a. For example, it may be signaled at sequence level (e.g. in SPS), at picture level (e.g. in PPS or picture header), at slice level (e.g. in slice header), at tile group level (e.g. in tile group header), at tile level, at CTU row level, or at CTU level.
    b. For example, intra_lwip_flag may not be signaled and inferred to be 0 if ALWIP cannot be applied.
15. It is proposed that whether ALWIP can be applied may depend on the block width (W) and/or height (H).
    c. For example, ALWIP may not be applied if W>=T1 (or W>T1) and H>=T2 (or H>T2). E.g. T1=T2=32;
        i. For example, ALWIP may not be applied if W<=T1 (or W<T1) and H<=T2 (or H<T2). E.g. T1=T2=32;
    d. For example, ALWIP may not be applied if W>=T1 (or W>T1) or H>=T2 (or H>T2). E.g. T1=T2=32;
        i. For example, ALWIP may not be applied if W<=T1 (or W<T1) or H<=T2 (or H<T2). E.g. T1=T2=32;
    e. For example, ALWIP may not be applied if W+H>=T (or W*H>T). E.g. T=256;
        i. For example, ALWIP may not be applied if W+H<=T (or W+H<T). E.g. T=256;
    f. For example, ALWIP may not be applied if W*H>=T (or W*H>T). E.g. T=256;
        i. For example, ALWIP may not be applied if W*H<=T (or W*H<T). E.g. T=256;
    g. For example, intra_lwip_flag may not be signaled and inferred to be 0 if ALWIP cannot be applied.

Calculation Problems in ALWIP

16. It is proposed that any shift operation involved in ALWIP can only left shift or right shift a number by S, where S must be larger or equal to 0.
    a. In one example, the right shift operation may be different when S is equal to 0 or larger than 0.
        i. In one example, upsBdryX[x] should be calculated as $upsBdryX[x]=(\Sigma_{i=0}^{uDwn-1}refX[x*uDwn+i]+(1<<(Log2(uDwn)-1)))>>Log 2(uDwn)$ when $uDwn>1$, and $upsBdryX[x]=\Sigma_{i=0}^{uDwn-1}refX[x*uDwn+i]$ when $uDwn$ is equal to 1.

b. In one example, upsBdryX[x] should be calculated as $upsBdryX[x]=(\Sigma_{i=0}^{uDwn-1}refX[x*uDwn+i]+(1<<Log2(uDwn)>>1))>>Log 2(uDwn)$ 17. It is proposed that the results should be rounded toward-zero or away-from-zero in the up-sampling process of ALWIP.
    a. In one example, $predSamples[xHor+dX][yHor]=((upHor-dX)*predSamples[xHor][yHor]+dX*predSamples[xHor+upHor][yHor]+offsetHor)/upHor$ (8-X39)

and $predSamples[xVer][yVer+dY]=((upVer-dY)*predSamples[xVer][yVer]+dY*predSamples[xVer][yVer+upVer]+offsetVer)/upVer$ (8-X40)

where offsetHor and offsetVer are integers. For example, offsetHor=upHor/2 and offsetVer=upVer/2.

Interaction with Other Coding Tools

18. It is proposed that ALWIP may be used for a CIIP-coded block.
    a. In one example, in a CIIP-coded block, it may be explicitly signaled whether an ALWIP intra-prediction mode or a normal intra prediction mode such as Planar is used to generate the intra prediction signal.
    b. In one example, it may be implicitly inferred whether an ALWIP intra-prediction mode or a normal intra prediction mode such as Planar may be used to generate the intra prediction signal.
        i. In one example, ALWIP intra-prediction mode may never be used in a CIIP coded block.
            1) Alternatively, normal intra prediction may never be used in a CIIP coded block.
        ii. In one example, it may be inferred from information of neighboring blocks whether an ALWIP intra-prediction mode or a normal intra prediction mode such as Planar is used to generate the intra prediction signal.
19. It is proposed that the whole or partial of the procedure used to down-sample the neighboring luma samples in the CCLM mode may be used to down-sample the neighboring samples in the ALWIP mode.
    a. Alternatively, the whole or partial of the procedure used to down-sample the neighboring luma samples in the ALWIP mode may be used to down-sample the neighboring samples in the CCLM mode.
    b. The down-sampling procedure may be invoked with different parameters/arguments when it is used in the CCLM process and ALWIP process.
    c. In one example, the down-sampling method (such as selection of neighboring luma locations, down-sampling filters) in the CCLM process may be utilized in the ALWIP process.
    d. The procedure used to down-sample the neighboring luma samples at least include the selection of down-sampled positions, the down-sampling filters, the rounding and clipping operations.
20. It is proposed that a block coded with ALWIP mode cannot apply RST or/and secondary transform or/and rotation transform or/and Non-Separable Secondary Transform (NSST).
    a. In one example, whether such constraint may be applied or not may depend on the dimension information of the block, e.g., same as conditions described in (15).
    b. Alternatively, ALWIP mode may be disallowed when RST or/and secondary transform or/and rotation transform or/and NSST is applied.
    c. Alternatively, a block coded with ALWIP mode may apply RST or/and secondary transform or/and rotation transform or/and Non-Separable Secondary Transform (NSST).
        i. In one example, the selection of transform matrix may depend the ALWIP intra-prediction mode.
        ii. In one example, the selection of transform matrix may depend the normal intra-prediction mode which is converted from the ALWIP intra-prediction mode.
        iii. In one example, the selection of transform matrix may depend the classification on the normal intra-prediction mode which is converted from the ALWIP intra-prediction mode.
21. It is proposed that a block coded with ALWIP mode cannot apply Block-based DPCM (BDPCM) or Residue RDPCM.
   a. Alternatively, ALWIP mode may be disallowed when BDPCM or RDPCM is applied.
22. It is proposed that a block coded with ALWIP mode may only use DCT-II as the transform.
   a. In one example, the signalling of transform matrix indices is always skipped.
   b. Alternatively, it is proposed that the transform used for a block coded with ALWIP mode may be implicitly derived instead of explicitly signaled. For example, the transform may be selected following the way proposed in JVET-M0303.
   c. Alternatively, it is proposed that a block coded with ALWIP mode may only use transform skip.
      i. Alternatively, furthermore, when ALWIP is used, the signalling of indication of usage of transform skip is skipped.
   d. In one example, ALWIP mode information (such as enabled/disabled, prediction mode index) may be conditionally signalled after indications of transform matrix.
      i. In one example, for a given transform matrix (such as transform skip or DCT-II), the indications of ALWIP mode information may be signalled.
      ii. Alternatively, furthermore, the indications of ALWIP mode information may be skipped for some pre-defined transform matrices.
23. It is proposed that a block coded with ALWIP mode is regarded to be coded with a normal intra-prediction converted from the ALWIP intra-prediction mode when the selected transform is mode-dependent.
24. ALWIP mode may not use transform skip.
   a. For example, there is no need to further signal the indication of usage of transform skip in this case.
   b. Alternatively, ALWIP mode may be disallowed when transform skip is applied.
      i. For example, there is no need to signal ALWIP mode information when transform skip is applied in this case.
25. In the filtering process, such as deblocking filter, sample adaptive offset (SAO), adaptive loop filter (ALF), how to select the filters and/or whether to filter samples may be determined by the usage of ALWIP.
26. Unfiltered neighboring samples may be used in ALWIP mode.
   a. Alternatively, filtered neighboring samples may be used in ALWIP mode.
   b. In one example, filtered neighboring samples may be used for down sampling and unfiltered neighboring samples may be used for up sampling.
   c. In one example, unfiltered neighboring samples may be used for down sampling and filtered neighboring samples may be used for up sampling.
   d. In one example, filtered left neighboring samples may be used in up sampling and unfiltered above neighboring samples may be used in up sampling.
   e. In one example, unfiltered left neighboring samples may be used in up sampling and filtered above neighboring samples may be used in up sampling.
   f. In one example, whether filter or unfiltered neighboring samples is used may depend on the ALWIP mode.
      i. In one example, ALWIP mode may be converted to traditional intra prediction mode, and whether filtered or unfiltered neighboring samples is used may depend on the converted traditional intra prediction mode. For example, such decision is same as traditional intra prediction modes.
      ii. Alternatively, whether filter or unfiltered neighboring samples is used for ALWIP mode may be signaled.
   g. In one example, the filtered samples may be generated same as traditional intra prediction modes.
27. Which matrices or/and offset vectors are used may depend on reshaping (a.k.a. LMCS, luma mapping with chroma scaling) information.
   a. In one example, different matrices or/and offset vectors may be used when reshaping is on and off.
   b. In one example, different matrices or/and offset vectors may be used for different reshaping parameters.
   c. In one example, ALWIP may be always performed in original domain.
      i. For example, neighboring sample are mapped to the original domain (if reshaping is applied) before used in ALWIP.
28. ALWIP may be disabled when reshaping is applied.
   a. Alternatively, reshaping may be disabled when ALWIP is enabled.
   b. In one example, ALWIP may be disabled for HDR (high dynamic range) content when reshaping is applied.
29. The matrices used in ALWIP may depend on sample bit-depth.
   a. Alternatively, furthermore, the offset values used in ALWIP may depend on sample bit-depth.
   b. Alternatively, the matrix parameters and offset values can be stored in M-bit precision for N-bit samples (M<=N), e.g., the matrix parameters and offset values can be stored in 8-bit precision for a 10-bit sample.
   c. The sample bit-depth may be the bit-depth of input array for a color component such as luma.
   d. The sample bit-depth may be the bit-depth of internal array/reconstructed sample for a color component, such as luma.
30. The matrix parameters and/or offset values for a specified block size may be derived from the matrix parameters and/or offset values for other block sizes.
31. In one example, the 16×8 matrix of 8×8 block can be derived from the 16×4 matrix of 4×4 block.
32. It is proposed that the prediction generated by ALWIP may be treated as an intermedium signal which will be processed to obtain the prediction signal to be further used.
   a. In one example, Position Dependent Intra Prediction Combination (PDPC) may be applied on the prediction generated by ALWIP to generate the prediction signal to be further used.
      i. In one example, PDPC is done on an ALWIP coded block in the same way as the block is coded with a specific normal intra-prediction mode, such as Planar or DC.
      ii. In one example, PDPC is done on an ALWIP coded block in the same way as the block coded with a normal intra-prediction mode which is converted from the ALWIP intra-prediction mode.
      iii. In one example, PDPC is applied on an ALWIP coded block conditionally.

1) For example, PDPC is applied on an ALWIP coded block only when PDPC is applied on the normal intra-prediction mode which is converted from the ALWIP intra-prediction mode.
b. In one example, the boundary samples prediction generated by ALWIP may be filtered with neighbouring samples to generate the prediction signal to be further used.
i. In one example, filtering on boundary samples is done on an ALWIP coded block in the same way as the block is coded with a specific normal intra-prediction mode, such as Planar or DC.
ii. In one example, filtering on boundary samples is done on an ALWIP coded block in the same way as the block coded with a normal intra-prediction mode which is converted from the ALWIP intra-prediction mode.
iii. In one example, filtering on boundary samples is applied on an ALWIP coded block conditionally.
1) For example, filtering on boundary samples is applied on an ALWIP coded block only when filtering on boundary samples is applied on the normal intra-prediction mode which is converted from the ALWIP intra-prediction mode.
33. It is proposed that interpolation filters other than bilinear interpolation filter may be used in the up-sampling process of ALWIP.
a. In one example, 4-tap interpolation filters may be used in the up-sampling process of ALWIP.
i. For example, the 4-tap interpolation filters in VVC used to do the motion compensation for chroma components may be used in the up-sampling process of ALWIP.
ii. For example, the 4-tap interpolation filters in VVC used to do angular intra-prediction may be used in the up-sampling process of ALWIP.
iii. For example, the 8-tap interpolation filters in VVC used to do the motion compensation for luma component may be used in the up-sampling process of ALWIP.
34. Samples within a block coded in ALWIP mode may be predicted in different ways.
a. In one example, for a W*H block, prediction of a sW*sH sub-block within it may be generated by applying sW*sH ALWIP to it.
i. In one example, for a W*H block, prediction of its top-left W/2*H/2 block may be generated by applying W/2*H/2 ALWIP to it.
ii. In one example, for a W*H block, prediction of its left W/2*H block may be generated by applying W/2*H ALWIP to it.
iii. In one example, for a W*H block, prediction of its top W*H/2 block may be generated by applying W*H/2 ALWIP to it.
iv. In one example, the sW*sH sub-block may have available left or/and above neighboring samples.
b. In one example, how to decide the position of the sub-block may depend on dimension of the block.
i. For example, when W>=H, prediction of its left W/2*H block may be generated by applying W/2*H ALWIP to it.
ii. For example, when H>=W, prediction of its top W*H/2 block may be generated by applying W*H/2 ALWIP to it.
iii. For example, when W is equal to H, prediction of its top-left W/2*H/2 block may be generated by applying W/2*H/2 ALWIP to it.
c. In one example, furthermore, prediction of the remaining samples (e.g., samples do not belong to the sW*sH sub-block) may be generated by applying the W*H ALWIP.
i. Alternatively, prediction of the remaining samples may be generated by applying conventional intra prediction (e.g., using the converted intra prediction mode as the intra mode).
ii. Furthermore, calculation may be skipped for samples in the sW*sH sub-block.
35. Samples within a block coded in ALWIP mode may be predicted in sub-block (e.g., with size sW*sH) level.
a. In one example, sW*sH ALWIP may be applied to each sub-block using neighboring reconstructed samples (e.g., for boundary sub-blocks) or/and neighboring predicted samples (e.g., for inner sub-blocks).
b. In one example, sub-blocks may be predicted in raster-scan order.
c. In one example, sub-blocks may be predicted in zigzag order.
d. In one example, width (height) of sub-blocks may be no larger than sWMax (sHMax).
e. In one example, when a block with either width or height or both width and height are both larger than (or equal to) a threshold L, the block may be split into multiple sub-blocks.
f. The threshold L may be pre-defined or signaled in SPS/PPS/picture/slice/tile group/tile level.
i. Alternatively, the thresholds may depend on certain coded information, such as block size, picture type, temporal layer index, etc. al.
36. It is proposed that the neighbouring samples (adjacent or non-adjacent) are filtered before being used in ALWIP.
a. Alternatively, neighbouring samples are not filtered before being used in ALWIP.
b. Alternatively, neighbouring samples are conditionally filtered before being used in ALWIP.
i. For example, neighbouring samples are filtered before being used in ALWIP only when the ALWIP intra-prediction mode is equal to one or some specific values.
37. It is proposed that when coding the ALWIP flag, the method to derive the context for the ALWIP flag in arithmetic coding is the same for all dimensions of the current block.
a. In one example, the method to derive the context for the ALWIP flag in arithmetic coding is the same when (Abs(Log 2(cbWidth)−Log 2(cbHeight))) is larger than 1 or not, where CbWidth and CbHeight are the width and height of the current block, respectively.
b. In one example, the derivation of the context for the ALWIP flag in arithmetic coding only depends on neighboring blocks' ALWIP information and/or the availability of the neighbouring blocks.
i. In one example, multiple neighboring blocks ALWIP information (e.g., intra_lwip_flag) and/or the availability of the neighbouring blocks are directly used. For example, the left and above neighbouring blocks' ALWIP flags and/or the availability of the left and neighbouring blocks are used to derive the context for the ALWIP flag in arithmetic coding. An example is shown in Table 1. Alternatively, furthermore, the context index offset ctxInc=(condL && availableL)+(condA && availableA)+ctxSetIdx*3.

TABLE 1

Specification of ctxInc using left and above syntax elements

| Syntax element | condL | condA | ctxSetIdx |
|---|---|---|---|
| intra_lwip_flag [x0][y0] | intra_lwip_flag [xNbL][yNbL] | intra_lwip_flag [xNbA][yNbA] | 0 | ii. In one example, one of the neighboring block's ALWIP information (e.g., intra_lwip_flag) is used to derive the context for the ALWIP flag in arithmetic coding, and the neighbouring block may be the left neighbouring block. An example is shown in Table 2. Alternatively, furthermore, the context index offset ctxInc=(condL && availableL)+ctxSetIdx*3.

TABLE 2

Specification of ctxInc using left and above syntax elements

| Syntax element | condL | condA | ctxSetIdx |
|---|---|---|---|
| intra_lwip_flag [x0][y0] | intra_lwip_flag [xNbL][yNbL] | | 0 | iii. In one example, one of the neighboring block's ALWIP flag information (e.g., intra_lwip_flag) is used to derive the context for the ALWIP flag in arithmetic coding, and the neighbouring block may be the above neighbouring block. An example is shown in Table 3. Alternatively, furthermore, the context index offset ctxInc=(condA && availableA)+ctxSetIdx*3.

TABLE 3

Specification of ctxInc using left and above syntax elements

Figure 16:
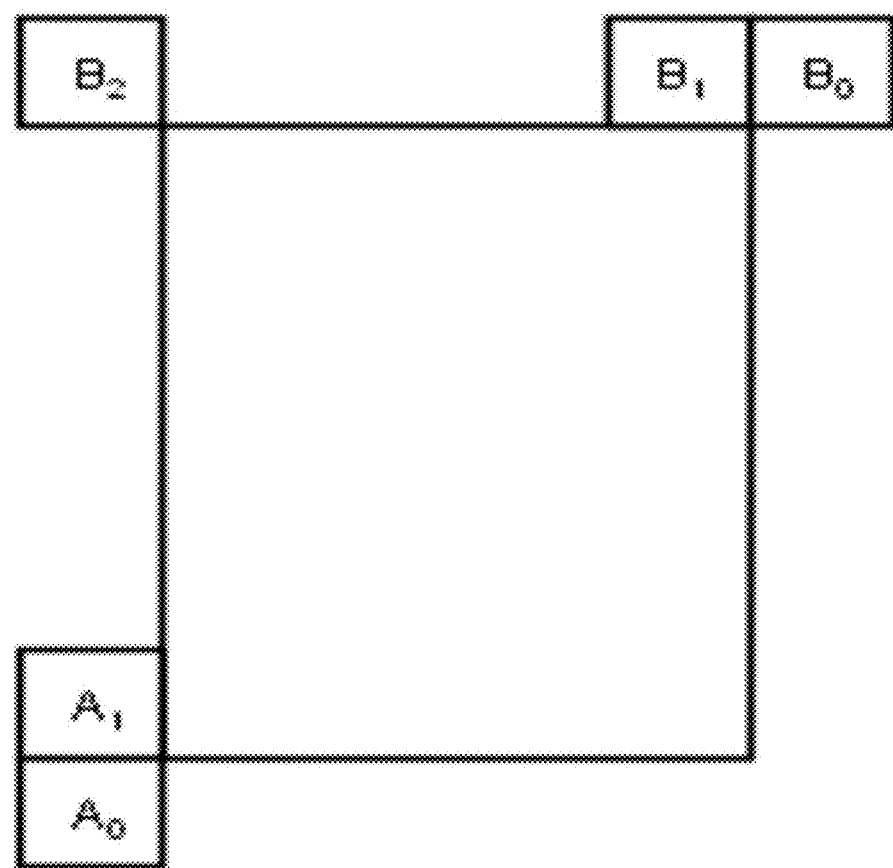
FIG. 16 shows an example of neighboring blocks.

| Syntax element | condL | condA | ctxSetIdx |
|---|---|---|---|
| intra_lwip_flag [x0][y0] | | intra_lwip_flag [xNbA][yNbA] | 0 | c. In one example, one fixed context is used for coding the ALWIP flag in arithmetic coding.
 d. In one example, ALWIP flag is bypass coded in arithmetic coding.
 e. Alternatively, K contexts may be used for coding ALWIP flag in arithmetic coding. The context to be used may depend on dimension (e.g. width denoted as W and height denoted as H) of the block.
  i. In one example, K is equal to 2. When W>N*H or H>N*W (e.g., N=2), the first context is used, otherwise, the second context is used.
38. It is proposed that N (N>=0) contexts may be used to code the ALWIP flag (e.g., intra_lwip_flag) in arithmetic coding.
 a. In one example, N is equal to three. ALWIP flag and/or availability of two neighboring or/and non-adjacent blocks may be used for deriving the used context for the ALWIP flag in arithmetic coding.
  i. In one example, the two neighboring blocks may include the above (e.g., B1 in FIG. 10) block and the left (e.g., A1 in FIG. 10) block.
  ii. In one example, the two neighboring blocks may include the above block and the below-left (e.g., A2 in FIG. 10) block.
  iii. In one example, the two neighboring blocks may include the above block and the above-right (e.g., B2 in FIG. 10) block.
  iv. In one example, the two neighboring blocks may include the above-right (e.g., B2 in FIG. 10) block and the left (e.g., A1 in FIG. 10) block.
  v. In one example, the two neighboring blocks may include the above-right (e.g., B2 in FIG. 10) block and the below-left (e.g., A2 in FIG. 10) block.
  vi. In one example, the two neighboring blocks may include the left block (e.g., A1 in FIG. 10) and the below-left (e.g., A2 in FIG. 10) block.
  vii. In one example, the neighboring block may be defined differently from FIG. 10. an example is described in FIG. 16. The two neighboring blocks may include any two of the {above-right, above, above-left, left, below-left} blocks. E.g., The two neighboring blocks may include any two of the blocks in {B0, B1, B2, A0, A1}.
 b. In one example, N is equal to two. ALWIP flag and/or availability of one neighboring or/and non-adjacent block may be used for deriving the used context for the ALWIP flag in arithmetic coding.
  i. In one example, the neighboring block may be anyone of the {above-right, above, above-left, left, below-left}. An example of the neighboring block is described in FIG. 10.
  ii. In one example, the neighboring block may be anyone of the {above-right, above, above-left, left, below-left} block. An example of the neighboring block is described in FIG. 16.
 c. In one example, one fixed context may be used for coding ALWIP flag in arithmetic coding.
 d. In one example, ALWIP flag may be bypass coded in arithmetic coding. FIG. 16 shows an example of neighboring blocks.
39. It is proposed that the reduced boundary samples may be generated without calculating the up-sampling boundary samples.
 a. In one example, the reference samples located at the upsampling boundary sample positions are directly used for the prediction upsampling process.
  i. In one example, the upsampling boundary samples may not be computed by averaging multiple adjacent reference samples.
 b. In one example, the reduced boundary samples may be directly calculated from reference samples and the downscaling factor.
  i. In one example, the downscaling factor may be computed by the transform block size and the downsampled boundary size.
40. In one example, the samples may be with different precisions in different filtering stages in the up-sampling process in ALWIP. "Samples" may refer to prediction samples or any intermedium samples before or after the up-sampling process.
 a. In one example, samples are up-sampled along a first dimension horizontally in a first filtering stage; then samples are up-sampled along a second dimension vertically in a second filtering stage in the up-sampling process in ALWIP.
  i. Alternatively, samples are up-sampled along a first dimension vertically in a first filtering stage; then samples are up-sampled along a second dimension horizontally in a second filtering stage in the up-sampling process in ALWIP.
b. In one example, the output up-sampling results without right-shifting or division in the first filtering stage may be used as the input samples to the second filtering stage.
   i. In one example, the output up-sampling filtering results in the second filtering stage may be right-shifted by Shift1 or divided by Dem1 to derive the final up-sampled results.
   ii. In one example, the output up-sampling filtering results in the first filtering stage may be right-shifted by Shift2 or divided by Dem2 to derive the final up-sampled results.
      1) In one example, Shift1=2×Shift2; Dem1=Dem2×Dem2.
   iii. In one example, the samples, which are input to the second filtering stage but are not the output up-sampling results in the first filtering stage, may be left-shifted Shift3 or multiplied by Dem3 before being input to the second filtering stage.
      1) In one example, Shift3=Shift1; Dem3=Dem2.
c. In one example, the output up-sampling results in the first filtering stage may be right-shifted by Shift1 or divided by Dem1 before being used as the input samples to the second filtering stage.
   i. In one example, the output up-sampling filtering results in the second filtering stage may be right-shifted by Shift2 or divided by Dem2 to derive the final up-sampled results, where Shift2 may be not equal to Shift1, e.g. Shift2>Shift1; Dem2 may be not equal to Dem1, e.g. Dem2>Dem1.
   ii. In one example, the output up-sampling filtering results in the first filtering stage may be right-shifted by Shift3 or divided by Dem3 to derive the final up-sampled results, where Shift3 may be equal to Shift1; Dem3 maybe not equal to Dem1.
      1) In one example, Shift3=Shift1+Shift2.
   iii. In one example, the samples, which are input to the second filtering stage but are not the output up-sampling results in the first filtering stage, may be left-shifted or multiplied by a factor before being input to the second filtering stage.
d. In one example, the output up-sampling results in the first filtering stage may be left-shifted by Shift1 or multiplied by Dem1 before being used as the input samples to the second filtering stage.
   i. In one example, the output up-sampling filtering results in the second filtering stage may be right-shifted or divided by a factor to derive the final up-sampled results.
   ii. In one example, the output up-sampling filtering results in the first filtering stage may be right-shifted or divided by a factor to derive the final up-sampled results.
   iii. In one example, the samples, which are input to the second filtering stage but are not the output up-sampling results in the first filtering stage, may be left-shifted by Shift2 or multiplied by Dem2 before being input to the second filtering stage, where Shift2 may be not equal to Shift1, e.g. Shift2>Shift1; Dem1 may be not equal to Dem2, e.g. Dem2>Dem1.
e. In one example, the samples which are input to the first filtering stage may be left-shifted by Shift1 or multiplied by Dem1 before being used as the input samples to the first filtering stage.
   i. In one example, the output up-sampling filtering results in the second filtering stage may be right-shifted or divided by a factor to derive the final up-sampled results.
   ii. In one example, the output up-sampling filtering results in the first filtering stage may be right-shifted or divided by a factor to derive the final up-sampled results.
   iii. In one example, the samples, which are input to the second filtering stage but are not the output up-sampling results in the first filtering stage, may be left-shifted by Shift2 or multiplied by Dem2 before being input to the second filtering stage, where Shift2 may be not equal to Shift1, e.g. Shift2>Shift1; Dem2 may be not equal to Dem1, e.g. Dem2>Dem1.

41. It is proposed that up-sampling in ALWIP may be performed in a fixed order when both vertical up-sampling and horizontal up-sampling are required.
   a. In one example, horizontal up-sampling may be performed firstly, and vertical up-sampling may be performed secondly.
   b. In one example, vertical up-sampling may be performed firstly, and horizontal up-sampling may be performed secondly.
42. In one example, the prediction samples in ALWIP before up-sampling may be transposed according to the block dimensions.
   a. In one example, a W*H block may be firstly transposed to H*W block, then up-sampling may be applied.
   b. Alternatively, furthermore, after the up-sampling process, the up-sampled samples may be transposed in a reversed way.
43. It is proposed that alternative interpolation filters instead of the bilinear filter may be used for up-sampling in ALWIP.
   a. In one example, (4-tap, 6-tap, 8-tap etc.) gaussian filter may be used.
   b. In one example, (4-tap, 6-tap, 8-tap etc.) cubic filter may be used.
   c. In one example, interpolation filters used in motion compensation for chroma samples may be used.
   d. In one example, interpolation filters (6-tap, 8-tap etc.) used in motion compensation for luma samples may be used.
   e. Which interpolation filter is used may depend on the block dimensions.
   f. Which interpolation filter is used may depend on the up-sampling ratio.
   g. Which interpolation filter is used may depend on the prediction mode of ALWIP.
   h. Which interpolation filter is used may depend on how many samples are available for up-sampling.
      i. For example, when there are 4 available samples (excluding the neighboring reference samples) in one row (or column), 4-tap interpolation filter may be used.
      ii. For example, when there are 8 available samples (excluding the neighboring reference samples) in one row (or column), 4-tap or 8-tap interpolation filter may be used.

5. EMBODIMENTS

Newly added parts are highlighted in bold faced italics and deleted parts are highlighted in underlined italicized text.

5.1 One Example

Three contexts are used for coding ALWIP flag.

TABLE 9-15

Assignment of ctxInc to syntax elements with context coded bins

| | binIdx | | | | | |
|---|---|---|---|---|---|---|
| Syntax element | 0 | 1 | 2 | 3 | 4 | >=5 |
| ... | terminate | na | na | na | na | na |
| intra_lwip_flag[ ][ ] | (Abs( Log2(cbWidth) − Log2(cbHeight) ) > 1) ? 3 : ( 0, 1, 2 (clause 9.5.4.2.2)) | na | na | na | na | na |
| intra_lwip_flag[ ][ ] | ( 0, 1, 2 (clause 9.5.4.2.2) ) | na | na | na | na | na |

TABLE 9-15

Assignment of ctxInc to syntax elements with context coded bins

| | binIdx | | | | | |
|---|---|---|---|---|---|---|
| Syntax element | 0 | 1 | 2 | 3 | 4 | >=5 |
| intra_lwip_mpm_flag[ ][ ] | 0 | na | na | na | na | na |
| intra_lwip_mpm_idx[ ][ ] | bypass | bypass | na | na | na | na |
| intra_lwip_mpm_remainder[ ][ ] | bypass | bypass | bypass | bypass | bypass | na |

5.2 One Example

One fixed context is used for coding ALWIP flag.

TABLE 9-15

Assignment of ctxInc to syntax elements with context coded bins

| | binIdx | | | | | |
|---|---|---|---|---|---|---|
| Syntax element | 0 | 1 | 2 | 3 | 4 | >=5 |
| ... | terminate | na | na | na | na | na |
| intra_lwip_flag[ ][ ] | (Abs( Log2(cbWidth) − Log2(cbHeight) ) > 1) ? 3 : ( 0, 1, 2 (clause 9.5.4.2.2)) | na | na | na | na | na |
| intra_lwip_flag[ ][ ] | 0 | na | na | na | na | na |
| intra_lwip_mpm_flag[ ][ ] | 0 | na | na | na | na | na |

TABLE 9-15

Assignment of ctxInc to syntax elements with context coded bins

| | binIdx | | | | | |
|---|---|---|---|---|---|---|
| Syntax element | 0 | 1 | 2 | 3 | 4 | >=5 |
| intra_lwip_mpm_idx[ ][ ] | bypass | bypass | na | na | na | na |
| intra_lwip_mpm_remainder[ ][ ] | bypass | bypass | bypass | bypass | bypass | na |

5.3 One Example

Perform the boundary reduction process in one-step.

Below embodiments are based on the adopted JVET-N0220-proposal-test-CE3-4.1_v2.

8.4.4.2.X1 Affine linear weighted intra sample prediction 8.4.4.2.X3 Specification of the Boundary Reduction Process Inputs to this process are:

a variable nTbX specifying the transform block size, reference samples refX[x] with x=0 ... nTbX−1, a variable boundarySize specifying the downsampled boundary size, a flag needUpsBdryX specifying whether intermediate boundary samples are required for upsampling, a variable upsBdrySize specifying the boundary size for upsampling.

Outputs of this process are the reduced boundary samples redX[x] with x=0 ... boundarySize−1 and upsampling boundary samples upsBdryX[x] with x=0 ... upsBdrySize−1.

The upsampling boundary samples upsBdryX[x] with x=0 ... upsBdrySize−1 are derived as follows:

If needUpsBdryX is equal to TRUE and upsBdrySize is less than nTbX, the following applies:

$$uDwn = nTbX/upsBdrySize \quad (8\text{-}X30)$$

$$upsBdryX[x] = refX[x*uDwn]$$

$$upsBdryX[x] = (\Sigma_{i=0}^{uDwn-1} refX[x*uDwn+i]) + (1 << (\text{Log}2(uDwn)-1))) >> \text{Log}2(uDwn) \quad (8\text{-}X31)$$

Otherwise (upsBdrySize is equal to nTbX), upsBdryX[x] is set equal to refX[x].

The reduced boundary samples redX[x] with x=0 . . . boundarySize−1 are derived as follows:
  If boundarySize is less than upsBdrySize nTbX, the following applies:

$$bDwn = upsBdrySizenTbX/boundarySize \quad (8\text{-}X32)$$

$$redX[x] = \left(\sum_{i=0}^{bDwn-1} upsBdryXrefX[x*bDwn+i] + \right.$$
$$(1 << (\text{Log2}(bDwn)-1))) >> \text{Log2}(bDwn) \quad (8\text{-}X33)$$

The term upsBdryX in Equation 8-X33 is deleted.
  Otherwise (boundarySize is equal to upsBdrySize nTbX), redX[x] is set equal to upsBdryX[x]refX[x].

5.4 One Example

Derive prediction samples with different precisions in different filtering stages in the up-sampling process in ALWIP. Below embodiments are based on the adopted JVET-N0217-proposal-test-CE3-4.1_v2.
8.4.4.2.X4 Specification of the Prediction Upsampling Process
Inputs to this process are:
  a variable predW specifying the input block width,
  a variable predH specifying the input block height,
  affine linear weighted samples predLwip[x][y], with x=0 . . . predW−1, y=0 . . . predH−1,
  a variable nTbW specifying the transform block width,
  a variable nTbH specifying the transform block height,
  a variable upsBdryW specifying the upsampling boundary width,
  a variable upsBdryH specifying the upsampling boundary height,
  top upsampling boundary samples upsBdryT[x] with x=0 . . . upsBdryW−1,
  left upsampling boundary samples upsBdryL[x] with x=0 . . . upsBdryH−1.
Outputs of this process are the predicted samples predSamples[x][y], with x=0 . . . nTbW−1, y=0 . . . nTbH−1.
The sparse predicted samples predSamples[m][n] are derived from predLwip[x][y], with x=0 . . . predW−1, y=0 . . . predH−1 as follows:

$$upHor = nTbW/predW \quad [8\text{-}X34]$$

$$upVer = nTbH/predH \quad [8\text{-}X35]$$

$$predSamples[(x+1)*upHor-1][(y+1)*upVer-1] = predLwip[x][y] \quad [8\text{-}X36]$$

The top boundary samples upsBdryT[x] with x=0 . . . upsBdryW−1 are assigned to predSamples[m][−1] as follows:

predSamples[(x+1)*(nTbW/upsBdryW)−1][−1]=upsBdryT[x]  (8-X37)

The left boundary samples upsBdryL[y] with y=0 . . . upsBdryH−1 are assigned to predSamples[−1][n] as follows:

predSamples[−1][(y+1)*(nTbH/upsBdryH)−1]=upsBdryL[y]  (8-X38)

The predicted samples predSamples[x][y], with x=0 . . . nTbW−1, y=0 . . . nTbH−1 are derived as follows:

If nTbH is greater than nTbW, the following ordered steps apply:
  1. When upHor is greater than 1, horizontal upsampling for all sparse positions (xHor, yHor)=(m*upHor−1, n*upVer−1) with m=0 . . . predW−1, n=1 . . . predH is applied with dX=1 . . . upHor−1 as follows:

predSamples[xHor+dX][yHor]=((upHor−dX)*predSamples[xHor][yHor]+dX*predSamples[xHor+upHor][yHor])/upHor  (8-X39)

2. Vertical upsampling for all sparse positions (xVer, yVer)=(m, n*upVer−1) with m=0 . . . nTbW−1, n=0 . . . predH−1 is applied with dY=1 . . . upVer−1 as follows:

If yVer is equal to −1,predSamples[xVer][yVer]
    =predSamples[xVer][yVer]<<log 2(upHor)

predSamples[xVer][yVer+dY]=((upVer−dY)*predSamples[xVer][yVer]+dY*predSamples[xVer][yVer+upVer])/upVer+(1<<(log 2(upHor)+log 2(upVer)−1)))>>(log 2(upHor)+log 2(upVer))  (8-X40)

Otherwise, the following ordered steps apply:
  1. When upVer is greater than 1, vertical upsampling for all sparse positions (xVer, yVer)=(m*upHor−1, n*upVer−1) with m=1 . . . predW, n=0 . . . predH−1 is applied with dY=1 . . . upVer−1 as specified in (8-X40) (8-X41).

predSamples[xVer][yVer+dY]=((upVer−dY)*predSamples[xVer][yVer]+dY*predSamples[xVer][yVer+upVer])  (8-X41)

2. Horizontal upsampling for all sparse positions (xHor, yHor)=(m*upHor−1, n) with m=0 . . . predW−1, n=0 . . . nTbH−1 is applied with dX=1 . . . upHor−1 as specified in (8-X39) as follows.

If xHor is equal to −1,predSamples[xHor][yHor]=predSamples[xHor][yHor]<<log 2(upVer)

predSamples[xHor+dX][yHor]=((upHor−dX)*predSamples[xHor][yHor]+dX*predSamples[xHor+upHor][yHor])+(1<<(log 2(upHor)+log 2(upVer)−1)))>>(log 2(upHor)+log 2(upVer))  (8-X42)

5.5 Examples Corresponding to Bullet 40

Suppose the block dimensions are W×H. Samples P(x, y) with x=Sx, Sx+Kx, Sx+2Kx, Sx+3Kx, . . . , y=Sy, Sy+Ky, Sy+2Ky, Sy+3Ky . . . are input to the up-sampling process to derive the up-sampled samples S(x, y) with x=0, 1, 2 . . . W−1, y=0, 1, 2, . . . H−1. Kx and Ky are step sizes along the horizontal and vertical directions respectively. (Sx, Sy) is the starting position.
Suppose 1-D up-sampling is done horizontally in the first stage and 1-D up-sampling is done vertically in the second stage.
In one example, the output results in the first stage without right-shifting may be derived as S'(Sx+Kx−1,Sy)=F1*P(Sx,Sy)+F2*P(Sx+Kx,Sy).

S'(Sx+Kx−1,Sy+Ky)=F1*P(Sx,Sy+Ky)+F2*P(Sx+Kx,Sy+Ky).

F1, F2 are coefficients for a 2-tap filter and F1+F2=$2^N$.
Then an output result in the second stage may be derived as S'(Sx+Kx−1,Sy+1)=F3*S'(Sx+Kx−1,Sy)+F4*S'(Sx+Kx−1,Sy+Ky).

F3, F4 are coefficients for a 2-tap filter and F3+F4=$2^M$.

Then the final up-sampled sample value may be derived as:

$S(Sx+Kx-1,Sy+1)=\text{Shift}(S'(Sx+Kx-1,Sy+1),2N);$ $S(Sx+Kx-1,Sy)=\text{Shift}(S'(Sx+Kx-1,Sy),N);$ $S(Sx+Kx-1,Sy+Ky)=\text{Shift}(S'(Sx+Kx-1,Sy+Ky),N);$ The examples described above may be incorporated in the context of the methods described below, e.g., methods 1100-1400 and 2100-2300, which may be implemented at a video encoder and/or decoder.

Figure 11:
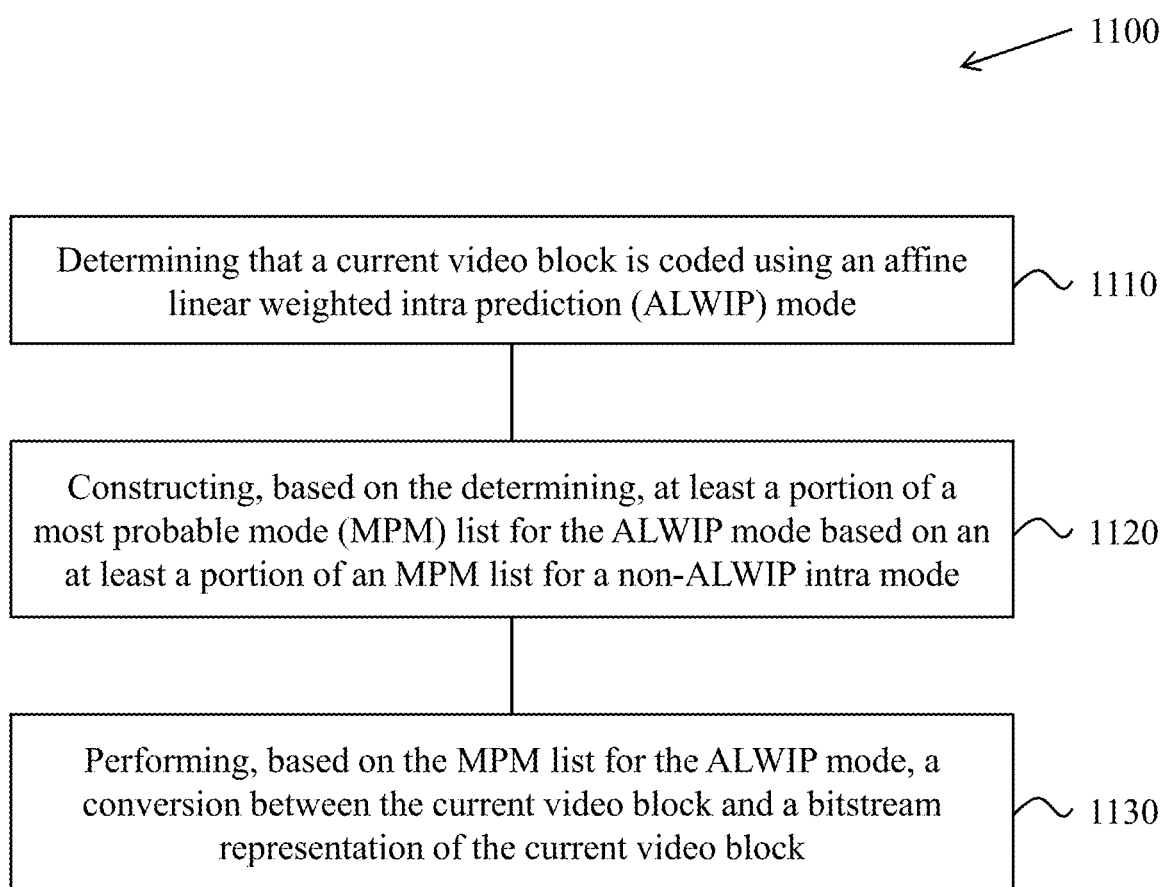
FIG. 11 shows a flowchart of an example method for matrix-based intra prediction, in accordance with the disclosed technology.

FIG. 11 shows a flowchart of an exemplary method for video processing. The method 1100 includes, at step 1110, determining that a current video block is coded using an affine linear weighted intra prediction (ALWIP) mode.

The method 1100 includes, at step 1120, constructing, based on the determining, at least a portion of a most probable mode (MPM) list for the ALWIP mode based on an at least a portion of an MPM list for a non-ALWIP intra mode.

The method 1100 includes, at step 1130, performing, based on the MPM list for the ALWIP mode, a conversion between the current video block and a bitstream representation of the current video block.

In some embodiments, a size of the MPM list of the ALWIP mode is identical to a size of the MPM list for the non-ALWIP intra mode. In an example, the size of the MPM list of the ALWIP mode is 6.

In some embodiments, the method 1100 further comprises the step of inserting default modes to the MPM list for the ALWIP mode. In an example, the default modes are inserted prior to the portion of a MPM list for the ALWIP mode that is based on the MPM list for the non-ALWIP intra mode. In another example, the default modes are inserted subsequent to the portion of a MPM list for the ALWIP mode that is based on the MPM list for the non-ALWIP intra mode. In yet another example, the default modes are inserted in an interleaved manner with the portion of a MPM list for the ALWIP mode that is based on the MPM list for the non-ALWIP intra mode.

In some embodiments, constructing the MPM list for the ALWIP mode and the MPM list for the non-ALWIP intra mode is based on one or more neighboring blocks.

In some embodiments, constructing the MPM list for the ALWIP mode and the MPM list for the non-ALWIP intra mode is based a height or a width of the current video block.

In some embodiments, constructing the MPM list for the ALWIP mode is based on a first set of parameters that is different from a second set of parameters used to construct the MPM list for the non-ALWIP intra mode.

In some embodiments, the method 1100 further includes the step of determining that a neighboring block of the current video block has been coded with the ALWIP mode, and designating, in constructing the MPM list for the non-ALWIP intra mode, the neighboring block as unavailable.

In some embodiments, the method 1100 further includes the step of determining that a neighboring block of the current video block has been coded with the non-ALWIP intra mode, and designating, in constructing the MPM list for the ALWIP mode, the neighboring block as unavailable.

In some embodiments, the non-ALWIP intra mode is based on a normal intra mode, a multiple reference line (MRL) intra prediction mode or an intra sub-partition (ISP) tool.

Figure 12:
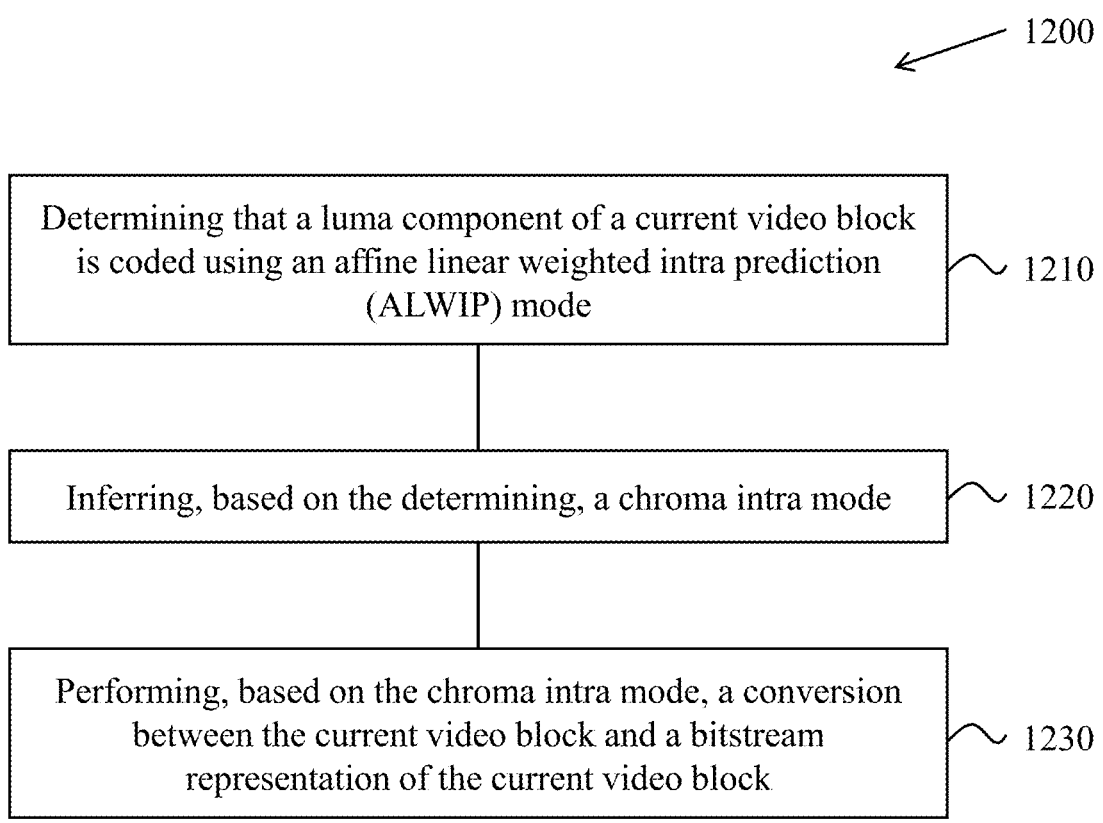
FIG. 12 shows a flowchart of another example method for matrix-based intra prediction, in accordance with the disclosed technology.

FIG. 12 shows a flowchart of an exemplary method for video processing. The method 1200 includes, at step 1210, determining that a luma component of a current video block is coded using an affine linear weighted intra prediction (ALWIP) mode.

The method 1200 includes, at step 1220, inferring, based on the determining, a chroma intra mode.

The method 1200 includes, at step 1230, performing, based on the chroma intra mode, a conversion between the current video block and a bitstream representation of the current video block.

In some embodiments, the luma component covers a predetermined chroma sample of the chroma component. In an example, the predetermined chroma sample is a top-left sample or a center sample of the chroma component.

In some embodiments, the inferred chroma intra mode is a DM mode.

In some embodiments, the inferred chroma intra mode is the ALWIP mode.

In some embodiments, the ALWIP mode is applied to one or more chroma components of the current video block.

In some embodiments, different matrix or bias vectors of the ALWIP mode are applied to different color components of the current video block. In an example, the different matrix or bias vectors are predefined jointly for Cb and Cr components. In another example, the Cb and Cr components are concatenated. In yet another example, the Cb and Cr components are interleaved.

Figure 13:
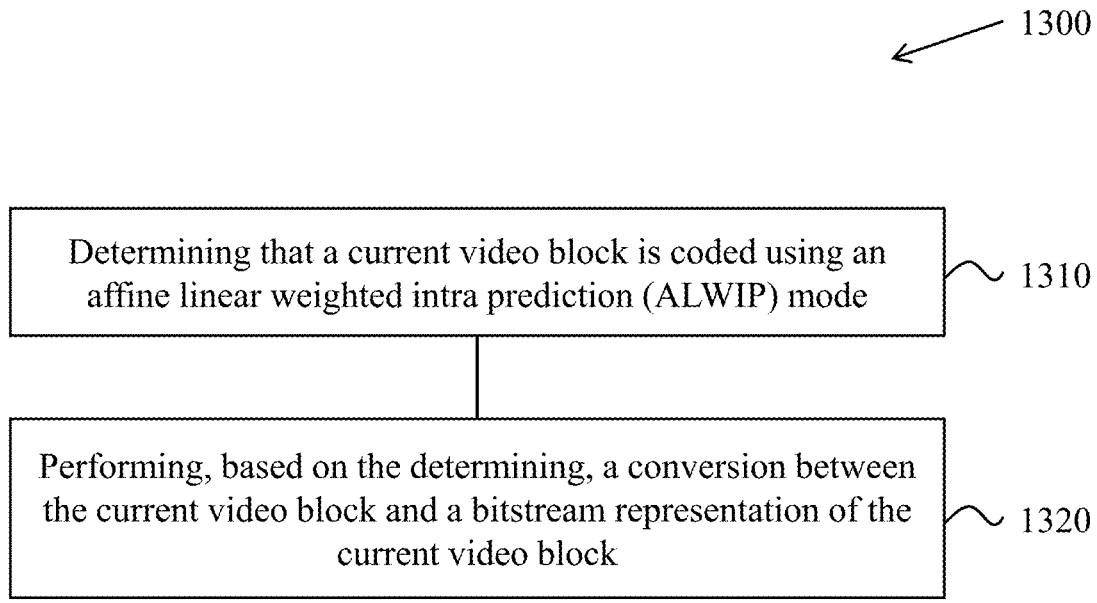
FIG. 13 shows a flowchart of yet another example method for matrix-based intra prediction, in accordance with the disclosed technology.

FIG. 13 shows a flowchart of an exemplary method for video processing. The method 1300 includes, at step 1310, determining that a current video block is coded using an affine linear weighted intra prediction (ALWIP) mode.

The method 1300 includes, at step 1320, performing, based on the determining, a conversion between the current video block and a bitstream representation of the current video block.

In some embodiments, the determining is based on signaling in a sequence parameter set (SPS), a picture parameter set (PPS), a slice header, a tile group header, a tile header, a coding tree unit (CTU) row or a CTU region.

In some embodiments, the determining is based on a height (H) or a width (W) of the current video block. In an example, W>T1 or H>T2. In another example, W≥T1 or H≥T2. In yet another example, W<T1 or H<T2. In yet another example, W≤T1 or H≤T2. In yet another example, T1=32 and T2=32.

In some embodiments, the determining is based on a height (H) or a width (W) of the current video block. In an example, W+H≤T. In another example, W+H≥T. In yet another example, W×H≤T. In yet another example, W×H≥T. In yet another example, T=256.

Figure 14:
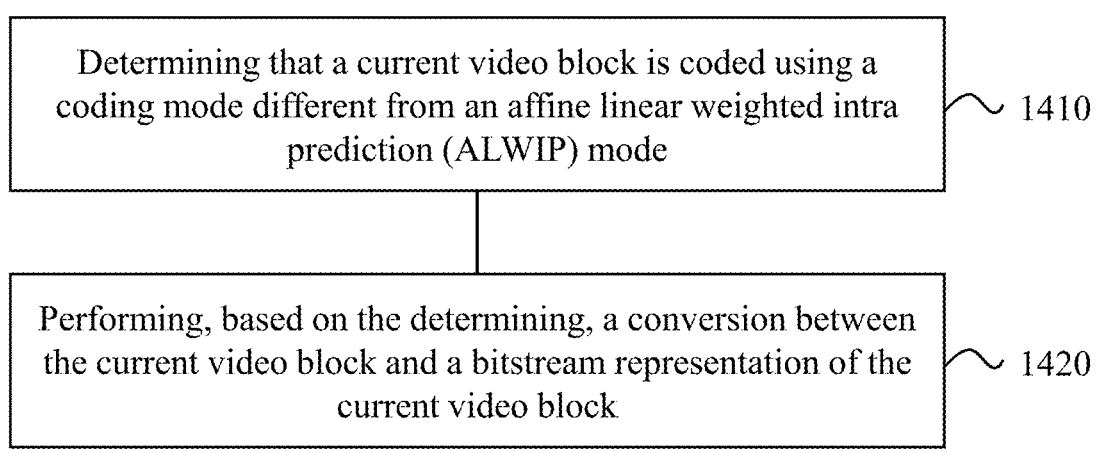
FIG. 14 shows a flowchart of yet another example method for matrix-based intra prediction, in accordance with the disclosed technology.

FIG. 14 shows a flowchart of an exemplary method for video processing. The method 1400 includes, at step 1410, determining that a current video block is coded using a coding mode different from an affine linear weighted intra prediction (ALWIP) mode.

The method 1400 includes, at step 1420, performing, based on the determining, a conversion between the current video block and a bitstream representation of the current video block.

In some embodiments, the coding mode is a combined intra and inter prediction (CHP) mode, and method 1400 further includes the step of performing a selection between the ALWIP mode and a normal intra prediction mode. In an example, performing the selection is based on an explicit signaling in the bitstream representation of the current video block. In another example, performing the selection is based on predetermined rule. In yet another example, the predetermined rule always selects the ALWIP mode when the current video block is coded using the CIIP mode. In yet another example, the predetermined rule always selects the normal intra prediction mode when the current video block is coded using the CIIP mode.

In some embodiments, the coding mode is a cross-component linear model (CCLM) prediction mode. In an example, a downsampling procedure for the ALWIP mode is based on a downsampling procedure for the CCLM prediction mode. In another example, the downsampling procedure for the ALWIP mode is based on a first set of parameters, and wherein the downsampling procedure for the CCLM prediction mode is based on a second set of parameters different from the first set of parameters. In yet another example, the downsampling procedure for the ALWIP mode or the CCLM prediction mode comprises at least one of a selection of downsampled positions, a selection of downsampling filters, a rounding operation or a clipping operation.

In some embodiments, the method 1400 further includes the step of applying one or more of a Reduced Secondary Transform (RST), a secondary transform, a rotation transform or a Non-Separable Secondary Transform (NSST).

In some embodiments, the method 1400 further includes the step of applying block-based differential pulse coded modulation (DPCM) or residual DPCM.

In some embodiments, a video processing method includes determining, based on a rule for a current video block, a context of a flag indicative of use of affine linear weighted intra prediction (ALWIP) mode during a conversion between the current video block and a bitstream representation of the current video block, predicting, based on the ALWIP mode, a plurality of sub-blocks of the current video block and performing, based on the predicting, the conversion between the current video block and a bitstream representation of the current video block. The rule may be specified implicitly using an a priori technique or may be signaled in the coded bitstream. Other examples and aspects of this method are further described in items 37 and 38 in Section 4.

In some embodiments, a method for video processing includes determining that a current video block is coded using an affine linear weighted intra prediction (ALWIP) mode, and performing, during a conversion between the current video block and a bitstream representation of the current video block, at least two filtering stages on samples of the current video block in an upsampling process associated with the ALWIP mode, wherein a first precision of the samples in a first filtering stage of the at least two filtering stages is different from a second precision of the samples in a second filtering stage of the at least two filtering stages.

In an example, the samples of the current video block are prediction samples, intermedium samples before the upsampling process or intermedium samples after the upsampling process. In another example, the samples are upsampled in a first dimension horizontally in the first filtering stage, and wherein the samples are upsampled in a second dimension vertically in the second filtering stage. In yet another example, the samples are upsampled in a first dimension vertically in the first filtering stage, and wherein the samples are upsampled in a second dimension horizontally in the second filtering stage.

In an example, an output of the first filtering stage is right-shifted or divided to generate a processed output, and wherein the processed output is an input to the second filtering stage. In another example, an output of the first filtering stage is left-shifted or multiplied to generate a processed output, and wherein the processed output is an input to the second filtering stage. Other examples and aspects of this method are further described in item 40 in Section 4.

As further described in items 41 to 43 in section 4, a video processing method includes determining that a current video block is coded using an affine linear weighted intra prediction (ALWIP) mode, performing, during a conversion between the current video block and a bitstream representation of the current video block, at least two filtering stages on samples of the current video block in an upsampling process associated with the ALWIP mode, wherein the upsampling process is performed in a fixed order for a case in which both vertical and horizontal upsampling is performed. As further described in items 41 to 43 in section 4, another method includes determining that a current video block is coded using an affine linear weighted intra prediction (ALWIP) mode, performing, during a conversion between the current video block and a bitstream representation of the current video block, at least two filtering stages on samples of the current video block in an upsampling process associated with the ALWIP mode, wherein the conversion includes performing a transposing operation prior to the upsampling process Additional features of the above-described methods are described in items 41 to 43 in Section 4.

6 EXAMPLE IMPLEMENTATIONS OF THE DISCLOSED TECHNOLOGY

Figure 15:
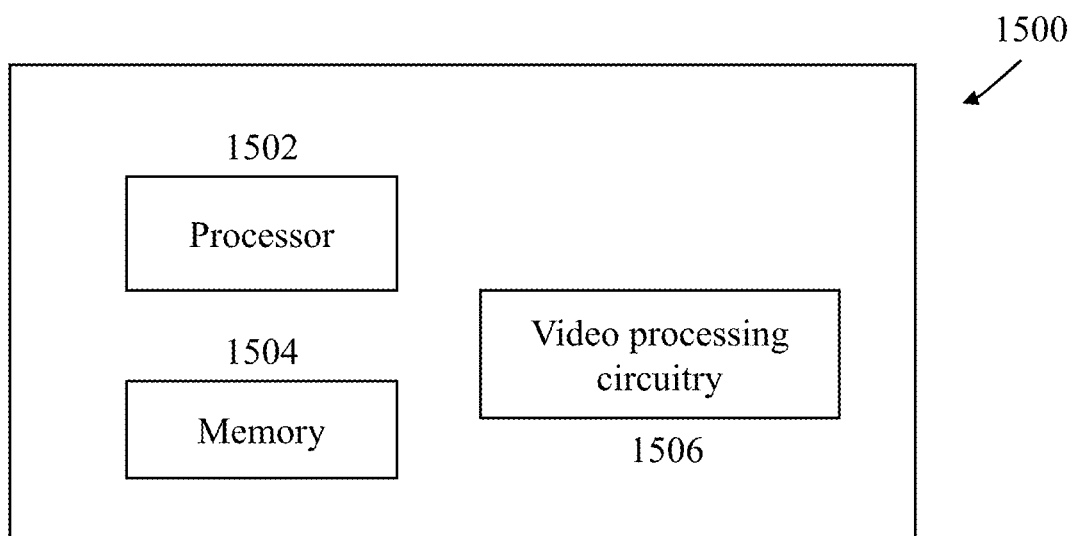
FIG. 15 is a block diagram of an example of a hardware platform for implementing a visual media decoding or a visual media encoding technique described in the present document.

FIG. 15 is a block diagram of a video processing apparatus 1500. The apparatus 1500 may be used to implement one or more of the methods described herein. The apparatus 1500 may be embodied in a smartphone, tablet, computer, Internet of Things (IoT) receiver, and so on. The apparatus 1500 may include one or more processors 1502, one or more memories 1504 and video processing hardware 1506. The processor(s) 1502 may be configured to implement one or more methods (including, but not limited to, methods 1100-1400 and 2100-2300) described in the present document. The memory (memories) 1504 may be used for storing data and code used for implementing the methods and techniques described herein. The video processing hardware 1506 may be used to implement, in hardware circuitry, some techniques described in the present document.

In some embodiments, the video coding methods may be implemented using an apparatus that is implemented on a hardware platform as described with respect to FIG. 15.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

Figure 17:
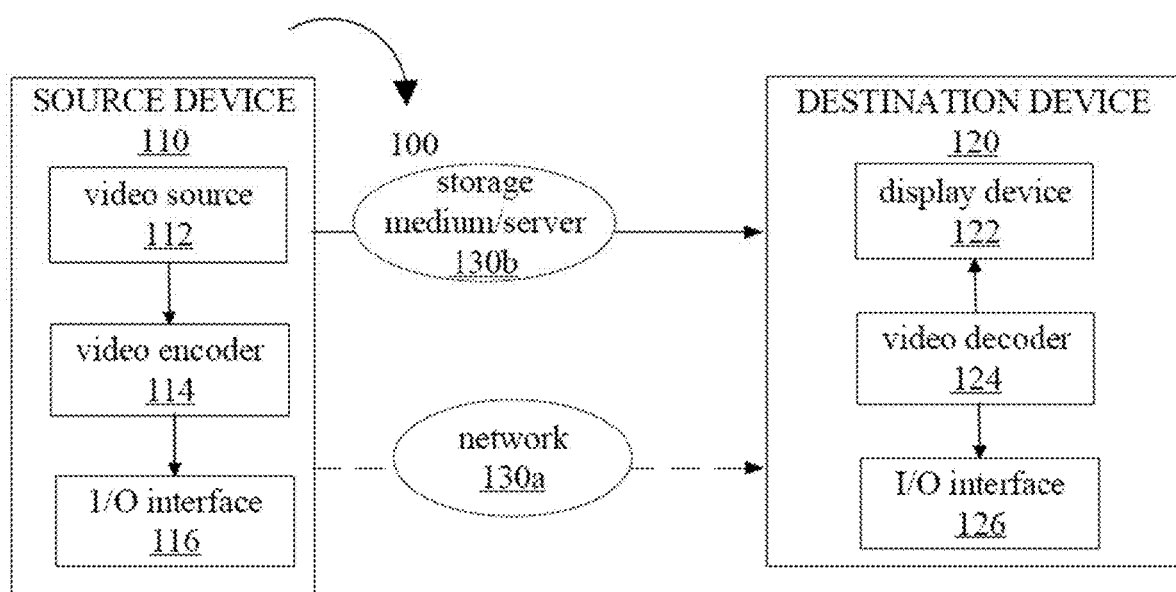
FIG. 17 is a block diagram that illustrates an example video coding system that may utilize the techniques of this disclosure.

FIG. 17 is a block diagram that illustrates an example video coding system 100 that may utilize the techniques of this disclosure. As shown in FIG. 17, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 18:
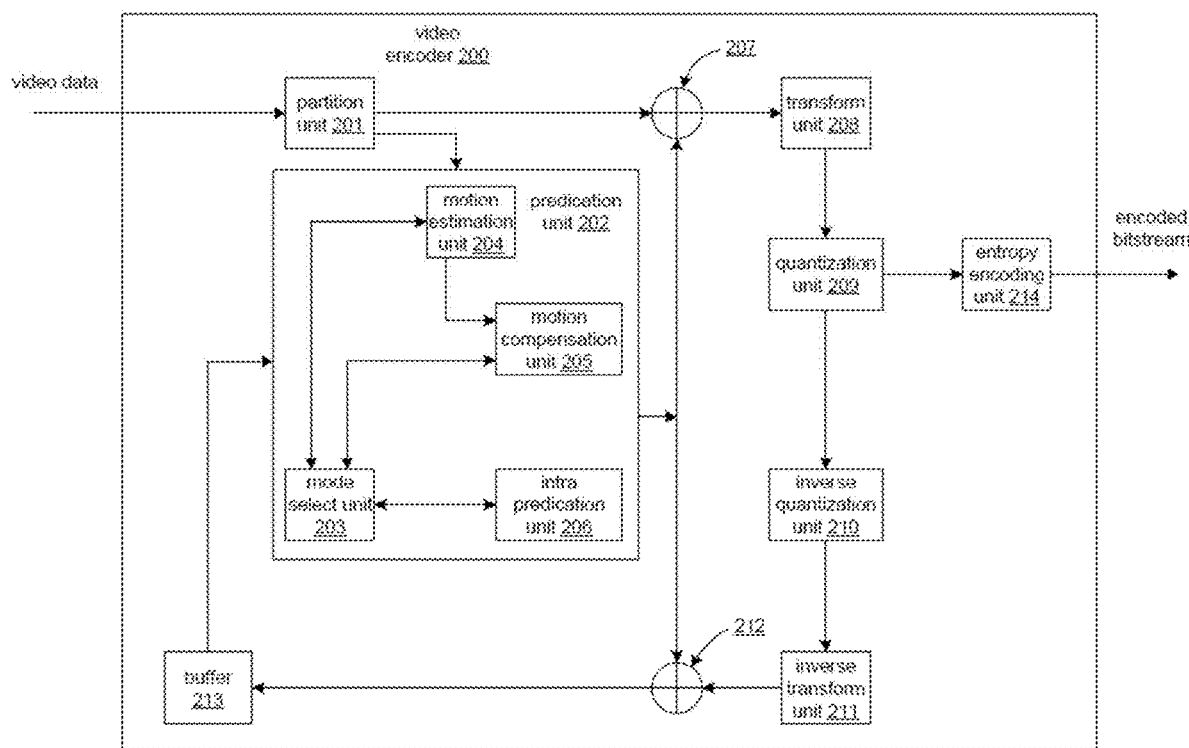
FIG. 18 is a block diagram illustrating an example of video encoder.

FIG. 18 is a block diagram illustrating an example of video encoder 200, which may be video encoder 114 in the system 100 illustrated in FIG. 17.

Video encoder 200 may be configured to perform any or all of the techniques of this disclosure. In the example of FIG. 18, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 18 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 19:
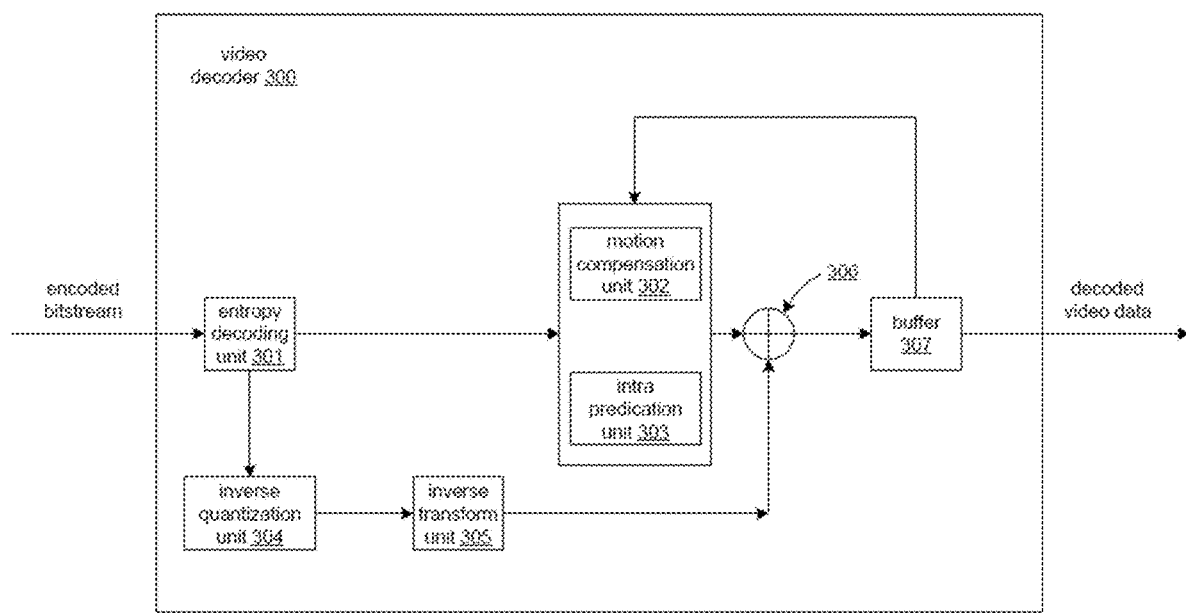
FIG. 19 is a block diagram illustrating an example of video decoder.

FIG. 19 is a block diagram illustrating an example of video decoder 300 which may be video decoder 114 in the system 100 illustrated in FIG. 17.

The video decoder 300 may be configured to perform any or all of the techniques of this disclosure. In the example of FIG. 19, the video decoder 300 includes a plurality of functional components. The techniques described in this disclosure may be shared among the various components of the video decoder 300. In some examples, a processor may be configured to perform any or all of the techniques described in this disclosure.

In the example of FIG. 19, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 18).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

Figure 20:
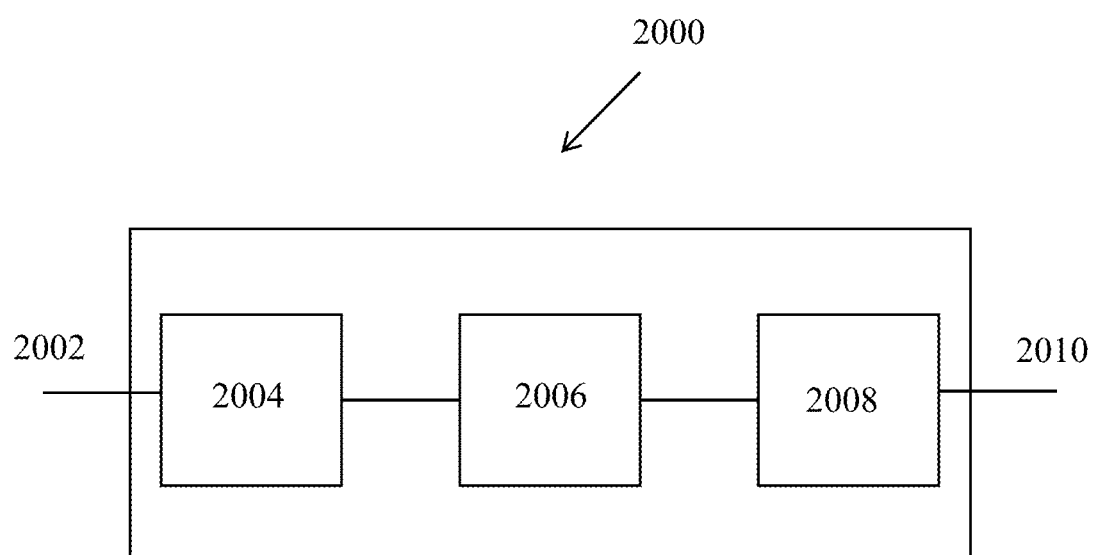
FIG. 20 is a block diagram showing an example video processing system in which various techniques disclosed herein may be implemented.

FIG. 20 is a block diagram showing an example video processing system 2000 in which various techniques disclosed herein may be implemented. Various implementations may include some or all of the components of the system 2000. The system 2000 may include input 2002 for receiving video content. The video content may be received in a raw or uncompressed format, e.g., 8 or 10 bit multi-component pixel values, or may be in a compressed or encoded format. The input 2002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2000 may include a coding component 2004 that may implement the various coding or encoding methods described in the present document. The coding component 2004 may reduce the average bitrate of video from the input 2002 to the output of the coding component 2004 to produce a coded representation of the video. The coding techniques are therefore sometimes called video compression or video transcoding techniques. The output of the coding component 2004 may be either stored, or transmitted via a communication connected, as represented by the component 2006. The stored or communicated bitstream (or coded) representation of the video received at the input 2002 may be used by the component 2008 for generating pixel values or displayable video that is sent to a display interface 2010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

In some embodiments, the ALWIP mode or the MIP mode is used to compute a prediction block of the current video block by performing, on previously coded samples of the video, a boundary downsampling operation (or an averaging operation), followed by a matrix vector multiplication operation, and selectively (or optionally) followed by an upsampling operation (or a linear interpolation operation). In some embodiments, the ALWIP mode or the MIP mode is used to compute a prediction block of the current video block by performing, on previously coded samples of the video, a boundary downsampling operation (or an averaging operation) and followed by a matrix vector multiplication operation. In some embodiments, the ALWIP mode or the MIP mode can also perform an upsampling operation (or a linear interpolation operation) after performing the matrix vector multiplication operation.

FIG. 21 shows a flowchart of another example method 2100 for matrix-based intra prediction, in accordance with the disclosed technology. Operation 2102 includes performing a conversion between a current video block of a video and a bitstream representation of the current video block using a matrix based intra prediction (MIP) mode in which a prediction block of the current video block is determined by performing, on previously coded samples of the video, a boundary downsampling operation, followed by a matrix vector multiplication operation, and followed by an upsampling operation, where the upsampling operation is performed, in both a vertical direction and a horizontal direction in a fixed order, on samples obtained from the matrix vector multiplication operation.

In some embodiments for method 2100, the fixed order includes first performing the upsampling operation in the horizontal direction followed by performing the upsampling operation in the vertical direction. In some embodiments for method 2100, the fixed order includes first performing the upsampling operation in the vertical direction followed by performing the upsampling operation in the horizontal direction.

FIG. 22 shows a flowchart of another example method 2200 for matrix-based intra prediction, in accordance with the disclosed technology. Operation 2202 includes performing a conversion between a current video block of a video and a bitstream representation of the current video block using a matrix based intra prediction (MIP) mode in which a prediction block of the current video block is determined by performing, on previously coded samples of the video, a boundary downsampling operation, followed by a matrix vector multiplication operation, and followed by an upsampling operation, where the conversion includes performing a transposing operation prior to the upsampling operation, where the transposing operation transposes a first set of samples of the prediction block obtained by performing the boundary downsampling operation and the matrix vector multiplication operation, and where the transposing operation is performed according to dimensions of the prediction block.

In some embodiments for method 2200, the transposing operation transposes the first set of samples of the prediction block, and the transposing operation converts the prediction block having a width of a first value and a height of a second value to the prediction block having the width of the second value and a height of the first value.

In some embodiments, the method 2200 further comprises performing another transposing operation that transposes a second set of samples of the prediction block obtained after the upsampling operation, where the another transposing operation converts the prediction block having the width of the second value and the height of the first value to the prediction block having the width of the first value and a height of the second value.

FIG. 23 shows a flowchart of another example method 2300 for matrix-based intra prediction, in accordance with the disclosed technology. Operation 2302 includes performing a conversion between a current video block of a video and a bitstream representation of the current video block using a matrix based intra prediction (MIP) mode in which a prediction block of the current video block is determined by performing, on previously coded samples of the video, a boundary downsampling operation, followed by a matrix vector multiplication operation, and followed by an upsampling operation, where the upsampling operation is performed by selecting and using an interpolation filter other than a bilinear filter according to a rule.

In some embodiments for method 2300, the rule specifies that the interpolation filter is a gaussian filter. In some embodiments for method 2300, the rule specifies that the interpolation filter is a cubic filter. In some embodiments for method 2300, the gaussian filter or the cubic filter is a 4-tap interpolation filter or a 6-tap interpolation filter or a 8-tap interpolation filter. In some embodiments for method 2300, the rule specifies that the interpolation filter is used in motion compensation for chroma samples. In some embodiments for method 2300, the rule specifies that the interpolation filter is used in motion compensation for luma samples.

In some embodiments for method 2300, the interpolation filter is a 6-tap interpolation filter or a 8-tap interpolation filter. In some embodiments for method 2300, the rule specifies that the interpolation filter is selected based on dimensions of the current video block. In some embodiments for method 2300, the rule specifies that the interpolation filter is selected based on an upsampling ratio used by the upsampling operation. In some embodiments for method 2300, the rule specifies that the interpolation filter is selected based on a prediction mode or an MIP mode index of the MIP mode. In some embodiments for method 2300, the rule specifies that the interpolation filter is selected based on a number of samples available for the upsampling operation. In some embodiments for method 2300, the rule specifies that the interpolation filter is a 4-tap interpolation filter in response to the number of samples being equal to a value.

In some embodiments for method 2300, the value is equal to four. In some embodiments for method 2300, the rule specifies that the interpolation filter is a 4-tap interpolation filter or a 8-tap interpolation filter in response to the number of samples being equal to a value. In some embodiments for method 2300, the value is equal to eight. In some embodiments for method 2300, the number of samples excludes neighboring reference samples. In some embodiments for method 2300, the performing of the conversion includes generating the bitstream representation from the current video block. In some embodiments for method 2300, the performing of the conversion includes generating the current video block from the bitstream representation.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
   determining, for a conversion between a video block of a video and a bitstream of the video, that a first intra mode is applied on the video block of the video, wherein the first intra mode includes a matrix vector multiplication operation and followed by an upsampling operation to generate prediction samples for the video block; and
   performing the conversion based on the prediction samples;
   wherein the upsampling operation comprises a horizontal upsampling operation and a vertical upsampling operation, and the horizontal upsampling operation and the vertical upsampling operation are performed in a fixed order; and
   the prediction samples are determined according to ((upHor−dX)*predSamples[xHor][yHor]+dX*predSamples[xHor+upHor][yHor]+offsetHor)/upHor in the horizontal upsampling operation, and
   the prediction samples are determined according to ((upVer−dY)*predSamples[xVer][yVer]+dY*predSamples[xVer][yVer+upVer]+offsetVer)/upVer in the vertical upsampling operation;
   wherein upHor is a function of a width of the video block and a pre-defined value based on the width and a height of the video block,
   wherein upVer is a function of the height of the video block and the pre-defined value based on the width and the height of the video block,
   wherein offsetHor and offsetVer are integers,
   wherein 1 <=dX<=upHor−1,
   wherein 1 <=dY<=upVer−1, and
   wherein xHor are positions based on the upHor and yHor are positions based on the upVer.

2. The method of claim 1, wherein the horizontal upsampling operation is performed before the vertical upsampling operation.

3. The method of claim 2, wherein the width of the video block is greater than the height of the video block.

4. The method of claim 1, wherein the matrix vector multiplication operation is followed by a transposing operation prior to the upsampling operation.

5. The method of claim 4, wherein the transposing operation converts a sample block having a width of a first value and a height of a second value to the sample block having the width of the second value and the height of the first value, and
   wherein the sample block is obtained by performing the matrix vector multiplication operation.

6. The method of claim 4, wherein a first syntax element indicating whether to apply the transposing operation is included in the bitstream.

7. The method of claim 1, wherein inputting samples of the matrix vector multiplication operation are obtained by performing a downsampling operation on boundary reference samples of the video block based on the width and the height of the video block.

8. The method of claim 1, wherein a second syntax element indicating whether to apply the first intra mode is included in the bitstream.

9. The method of claim 1, wherein the conversion includes encoding the video block into the bitstream.

10. The method of claim 1, wherein the conversion includes decoding the video block from the bitstream.

11. An apparatus for processing video data comprising a processor and a non-transitory memory with instructions thereon, wherein the instructions upon execution by the processor, cause the processor to:
    determine, for a conversion between a video block of a video and a bitstream of the video, that a first intra mode is applied on the video block of the video, wherein the first intra mode includes a matrix vector multiplication operation and followed by an upsampling operation to generate prediction samples for the video block; and
    perform the conversion based on the prediction samples;
    wherein the upsampling operation comprises a horizontal upsampling operation and a vertical upsampling operation, and the horizontal upsampling operation and the vertical upsampling operation are performed in a fixed order; and
    the prediction samples are determined according to ((upHor−dX)*predSamples[xHor][yHor]+dX*predSamples[xHor+upHor][yHor]+offsetHor)/upHor in the horizontal upsampling operation, and
    the prediction samples are determined according to ((upVer−dY)*predSamples[xVer][yVer]+dY*predSamples[xVer][yVer+upVer]+offsetVer)/upVer in the vertical upsampling operation;
    wherein upHor is a function of a width of the video block and a pre-defined value based on the width and a height of the video block,
    wherein upVer is a function of the height of the video block and the pre-defined value based on the width and the height of the video block,
    wherein offsetHor and offsetVer are integers,
    wherein 1 <=dX<=upHor−1, wherein 1 <=dY<=upVer−1, and
wherein xHor are positions based on the upHor and yHor are positions based on the upVer.

12. The apparatus of claim 11, wherein the horizontal upsampling operation is performed before the vertical upsampling operation.

13. The apparatus of claim 12, wherein the width of the video block is greater than the height of the video block.

14. The apparatus of claim 11, wherein the matrix vector multiplication operation is followed by a transposing operation prior to the upsampling operation.

15. The apparatus of claim 14, wherein the transposing operation converts a sample block having a width of a first value and a height of a second value to the sample block having the width of the second value and the height of the first value, and
wherein the sample block is obtained by performing the matrix vector multiplication operation.

16. The apparatus of claim 11, wherein inputting samples of the matrix vector multiplication operation are obtained by performing a downsampling operation on boundary reference samples of the video block based on the width and the height of the video block.

17. A non-transitory computer-readable storage medium storing instructions that cause a processor to:
determine, for a conversion between a video block of a video and a bitstream of the video, that a first intra mode is applied on the video block of the video, wherein the first intra mode includes a matrix vector multiplication operation and followed by an upsampling operation to generate prediction samples for the video block; and
perform the conversion based on the prediction samples;
wherein the upsampling operation comprises a horizontal upsampling operation and a vertical upsampling operation, and the horizontal upsampling operation and the vertical upsampling operation are performed in a fixed order; and
the prediction samples are determined according to ((upHor−dX)*predSamples[xHor][yHor]+ dX*predSamples[xHor+upHor][yHor]+offsetHor)/upHor in the horizontal upsampling operation, and
the prediction samples are determined according to ((upVer−dY)*predSamples[xVer][yVer]+dY*predSamples[xVer][yVer+upVer]+offsetVer)/upVer in the vertical upsampling operation;
wherein upHor is a function of a width of the video block and a pre-defined value based on the width and a height of the video block,
wherein upVer is a function the height of the video block and the pre-defined value based on the width and the height of the video block,
wherein offsetHor and offsetVer are integers,
wherein 1 <=dX<=upHor−1,
wherein 1 <=dY<=upVer−1, and
wherein xHor are positions based on the upHor and yHor are positions based on the upVer.

18. A non-transitory computer-readable recording medium storing a bitstream of a video which is generated by a method performed by a video processing apparatus, wherein the method comprises:
determining, that a first intra mode is applied on a video block of the video, wherein the first intra mode includes a matrix vector multiplication operation and followed by an upsampling operation to generate prediction samples for the video block; and
generating the bitstream based on the determining;
wherein the upsampling operation comprises a horizontal upsampling operation and a vertical upsampling operation, and the horizontal upsampling operation and the vertical upsampling operation are performed in a fixed order; and
the prediction samples are determined according to ((upHor−dX)*predSamples[xHor][yHor]+ dX*predSamples[xHor+upHor][yHor]+offsetHor)/upHor in the horizontal upsampling operation, and
the prediction samples are determined according to ((upVer−dY)*predSamples[xVer][yVer]+dY*predSamples[xVer][yVer+upVer]+offsetVer)/upVer in the vertical upsampling operation;
wherein upHor is a function of a width of the video block and a pre-defined value based on the width and a height of the video block,
wherein upVer is a function of the height of the video block and the pre-defined value based on the width and the height of the video block,
wherein offsetHor and offsetVer are integers,
wherein 1 <=dX<=upHor−1,
wherein 1 <=dY<=upVer−1, and
wherein xHor are positions based on the upHor and yHor are positions based on the upVer.

* * * * *